(12) United States Patent
Majithia et al.

(10) Patent No.: US 12,478,979 B2
(45) Date of Patent: Nov. 25, 2025

(54) METHODS AND COMPOSITIONS FOR MAGNETIZABLE PLASTICS

(71) Applicant: MAGNOMER, INC., Framingham, MA (US)

(72) Inventors: Ravish Y. Majithia, Framingham, MA (US); Vishal D. Salian, Framingham, MA (US); Kumaril R. Kapadia, Framingham, MA (US)

(73) Assignee: Magnomer, Inc., Framingham, MA (US)

( * ) Notice: Subject to any disclaimer, the term of this patent is extended or adjusted under 35 U.S.C. 154(b) by 1087 days.

(21) Appl. No.: 17/386,219

(22) Filed: Jul. 27, 2021

(65) Prior Publication Data

US 2022/0016637 A1 Jan. 20, 2022

Related U.S. Application Data

(63) Continuation of application No. PCT/US2020/015867, filed on Jan. 30, 2020.

(Continued)

(51) Int. Cl.
C09D 11/00 (2014.01)
B03C 1/01 (2006.01)
(Continued)

(52) U.S. Cl.
CPC ............... B03C 1/01 (2013.01); C09D 11/102 (2013.01); C09D 11/106 (2013.01); H01F 10/20 (2013.01); H01F 10/28 (2013.01)

(58) Field of Classification Search
CPC ....... B03C 1/01; C09D 11/102; C09D 11/106; H01F 10/20; H01F 10/28
(Continued)

(56) References Cited

U.S. PATENT DOCUMENTS 3,624,731 A 11/1971 Lindberg
4,434,007 A 2/1984 Lenox et al.
(Continued)

FOREIGN PATENT DOCUMENTS

CN 103602139 A 2/2014
EP 0011480 A2 5/1980
(Continued)

OTHER PUBLICATIONS

International Search Report dated Nov. 19, 2018 for International Application Serial No. PCT/US2018//043778, (6 pages).
(Continued)

*Primary Examiner* — James E Mcdonough
(74) *Attorney, Agent, or Firm* — Greenberg Traurig, LLP

(57) ABSTRACT

Provided herein are compositions comprising substrates that contain polymeric materials or non-magnetic, paramagnetic, or diamagnetic metal objects, and films or inks that contain ferromagnetic materials in which the films or the ferromagnetic materials are transparent. Also provided herein are methods of fabricating the substrates. Further provided herein are ferromagnetic material films containing transparent or translucent films that comprises ferromagnetic materials. The coating imparts functionality to the film such that the film is capable of being mechanically separated from the polymeric materials or non-magnetic, paramagnetic, or diamagnetic metal objects using a commercial magnetic separator. The transparent, food-safe ink composition, which can be printed using high-speed flexographic, gravure, intaglio, offset printing or pad printing consists of an ingestible magnetically susceptible pigment capable of rendering the printed template with magnetically active properties.

18 Claims, 4 Drawing Sheets

BOTTLE WITH CAP

CUP WITH LID

SACHET

STRAW

SPOON

Related U.S. Application Data

(60) Provisional application No. 62/799,168, filed on Jan. 31, 2019, provisional application No. 62/798,808, filed on Jan. 30, 2019.

(51) Int. Cl.
  *C09D 11/102* (2014.01)
  *C09D 11/106* (2014.01)
  *H01F 10/20* (2006.01)
  *H01F 10/28* (2006.01)

(58) Field of Classification Search
  USPC .................. 106/31.01, 31.13, 31.43
  See application file for complete search history.

(56) References Cited

U.S. PATENT DOCUMENTS

| | | |
|---|---|---|
| 4,585,553 A | 4/1986 | Hikosaka et al. |
| 4,812,492 A | 3/1989 | Eckes et al. |
| 4,866,232 A | 9/1989 | Stone et al. |
| 4,906,488 A | 3/1990 | Pera |
| 4,925,215 A | 5/1990 | Klaiber |
| 5,189,952 A | 3/1993 | Ohmura et al. |
| 5,223,360 A | 6/1993 | Prengel et al. |
| RE34,829 E | 1/1995 | Stone et al. |
| 5,382,963 A | 1/1995 | Pond et al. |
| 5,630,363 A | 5/1997 | Davis et al. |
| 5,648,160 A | 7/1997 | Kishimoto et al. |
| 5,651,316 A | 7/1997 | Demoore et al. |
| 5,693,375 A | 12/1997 | Sato et al. |
| 5,811,314 A | 9/1998 | Chen et al. |
| 6,149,857 A | 11/2000 | McArdle et al. |
| 6,180,226 B1 | 1/2001 | McArdle et al. |
| 6,221,138 B1 | 4/2001 | Kenny |
| 6,248,805 B1 | 6/2001 | Nguyen et al. |
| 6,334,893 B1 | 1/2002 | Pfaff et al. |
| 6,423,172 B1 | 7/2002 | McArdle et al. |
| 6,517,628 B1 | 2/2003 | Pfaff et al. |
| 7,008,979 B2 | 3/2006 | Schottman et al. |
| 7,378,150 B2 | 5/2008 | Fugiel et al. |
| 7,887,849 B2 | 2/2011 | Heinz et al. |
| 9,062,222 B2 | 6/2015 | Nilsson et al. |
| 2003/0128029 A1 | 7/2003 | Sawa et al. |
| 2003/0203991 A1 | 10/2003 | Schottman |
| 2003/0206091 A1 | 11/2003 | Matsumura et al. |
| 2004/0000254 A1 | 1/2004 | McElligott et al. |
| 2004/0001973 A1 | 1/2004 | Gao et al. |
| 2004/0038026 A1 | 2/2004 | Li et al. |
| 2004/0178391 A1 | 9/2004 | Conaghan et al. |
| 2005/0186439 A1 | 8/2005 | Staadecker et al. |
| 2006/0037432 A1 | 2/2006 | Deevi et al. |
| 2006/0150854 A1 | 7/2006 | Benninger et al. |
| 2006/0257634 A1 | 11/2006 | Bossert |
| 2006/0272534 A1 | 12/2006 | Lieberman |
| 2007/0123607 A1 | 5/2007 | King et al. |
| 2007/0144383 A1 | 6/2007 | Klann et al. |
| 2007/0269682 A1 | 11/2007 | Matas et al. |
| 2008/0169452 A1 | 7/2008 | Schneider et al. |
| 2008/0213609 A1 | 9/2008 | Jablonski et al. |
| 2008/0290006 A1 | 11/2008 | Duffy et al. |
| 2009/0191401 A1 | 7/2009 | Deetz |
| 2009/0321676 A1 | 12/2009 | Breton et al. |
| 2010/0098921 A1 | 4/2010 | Burrows |
| 2012/0000833 A1* | 1/2012 | Shelby .............. B03C 1/01 428/206 |
| 2012/0077001 A1 | 3/2012 | Klint et al. |
| 2012/0162330 A1 | 6/2012 | Iftime et al. |
| 2012/0235074 A1 | 9/2012 | Iftime |
| 2012/0235076 A1 | 9/2012 | Iftime |
| 2012/0236064 A1 | 9/2012 | Iftime et al. |
| 2013/0216597 A1 | 8/2013 | Mathias et al. |
| 2014/0020586 A1 | 1/2014 | Schiplage et al. |
| 2014/0044801 A1 | 2/2014 | Sakurada et al. |
| 2014/0308490 A1 | 10/2014 | Burrows |
| 2014/0354754 A1 | 12/2014 | Mayo et al. |
| 2015/0050508 A1 | 2/2015 | Stout et al. |
| 2015/0283552 A1 | 10/2015 | Chartoff |
| 2015/0344716 A1 | 12/2015 | Kroell et al. |
| 2015/0368425 A1 | 12/2015 | Hughes et al. |
| 2016/0200923 A1 | 7/2016 | Loccufier |
| 2016/0243814 A1 | 8/2016 | Schaefer et al. |
| 2016/0250783 A1 | 9/2016 | Schleicher, Jr. |
| 2016/0368261 A1 | 12/2016 | Le Bris et al. |
| 2017/0190927 A1* | 7/2017 | Mao .............. B05D 7/14 |

FOREIGN PATENT DOCUMENTS

| | | |
|---|---|---|
| EP | 0030507 A1 | 6/1981 |
| EP | 0063108 | 10/1982 |
| EP | 0099731 A2 | 2/1984 |
| EP | 0133941 A1 | 3/1985 |
| EP | 0276654 | 8/1988 |
| EP | 0342571 | 5/1989 |
| EP | 0404378 A1 | 12/1990 |
| EP | 0641648 A1 | 3/1995 |
| EP | 0647593 A1 | 4/1995 |
| EP | 0686675 A1 | 12/1995 |
| EP | 0772849 A1 | 5/1997 |
| EP | 0960911 A1 | 12/1999 |
| EP | 1013725 A1 | 6/2000 |
| EP | 1027391 A1 | 8/2000 |
| EP | 1090074 A1 | 4/2001 |
| EP | 1104447 A1 | 6/2001 |
| EP | 0885325 B1 | 7/2001 |
| EP | 1226072 A1 | 7/2002 |
| EP | 1263891 A1 | 12/2002 |
| EP | 1391318 A2 | 2/2004 |
| EP | 1493590 | 1/2005 |
| EP | 1537182 A2 | 6/2005 |
| EP | 1648711 A1 | 4/2006 |
| EP | 1669213 A1 | 6/2006 |
| EP | 1683839 A2 | 7/2006 |
| EP | 1854852 A1 | 11/2007 |
| EP | 1880866 A1 | 1/2008 |
| EP | 1978063 A1 | 10/2008 |
| EP | 1451248 B1 | 11/2008 |
| EP | 1987960 | 11/2008 |
| EP | 2234816 A2 | 10/2010 |
| EP | 2303969 A1 | 4/2011 |
| EP | 2604430 | 6/2013 |
| EP | 2608964 A2 | 7/2013 |
| EP | 2749611 | 7/2014 |
| JP | H08176485 A | 7/1996 |
| JP | H09226235 A | 9/1997 |
| JP | H09318806 A | 12/1997 |
| WO | WO-1990011363 | 10/1990 |
| WO | WO-9637868 A1 | 11/1996 |
| WO | WO-1999005922 | 2/1999 |
| WO | WO-03046508 A2 | 6/2003 |
| WO | WO-2003046068 | 6/2003 |
| WO | WO-03088281 A1 | 10/2003 |
| WO | WO-2004104120 | 12/2004 |
| WO | WO-2004106082 | 12/2004 |
| WO | WO-2005080030 | 9/2005 |
| WO | WO-2006082415 A2 | 8/2006 |
| WO | WO-2006093398 A1 | 9/2006 |
| WO | WO-2006103436 A1 | 10/2006 |
| WO | WO-2006110227 A1 | 11/2006 |
| WO | WO-2006130980 | 12/2006 |
| WO | WO-2007057146 A1 | 5/2007 |
| WO | WO-2007097747 | 8/2007 |
| WO | WO-2008055645 A2 | 5/2008 |
| WO | WO-2008059552 A1 | 5/2008 |
| WO | WO-2008141971 A2 | 11/2008 |
| WO | WO-2008141972 A1 | 11/2008 |
| WO | WO-2008141973 A1 | 11/2008 |
| WO | WO-2009058137 A1 | 5/2009 |
| WO | WO-2009074284 A2 | 6/2009 |
| WO | WO-2010026372 | 3/2010 |
| WO | WO-2010115986 | 10/2010 |
| WO | WO-2011107527 A1 | 9/2011 |
| WO | WO-2012003195 A2 | 1/2012 |
| WO | WO-2012024472 A1 | 2/2012 |

(56) References Cited

FOREIGN PATENT DOCUMENTS

| WO | WO-2012160181 | 11/2012 |
|----|---------------|---------|
| WO | WO-2013056213 | 10/2013 |
| WO | WO-2014024162 A1 | 2/2014 |
| WO | WO-2014070241 | 5/2014 |
| WO | WO-2014072172 A1 | 5/2014 |
| WO | WO-2014118569 A1 | 8/2014 |
| WO | WO-2015036615 A1 | 3/2015 |
| WO | WO-2015097288 | 7/2015 |
| WO | WO-2015189624 A2 | 12/2015 |
| WO | WO-2016003563 A2 | 1/2016 |
| WO | WO-2016083259 A1 | 6/2016 |
| WO | WO-2016125132 | 8/2016 |
| WO | WO-2016156408 | 10/2016 |

OTHER PUBLICATIONS

Written Opinion of the International Searching Authority dated Nov. 19, 2018 for International Application Serial No. PCT/US2018/043778, (15 pages).

\* cited by examiner

BOTTLE WITH CAP   CUP WITH LID   SACHET

METHODS AND COMPOSITIONS FOR MAGNETIZABLE PLASTICS

CROSS-REFERENCE

This application is a continuation of International Application No. PCT/US2020/015867, filed Jan. 30, 2020, which claims the benefit of U.S. Provisional Patent Application Nos. 62/798,808, filed Jan. 30, 2019, and 62/799,168, filed Jan. 31, 2019, all of which are incorporated herein by reference in their entirety.

BACKGROUND

The present disclosure relates to the design of a plastic object, used as a non-durable good, characterized by a ferromagnetic marker on the surface of the object, which enables separation of the object in a magnetic field.

SUMMARY

The primary objective of the present disclosure is the design of a plastic object which is imprinted with ink or affixed with a pre-printed label containing ink which enables the separation of the desired object from a mixed-waste stream under application of a magnetic field.

An additional objective of the present disclosure is to describe the geometric surface design of the plastic object which is printed in a way that increases printable surface area on the plastic object without significant change in dimensions of the object.

Another objective of the present disclosure is the design of a label printed with a magnetizable ink or coating which enables separation of labels from bottles enabling lower contamination.

Another object of the present disclosure is to describe the separation of the plastic labels with the magnetizable marker from mixed streams containing ground or shredded flakes of polyethylene terephthalate (PET) bottles, bottle caps, and labels in PET reclaiming facility. In case of PET bottle packaging, flakes obtained by grinding undergo separation whereby flakes of labels printed with magnetizable ink or coating are removed from flakes of PET bottles by means of the application of a magnetic field.

Another objective of the present disclosure is to showcase the formulation of a printable ink which can be temporarily magnetized in a magnetic field and can be printed, using commercial high-speed printing process such as flexo, gravure, intaglio, screen, pad or offset printing, onto the plastic object either directly or indirectly or as a pre-printed label to be affixed mechanical.

Another object of the present disclosure is to describe the composition of a magnetizable ink or coating that can be transparent or translucent to visible light as well as near infrared radiation (NIR) after printing onto the label. Visible light is characterized as light with wavelength of about 400-800 nanometers (nm) while near infrared red (NIR) radiation has wavelengths of about 780-2500 nm.

It is also an object of the present disclosure to use the plastic object with ferromagnetic element as food-safe non-toxic object capable for direct or indirect contact with foodstuffs.

Disclosed herein, in certain embodiments, are substrates comprising: a polymeric material or a non-magnetic, paramagnetic, or diamagnetic metal object, and a film or an ink comprising a ferromagnetic material; wherein the ferromagnetic material is deposited on a surface of the substrate, and wherein the film or ink is a food contact substance.

In some embodiments, the substrate has a mass that is less than about 20 grams. In some embodiments, the substrate is a single-use bottle, a bottle cap, a single-use coffee cup, plastic cutlery, an eating utensil, a cutting utensil, a plastic tray, a plastic container, a food packaging container, or any combination thereof. In some embodiments, the substrate is an aluminum can. In some embodiments, the film is a label. In some embodiments, the film is a shrink sleeve label, a pressure sensitive label, a roll fed label, a wrap label, a stretch label, a cut and stack label, a shrink bundling film, or any combination thereof. In some embodiments, the ferromagnetic material is a magnetizable coating or a magnetizable marker. In some embodiments, the ferromagnetic material is directly printed onto the surface of the substrate. In some embodiments, the ferromagnetic material is directly deposited on the surface of the substrate in the presence of a magnetic field to increase a magnetic permeability of the ferromagnetic material. In some embodiments, the ferromagnetic material ranges from about 0.05% to 2% of the total mass of the substrate. In some embodiments, the weight of the ferromagnetic element ranges from about 0.05% to 2% of the total mass of the film. In some embodiments, the weight of the ferromagnetic material ranges from about 0.05% to 2% of the total mass of the film. In some embodiments, the shrink sleeve label comprises less than about 5% difference in unrestrained shrinkage as compared to a shrink sleeve label that does not comprise a ferromagnetic material. In some embodiments, the substrate or film is magnetized upon exposure to a magnetic field. In some embodiments, the substrate or film is temporarily magnetized upon exposure to a magnetic field. In some embodiments, the substrate or film or ink is magnetized upon exposure to a magnetic field. In some embodiments, the substrate or film or ink is temporarily magnetized upon exposure to a magnetic field. In some embodiments, the substrate or film is separated from a plurality of non-magnetic, paramagnetic, or diamagnetic objects when magnetized. In some embodiments, the substrate or film is separated from a plurality of non-magnetic, paramagnetic, or diamagnetic objects when temporarily magnetized. In some embodiments, the substrate or film or ink is separated from a plurality of non-magnetic, paramagnetic, or diamagnetic objects when magnetized. In some embodiments, the substrate or film or ink is separated from a plurality of non-magnetic, paramagnetic, or diamagnetic objects when temporarily magnetized. In some embodiments, the film is separated from the substrate when magnetized. In some embodiments, the film is separated from the substrate when temporarily magnetized. In some embodiments, the film or ink is separated from the substrate when magnetized. In some embodiments, the film or ink is separated from the substrate when temporarily magnetized. In some embodiments, the film comprises a plurality of flakes. In some embodiments, the magnetic field has a magnetic field strength of at least about 1,000 gauss (G). In some embodiments, the magnetic field has a magnetic field strength of at most about 1,000 gauss (G). In some embodiments, the magnetic field is produced by a magnetic separation device. In some embodiments, the magnetic separation device is a hand-held magnet, a commercial drum-type separator, an over-band magnetic separator, a magnetic head pulley, or any combination thereof. In some embodiments, the magnetic separation device has at least about 50% separation recovery.

In some embodiments, the magnetic separation device has at least about 80% separation recovery. In some embodiments, the ferromagnetic material is printed onto the film. In some embodiments, the ferromagnetic material comprises a ferromagnetic ink composition. In some embodiments, the ink comprises a ferromagnetic ink composition. In some embodiments, the ferromagnetic ink composition comprises a ferromagnetic material, a resin, and a wetting and/or a dispersing agent. In some embodiments, the ferromagnetic ink composition comprises a ferromagnetic material, a resin, an anti-settling additive, and a wetting and/or a dispersing agent. In some embodiments, the anti-settling additive is fumed silica, polyamide derivatives, waxes or any combination thereof.

In some embodiments, the ferromagnetic material comprises at least 20% of the weight of the ferromagnetic ink composition. In some embodiments, the ferromagnetic material comprises less than 20% of the weight of the ferromagnetic ink composition. In some embodiments, the ferromagnetic material comprises from 0.1% to 20% of the weight of the ferromagnetic ink composition. In some embodiments, the ferromagnetic material comprises from 0.1% to less than 20% of the weight of the ferromagnetic ink composition.

In some embodiments, the ferromagnetic material is an ingestible ferromagnetic pigment. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel, aluminum, and/or copper. In some embodiments, the iron oxide is iron (III) oxide or iron (II, III) oxide. In some embodiments, the resin comprises at least 5% of the weight of the ferromagnetic ink composition. In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof.

In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof. In some embodiments, the ferromagnetic ink composition further comprises at least one solvent, wherein the solvent comprises at least 25% of the weight of the ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof. In some embodiments, the ferromagnetic ink composition comprises a ferromagnetic material/resin ratio ranging from about 1/80 to 6/1. In some embodiments, the ferromagnetic ink composition comprises a ferromagnetic material/resin ratio ranging from about 1/10 to 3/1. In some embodiments, the ferromagnetic ink composition comprises a ferromagnetic material/resin ratio ranging from about 1/5 to 2/1. In some embodiments, the ferromagnetic ink composition comprises a ferromagnetic material/resin ratio ranging from about 1/6 to about 6/1. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1. In some embodiments, the ferromagnetic ink composition is indirect food additives. In some embodiments, the indirect food additives are Generally Recognized as Safe (GRAS) substances.

In some embodiments, the indirect food additives are FDA-approved food additives, as listed by in Title 21 of the Code of Federal Regulations.

In some embodiments, the ferromagnetic ink composition is deposited in at least one layer. In some embodiments, the label is a transparent or translucent label. In some embodiments, the label is a translucent label. In some embodiments, the magnetizable coating or magnetizable marker is a transparent or translucent magnetizable coating or a transparent or translucent magnetizable marker. In some embodiments, the magnetizable coating or magnetizable marker is a transparent magnetizable coating or a transparent magnetizable marker. In some embodiments, change in haze values due to the application of the transparent or translucent coating on transparent or translucent label should be less than 9% and preferably, less than 5%. In some embodiments, overall haze values of label and coating combined should be less than 17% and preferably, less than 12%. In some embodiments, haze values are identified as measured using ASTM D1003-13: Standard Test Method for Haze and Luminous Transmittance of Transparent Plastics. In some embodiments, overall visible transmission values of label and coating combined should be greater than 82% and preferably, greater than 90%. In some embodiments, overall NIR transmission values of label and coating combined should be greater than 87% and preferably, greater than 90%. In some embodiments, application of the transparent or translucent coating should cause no change in the look of commercial artwork/graphics used on a printed label. In some embodiments, the change in the look of commercial art-work/graphics is a subjective measurement and is commonly done by assigning a numeric scale from 1-10 with 1 being no impact to the look of the label.

In some embodiments, the transparent or translucent label, the transparent or translucent magnetizable coating, or the transparent or translucent magnetizable marker are transparent to visible light and/or near infrared light (NIR). In some embodiments, the film is a multilayer film or a co-extruded film. In some embodiments, the multilayer film or the co-extruded film comprises at least 2 layers of films. In some embodiments, the multilayer film or the co-extruded film comprises from about at least 3 layers of films to about at most 12 layers of films. In some embodiments, the film is a polymer film. In some embodiments, the polymer film is a polyethylene (PE) film, a high density polyethylene (HDPE) film, a low density polyethylene (LDPE) film, a linear low density polyethylene (LLDPE) film, a polypropylene (PP) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof. In some embodiments, the polymer film is a polyethylene (PE) film, a high density polyethylene (HDPE) film, a low density polyethylene (LDPE) film, a linear low density polyethylene (LLDPE) film, an oriented polypropylene (OPP) film, a biaxially oriented polypropylene (BOPP) film, an oriented polystyrene (OPS) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof.

In some embodiments, the ionomer film is an ethylene acrylic acid copolymer (EAA) or an ethylene (meth)acrylic acid copolymer (EMAA). In some embodiments, the ferromagnetic ink composition is suitable for flexographic printing, gravure printing, intaglio printing, pad printing, screen printing, offset printing, or any combination thereof. In some embodiments, the polymeric material is polyethylene terephthalate (PET), polyester, polyethylene (PE), polycarbonate (PC), polystyrene (PS), polyvinyl chloride (PVC), post-consumer resin (PCR), styrene butadiene copolymer (SBC), high density polyethylene (HDPE), fluorine-treated HDPE, low density polyethylene (LDPE), linear low density polyethylene (LLDPE), polypropylene (PP), bioplastic, bisphenol-A (BPA), ethylene-vinyl alcohol (EVOH), polyamide (Nylon or PA), an ionomer, ethylene vinyl acetate (EVA), or any combination thereof.

Disclosed herein, in certain embodiments, are methods of fabricating a ferromagnetic substrate, the method comprising: a) printing a ferromagnetic ink composition on a surface of a film; and b) transferring the film onto a surface of a non-ferromagnetic substrate to produce the ferromagnetic substrate; wherein the ferromagnetic ink composition is a food contact substance.

In some embodiments, the method comprises flexographic printing, gravure printing, intaglio printing, pad printing, screen printing, offset printing, or any combination thereof. In some embodiments, the ferromagnetic substrate is a single-use bottle, a bottle cap, a single-use coffee cup, plastic cutlery, an eating utensil, a cutting utensil, a plastic tray, a plastic container, a food packaging container, or any combination thereof. In some embodiments, the substrate is an aluminum can. In some embodiments, the film is a label. In some embodiments, the film is a shrink sleeve label, a pressure sensitive label, a roll fed label, a wrap label, a stretch label, a cut and stack label, a shrink bundling film, or any combination thereof. In some embodiments, the weight of the ferromagnetic ink composition ranges from about 0.05% to 2% of the total weight of the ferromagnetic substrate. In some embodiments, the weight of the ferromagnetic ink composition ranges from about 0.05% to 2% of the total weight of the film. In some embodiments, the shrink sleeve label comprises less than about 5% difference in unrestrained shrinkage as compared to a shrink sleeve label that does not comprise a ferromagnetic material. In some embodiments, the ferromagnetic substrate or film is magnetized upon exposure to a magnetic field. In some embodiments, the ferromagnetic substrate or film is temporarily magnetized upon exposure to a magnetic field. In some embodiments, the ferromagnetic substrate or film or ink is magnetized upon exposure to a magnetic field. In some embodiments, the ferromagnetic substrate or film or ink is temporarily magnetized upon exposure to a magnetic field. In some embodiments, the ferromagnetic substrate or film is separated from a plurality of non-magnetic, paramagnetic, or diamagnetic objects when magnetized. In some embodiments, the ferromagnetic substrate or film is separated from a plurality of non-magnetic, paramagnetic, or diamagnetic objects when temporarily magnetized. In some embodiments, the ferromagnetic substrate or film or ink is separated from a plurality of non-magnetic, paramagnetic, or diamagnetic objects when magnetized. In some embodiments, the ferromagnetic substrate or film or ink is separated from a plurality of non-magnetic, paramagnetic, or diamagnetic objects when temporarily magnetized.

In some embodiments, the film is separated from the ferromagnetic substrate when magnetized. In some embodiments, the film is separated from the ferromagnetic substrate when temporarily magnetized. In some embodiments, the film or ink is separated from the ferromagnetic substrate when magnetized. In some embodiments, the film or ink is separated from the ferromagnetic substrate when temporarily magnetized. In some embodiments, the film comprises a plurality of flakes. In some embodiments, the magnetic field has a magnetic field strength of at least about 1,000 gauss (G). In some embodiments, the magnetic field has a magnetic field strength of at most about 1,000 gauss (G). In some embodiments, the magnetic field is produced by a magnetic separation device. In some embodiments, the magnetic separation device is a hand-held magnet, a commercial drum-type separator, an over-band magnetic separator, a magnetic head pulley, or any combination thereof. In some embodiments, the magnetic separation device has at least about 50% separation recovery. In some embodiments, the magnetic separation device has at least about 80% separation recovery. In some embodiments, the ferromagnetic ink composition comprises a ferromagnetic material, a resin, and a wetting and/or a dispersing agent. In some embodiments, the ferromagnetic ink composition comprises a ferromagnetic material, a resin, an anti-settling additive, and a wetting and/or a dispersing agent. In some embodiments, the anti-settling additive is fumed silica, polyamide derivatives, waxes or any combination thereof. In some embodiments, the ferromagnetic material comprises at least 20% of the weight of the ferromagnetic ink composition. In some embodiments, the ferromagnetic material comprises less than 20% of the weight of the ferromagnetic ink composition. In some embodiments, the ferromagnetic material comprises from 0.1% to 20% of the weight of the ferromagnetic ink composition. In some embodiments, the ferromagnetic material comprises from 0.1% to less than 20% of the weight of the ferromagnetic ink composition. In some embodiments, the ferromagnetic material is an ingestible ferromagnetic pigment. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel, aluminum, and/or copper. In some embodiments, the iron oxide is iron (III) oxide or iron (II, III) oxide. In some embodiments, the resin comprises at least 5% of the weight of the ferromagnetic ink composition.

In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof. In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof. In some embodiments, the ferromagnetic ink composition further comprises at least one solvent, wherein the solvent comprises at least 25% of the weight of the ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof. In some embodiments, the ferromagnetic ink composition comprises a ferromagnetic material/resin ratio ranging from about 1/80 to 6/1. In some embodiments, the ferromagnetic ink composition comprises a ferromagnetic material/resin ratio ranging from about 1/10 to 3/1. In some embodiments, the ferromagnetic ink composition comprises a ferromagnetic material/resin ratio ranging from about 1/5 to 2/1. In some embodiments, the ferromagnetic ink composition comprises a ferromagnetic material/resin ratio ranging from about 1/6 to about 6/1. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1. In some embodiments, the ferromagnetic ink composition is indirect food additives. In some embodiments, the indirect food additives are Generally Recognized as Safe (GRAS) substances. In some embodiments, the indirect food additives are FDA-approved food additives, as listed by in Title 21 of the Code of Federal Regulations. In some embodiments, the ferromagnetic ink composition is deposited in at least one layer. In some embodiments, the label is a transparent or translucent label. In some embodiments, the label is a translucent label. In some embodiments, the magnetizable coating or magnetizable marker is a transparent or translucent magnetizable coating or a transparent or translucent magnetizable marker. In some embodiments, the magnetizable coating or magnetizable marker is a transparent magnetizable coating or a transparent magnetizable marker. In some embodiments, change in haze values due to the application of the transparent or translucent coating on transparent or translucent label should be less than 9% and preferably, less than 5%. In some embodiments, overall haze values of label and coating combined should be less than 17% and preferably, less than 12%. In some embodiments, haze values are identified as measured using ASTM D1003-13: Standard Test Method for Haze and Luminous Transmittance of Transparent Plastics. In some embodiments, overall visible transmission values of label and coating combined should be greater than 82% and preferably, greater than 90%. In some embodiments, overall NIR transmission values of label and coating combined should be greater than 87% and preferably, greater than 90%. In some embodiments, application of the transparent or translucent coating should cause no change in the look of commercial artwork/graphics used on a printed label. In some embodiments, the change in the look of commercial art-work/graphics is a subjective measurement and is commonly done by assigning a numeric scale from 1-10 with 1 being no impact to the look of the label.

In some embodiments, the transparent or translucent label, the transparent or translucent magnetizable coating, or the transparent or translucent magnetizable marker are transparent or translucent to visible light and/or near infrared light (NIR). In some embodiments, the film is a multilayer film or a co-extruded film. In some embodiments, the multilayer film or the co-extruded film comprises at least 2 layers of films. In some embodiments, the multilayer film or the co-extruded film comprises from about at least 3 layers of films to about at most 12 layers of films. In some embodiments, the film is a polymer film. In some embodiments, the polymer film is a polyethylene (PE) film, a high density polyethylene (HDPE) film, a low density polyethylene (LDPE) film, a linear low density polyethylene (LLDPE) film, a polypropylene (PP) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof. In some embodiments, the polymer film is a polyethylene (PE) film, a high density polyethylene (HDPE) film, a low density polyethylene (LDPE) film, a linear low density polyethylene (LLDPE) film, an oriented polypropylene (OPP) film, a biaxially oriented polypropylene (BOPP) film, an oriented polystyrenes (OPS) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof. In some embodiments, the ionomer film is an ethylene acrylic acid copolymer (EAA) or an ethylene (meth)acrylic acid copolymer (EMAA). In some embodiments, the substrate comprises a polymeric material. In some embodiments, the polymeric material is polyethylene terephthalate (PET), polyester, polyethylene (PE), polycarbonate (PC), polystyrene (PS), polyvinyl chloride (PVC), post-consumer resin (PCR), styrene butadiene copolymer (SBC), high density polyethylene (HDPE), fluorine-treated HDPE, low density polyethylene (LDPE), linear low density polyethylene (LLDPE), polypropylene (PP), bioplastic, bisphenol-A (BPA), ethylene-vinyl alcohol (EVOH), polyamide (Nylon or PA), an ionomer, ethylene vinyl acetate (EVA), or any combination thereof.

In an aspect, the present disclosure provides a ferromagnetic material film comprising: a film comprising a ferromagnetic ink composition. In some embodiments, the ferromagnetic ink composition of the ferromagnetic material film comprises a ferromagnetic material, a resin, and a wetting and/or a dispersing agent. In some embodiments, the ferromagnetic ink composition comprises a ferromagnetic material, a resin, an anti-settling additive, and a wetting and/or a dispersing agent. In some embodiments, the anti-settling additive is fumed silica, polyamide derivatives, waxes or any combination thereof. In some embodiments, the ferromagnetic material comprises at least 20% of the weight of said ferromagnetic ink composition. In some embodiments, the ferromagnetic material comprises less than 20% of the weight of the ferromagnetic ink composition. In some embodiments, the ferromagnetic material comprises from 0.1% to 20% of the weight of the ferromagnetic ink composition. In some embodiments, the ferromagnetic material comprises from 0.1% to less than 20% of the weight of the ferromagnetic ink composition. In some embodiments, the ferromagnetic material is an ingestible ferromagnetic pigment. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy comprises cobalt, vanadium manganese, molybdenum, silicon, nickel, boron, aluminum, copper, or any combination thereof. In some embodiments, the iron oxide is iron (III) oxide or iron (II, III) oxide. In some embodiments, the resin comprises at least 5% of the weight of said ferromagnetic ink composition. In some embodiments, the resin is a vinyl chloride vinyl acetate co-polymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof. In some embodiments, the wetting and/or said dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof.

In some embodiments, the ferromagnetic ink composition of the ferromagnetic material film further comprises at least one solvent, wherein said solvent comprises at least 25% of the weight of said ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof. In some embodiments, the ferromagnetic ink composition comprises a ferromagnetic material/resin ratio ranging from about 1/80 to 6/1. In some embodiments, the ferromagnetic ink composition comprises a ferromagnetic material/resin ratio ranging from about 1/10 to 3/1. In some embodiments, the ferromagnetic ink composition comprises a ferromagnetic material/resin ratio ranging from about 1/5 to 2/1. In some embodiments, the ferromagnetic ink composition comprises a ferromagnetic material/resin ratio ranging from about 1/6 to about 6/1. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1. In some embodiments, all components of the ferromagnetic ink composition are indirect food additives. In some embodiments, the indirect food additives are Generally Recognized as Safe (GRAS) substances. In some embodiments, the indirect food additives are FDA-approved food additives, as listed by in Title 21 of the Code of Federal Regulations.

In some embodiments, the film of the ferromagnetic material film is printed with the ferromagnetic ink composition. In some embodiments, the ferromagnetic ink composition is deposited in at least one layer. In some embodiments, the film is a food contact substance. In some embodiments, the film is a label. In some embodiments, the label is a self-adhesive label. In some embodiments, the film is a shrink sleeve label, a pressure sensitive label, a roll fed label, a wrap label, a stretch label, a cut and stack label, a shrink bundling film, or any combination thereof. In some embodiments, the shrink sleeve label comprises less than about 5% difference in unrestrained shrinkage as compared to a shrink sleeve label that does not comprise said ferromagnetic ink composition. In some embodiments, the weight of said ferromagnetic material ranges from about 0.05% to 2% of the total mass of said film.

In some embodiments, the film ferromagnetic material film is magnetized upon exposure to a magnetic field. In some embodiments, the film ferromagnetic material film is temporarily magnetized upon exposure to a magnetic field. In some embodiments, the film is separated from a plurality of non-magnetic, paramagnetic, or diamagnetic objects when magnetized. In some embodiments, the film is separated from a plurality of non-magnetic, paramagnetic, or diamagnetic objects when temporarily magnetized. In some embodiments, the film is separated from said substrate when magnetized. In some embodiments, the film is separated from said substrate when temporarily magnetized. In some embodiments, the film comprises a plurality of flakes.

In some embodiments, the magnetic field has a magnetic field strength of at least about 1,000 gauss (G). In some embodiments, the magnetic field has a magnetic field strength of at most about 1,000 gauss (G). In some embodiments, the magnetic field is produced by a magnetic separation device. In some embodiments, the magnetic separation device is a hand-held magnet, a commercial drum-type separator, an over-band magnetic separator, a magnetic head pulley, or any combination thereof. In some embodiments, the magnetic separation device has at least about 50% separation recovery. In some embodiments, the magnetic separation device has at least about 80% separation recovery.

In some embodiments, the label of the ferromagnetic material film is a transparent or translucent label. In some embodiments, the transparent or translucent label is transparent or translucent to visible light and/or near infrared light (NIR). In some embodiments, the film is a multilayer film or a co-extruded film. In some embodiments, the multilayer film or said co-extruded film comprises at least 2 layers of films. In some embodiments, the multilayer film or said co-extruded film comprises from about at least 3 layers of films to about at most 12 layers of films. In some embodiments, the film is a polymer film. In some embodiments, the polymer film is a polyethylene (PE) film, a high density polyethylene (HDPE) film, a low density polyethylene (LDPE) film, a linear low density polyethylene (LLDPE) film, a polypropylene (PP) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof. In some embodiments, the polymer film is a polyethylene (PE) film, a high density polyethylene (HDPE) film, a low density polyethylene (LDPE) film, a linear low density polyethylene (LLDPE) film, an oriented polypropylene (OPP) film, a biaxially oriented polypropylene (BOPP) film, an oriented polystyrene (OPS) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof. In some embodiments, the ionomer film is an ethylene acrylic acid copolymer (EAA) or an ethylene (meth)acrylic acid copolymer (EMAA).

In some embodiments, the ferromagnetic ink composition of the ferromagnetic material film is suitable for flexographic printing, gravure printing, intaglio printing, pad printing, screen printing, off-set printing, or any combination thereof. In some embodiments, the film is printed with said ferromagnetic ink composition by flexographic printing, gravure printing, intaglio printing, pad printing, screen printing, offset printing, or any combination thereof. In some embodiments, the ferromagnetic material film is configured to be affixed to a surface of an aluminum can, a single-use bottle, a bottle cap, a single-use coffee cup, plastic cutlery, an eating utensil, a cutting utensil, a plastic tray, a plastic container, a food packaging container, or any combination thereof.

In an aspect, the present disclosure provides a method of manufacturing the substrate or the ferromagnetic material film as described herein.

INCORPORATION BY REFERENCE

All publications, patents, and patent applications mentioned in this specification are herein incorporated by reference to the same extent as if each individual publication, patent, or patent application was specifically and individually indicated to be incorporated by reference, and as if set forth in their entireties. In the event of a conflict between a term as used herein and the term as defined in the incorporated reference, the definition of this disclosure controls.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 2A illustrates a direct coating of the surface of the object with the ferromagnetic ink. FIG. 2B illustrates microwells on the surface of the object coated with the ferromagnetic ink. FIG. 2C illustrates a saw tooth design on the surface of the object coated with the ferromagnetic ink. FIG. 2D illustrates an embossed design coated with the ferromagnetic ink.

FIG. 4A illustrates an example of a film. FIG. 4B illustrates an example of a plastic object on which a ferromagnetic marker is to be printed on it.

DETAILED DESCRIPTION

Figure 1:
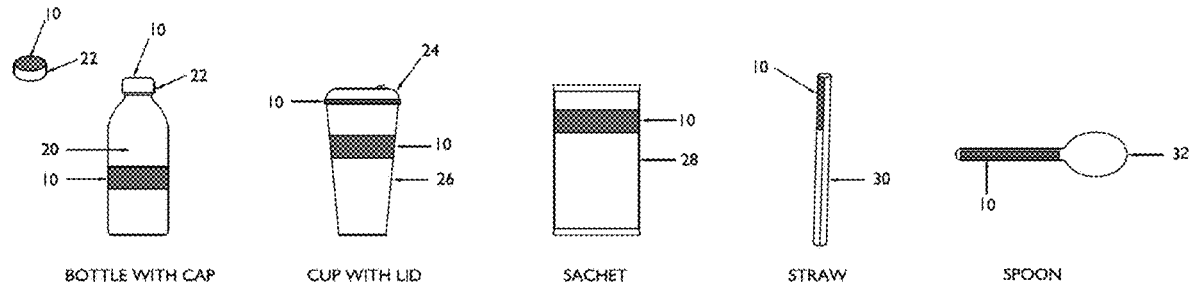
FIG. 1 illustrates examples of objects comprising the ferromagnetic ink.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The terminology used herein is for the purpose of describing particular cases only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The term "about" or "approximately" refers to an amount that is near the stated amount by about 99%, 95%, 80%, 50%, 10%, 5%, or 1%, including increments therein. For example, "about" or "approximately" can mean a range including the particular value and ranging from 10% below that particular value and spanning to 10% above that particular value.

The term "recyclate," as used herein, generally refers to a raw material that is sent to, and processed in a waste recycling plant or materials recovery facility (MRF) which can be used to form new products. The recyclates can be collected via various methods and delivered to a facility where it undergoes re-manufacturing so that it can be used in the production of new materials or products. The recyclates may be, for example, a plastic object, a non-metallic object, a metallic object, a single-use bottle, a bottle cap, a single-use coffee cup, plastic cutlery, an eating utensil, a cutting utensil, a plastic tray, a plastic container, a food packaging container, a shrink sleeve, or any combinations thereof.

The term "small object," as used herein, generally refers to an object measuring about 4 inches in any one dimension.

The term "ferromagnetic ink," as used herein, generally refers to a magnetizable ink composition.

The term "ferromagnetic marker," as used herein, generally refers to and is used interchangeably with the term "ferromagnetic label."

The term "ferromagnetic element," as used herein, generally refers to a ferromagnetic ink and can include, for example, a self-adhesive label. In other cases, the ferromagnetic element can include a ferromagnetic ink, a release varnish, and an adhesive varnish. In yet another case, the ferromagnetic element can include a ferromagnetic ink that is directly printed onto an object.

The term "unadulterated iron powder," as used herein, generally refers to a high purity iron powder comprising at least 99.5% iron.

The term "non magnetic" or "non-magnetic," as used herein, generally refers to non-reactive or little reactive to magnetic fields. For example, non-magnetic materials are not attracted towards a magnet. The term "non magnetic" or "non-magnetic," as used herein, for instance includes the meanings of paramagnetic and diamagnetic. Examples of paramagnetic materials include, but are not limited to, aluminum, oxygen, titanium, iron oxide, magnesium, molybdenum, lithium, platinum, tungsten, zirconium, and tantalum. Examples of diamagnetic materials include, but are not limited to, hydrogen, gold, carbon, copper, iodine, mercury, silver, tin, and zinc.

The term "indirect food additive," as used herein, generally refers to a substance or material that may come into contact with food as part of packaging or processing equipment, but are not intended to be added directly to food.

The term "food contact substance," as used herein, generally refers to a substance or material that is intended for use as a component in manufacturing, packing, packaging, transporting, or holding food wherein such use is not intended to have any technical effect in such food. For example, the food contact substance is a plastic object. Non-limiting, additional examples of a food contact substance include a plastic bottle, a bottle cap, a single-use coffee cup, plastic cutlery, an eating utensil, a cutting utensil, a plastic tray, a plastic container, a food packaging container, and a shrink sleeve.

The term "separation recovery," as used herein, generally refers to the recovery of an object (e.g., a substrate) after separating it from a mixture of waste stream.

The term "burden depth," as used herein generally refers to the amount of material (height of material in inches) between the surface of the substrate to be sorted and the magnetic separator.

Waste Sorting

During the course of a lifetime, an individual may generate up to 600 times their weight in waste materials. Consequently, there has been an increasing focus on reducing, reusing, and recycling since the 1970s. Recycling is a key component of modern day waste reduction. A number of different systems have been implemented to collect recyclates from the general waste stream. Once the recyclates are collected and delivered to a central collection facility, such as a materials recovery facility (MRF), the different types of collected materials must undergo sorting. Automated machinery such as disk screens and air classifiers separate the recyclates such as plastics and paper by weight. In addition, commercial magnetic separators separate out ferrous metals, such as iron, steel, and tin cans.

Non-durable plastic goods that are discarded in waste streams often need to be retrieved and sorted before recycling. While advances in optical sensing have automated the process of sorting plastic objects into respective resin-type, the process of retrieval is often manual and inefficient. The problem is especially acute for small-format and/or lightweight plastic packaging items. Small plastic items (i.e., less than about 4 inches in any dimension) may be unable to be sorted out from a pool of recyclates and/or from a waste stream, and consequently, may be unable to be recycled (i.e., may be placed in a landfill) due to their size. Furthermore, unsorted small plastic items can contaminate glass or other sorted material waste streams. Currently, there does not exist a method to retrieve plastic objects in the waste stream through the process of magnetic separation.

Non-durable plastic goods such as packaging often have graphics or information displayed on them. This is done by either printing on them either directly or by means of a pre-printed label. Such designs or prints often have functional uses. A common example is a barcode pre-printed label affixed on a plastic object which is used to identify the object in a warehouse or retail store. However, no labels or prints currently exist to enable mechanical separation of such plastic objects under a magnetic field.

Recognized herein are various issues with previously described methods of waste and/or recyclate sorting. Such methods may be limited by an inability to sort and/or recycle small objects such as non-metallic objects, an inability identify small objects from a waste stream (e.g., by use of a label or a graphic design), and an inability to retrieve small objects such as non-metallic and/or non-magnetic, paramagnetic, or diamagnetic objects through a magnetic separation process. The present disclosure addresses these issues.

Ferromagnetic Ink Compositions

In an aspect, the present disclosure provides a ferromagnetic ink composition. In some embodiments, the ferromagnetic ink composition comprises a ferromagnetic material, a resin, and at least one of a wetting agent and a dispersing agent.

In some embodiments, the ferromagnetic ink composition is safe for food contact. In some embodiments, the ferromagnetic ink composition is a food contact substance. In some embodiments, all elements of the ferromagnetic ink composition are FDA-approved food additives as listed in Title 21 of the Code of Federal Regulations (see sections 175-178). In some embodiments, all elements of the ferromagnetic ink composition are selected from the list of generally recognized as safe (GRAS) substances, as listed by the Food and Drug Safety Administration (FDA) in Title 21 of the Code of Federal Regulations (CFR) (see sections 182, 184, 186). In some embodiments, the ferromagnetic ink composition is safe to be in contact with foodstuffs. In some embodiments, the ferromagnetic ink composition is a "generally recognized as safe" (GRAS) composition. In some embodiments, the ferromagnetic ink composition is capable of direct or indirect contact with foodstuffs.

Figures 2A, 2B, 2C, 2D:
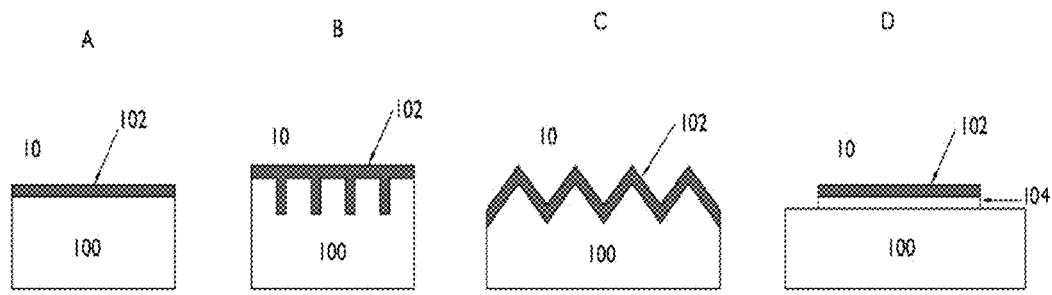
FIGS. 2A, 2B, 2C, and 2D illustrate examples of different types of surface modifications.

The present disclosure describes the chemical composition of a ferromagnetic ink. Referring to FIG. 2A-FIG. 2D, the ferromagnetic ink 102 can be printed on the surface of a plastic object 100 directly or on labels 104. FIG. 2A illustrates a direct coating of the surface of the plastic object 100 with a ferromagnetic label 10 comprising the ferromagnetic ink 102. FIG. 2B illustrates microwells on the surface of the plastic object 100 with a ferromagnetic label 10 subsequently coated with the ferromagnetic ink 102. FIG. 2C illustrates a saw tooth design on the surface of the plastic object 100 coated with a ferromagnetic label 10 comprising the ferromagnetic ink 102. FIG. 2D illustrates a label 104 placed on the surface of the plastic object 100. The label 104 is shown to be coated with the ferromagnetic ink 102; thus, forming a ferromagnetic label 10. In some embodiments, the labels 104 can be subsequently affixed on a plastic object and/or a plastic film. In some embodiments, the ferromagnetic markers are transferred on the surface of the plastic object 100 by any technique known to the skilled artisan.

The present disclosure relates the use of soft ferromagnetic pigments in inks, which imparts temporary magnetic behavior under the influence of a magnetic field. A range of suitable solid phase soft-magnetic, low coercivity materials can be used to impart such ferromagnetic behavior. Non-limiting examples include unadulterated iron powder (includes electrolytic iron, atomized iron, reduced iron) carbonyl iron, carbonyl cobalt, carbonyl nickel, iron alloys (including cobalt, vanadium manganese, molybdenum, silicon, nickel, boron, aluminum, copper), iron oxides (including $Fe_2O_3$, $Fe_3O_4$), low carbon steel grades, nickel, cobalt, ferritic stainless steel and atomized stainless steel. In some embodiments, the iron alloy is a crystalline or an amorphous metallic alloy comprising cobalt, vanadium manganese, molybdenum, silicon, nickel, boron, aluminum, copper, or any combination thereof. In order to be used as a pigment in the formulation of a ferromagnetic ink, such ferromagnetic pigment would be preferably used in the form of dry powder with sizes below 100 micrometers (μm) and most suitably below 10 micrometers (μm).

In some embodiments, the ferromagnetic pigment sizes preferably range from 0.5-5 micrometers (μm). In some embodiments, the ferromagnetic pigment size ranges from about 0.1 μm to about 10 μm. In some embodiments, the ferromagnetic pigment size ranges from about 0.1 μm. In some embodiments, the ferromagnetic pigment size ranges from about 10 μm. In some embodiments, the ferromagnetic pigment size ranges from about 0.1 μm to about 0.5 μm, about 0.1 μm to about 0.6 μm, about 0.1 μm to about 0.7 μm, about 0.1 μm to about 0.8 μm, about 0.1 μm to about 0.9 μm, about 0.1 μm to about 1 μm, about 0.1 μm to about 2 μm, about 0.1 μm to about 3 μm, about 0.1 μm to about 4 μm, about 0.1 μm to about 5 μm, about 0.1 μm to about 10 μm, about 0.5 μm to about 0.6 μm, about 0.5 μm to about 0.7 μm, about 0.5 μm to about 0.8 μm, about 0.5 μm to about 0.9 μm, about 0.5 μm to about 1 μm, about 0.5 μm to about 2 μm, about 0.5 μm to about 3 μm, about 0.5 μm to about 4 μm, about 0.5 μm to about 5 μm, about 0.5 μm to about 10 μm, about 0.6 μm to about 0.7 μm, about 0.6 μm to about 0.8 μm, about 0.6 μm to about 0.9 μm, about 0.6 μm to about 1 μm, about 0.6 μm to about 2 μm, about 0.6 μm to about 3 μm, about 0.6 μm to about 4 μm, about 0.6 μm to about 5 μm, about 0.6 μm to about 10 μm, about 0.7 μm to about 0.8 μm, about 0.7 μm to about 0.9 μm, about 0.7 μm to about 1 μm, about 0.7 µm to about 2 µm, about 0.7 µm to about 3 µm, about 0.7 µm to about 4 µm, about 0.7 µm to about 5 µm, about 0.7 µm to about 10 µm, about 0.8 µm to about 0.9 µm, about 0.8 µm to about 1 µm, about 0.8 µm to about 2 µm, about 0.8 µm to about 3 µm, about 0.8 µm to about 4 µm, about 0.8 µm to about 5 µm, about 0.8 µm to about 10 µm, about 0.9 µm to about 1 µm, about 0.9 µm to about 2 µm, about 0.9 µm to about 3 µm, about 0.9 µm to about 4 µm, about 0.9 µm to about 5 µm, about 0.9 µm to about 10 µm, about 1 µm to about 2 µm, about 1 µm to about 3 µm, about 1 µm to about 4 µm, about 1 µm to about 5 µm, about 1 µm to about 10 µm, about 2 µm to about 3 µm, about 2 µm to about 4 µm, about 2 µm to about 5 µm, about 2 µm to about 10 µm, about 3 µm to about 4 µm, about 3 µm to about 5 µm, about 3 µm to about 10 µm, about 4 µm to about 5 µm, about 4 µm to about 10 µm, or about 5 µm to about 10 µm. In some embodiments, the ferromagnetic pigment size ranges from about 0.1 µm, about 0.5 µm, about 0.6 µm, about 0.7 µm, about 0.8 µm, about 0.9 µm, about 1 µm, about 2 µm, about 3 µm, about 4 µm, about 5 µm, or about 10 µm.

In some embodiments, the ferromagnetic material comprises at least 1% of the weight of the ferromagnetic ink composition. In some embodiments, the ferromagnetic material comprises at least 5% of the weight of the ferromagnetic ink composition. In some embodiments, the ferromagnetic material comprises at least 10% of the weight of the ferromagnetic ink composition. In some embodiments, the ferromagnetic material comprises at least 20% of the weight of the ferromagnetic ink composition. In some embodiments, the ferromagnetic material comprises at least 25% of the weight of the ferromagnetic ink composition. In some embodiments, the ferromagnetic material comprises about 30% of the weight of the ferromagnetic ink composition. In some embodiments, the ferromagnetic material comprises at least 40% of the weight of the ferromagnetic ink composition. In some embodiments, the ferromagnetic material comprises about 1% to about 90% of the weight of the ferromagnetic ink composition. In some embodiments, the ferromagnetic material comprises at least about 1% of the weight of the ferromagnetic ink composition. In some embodiments, the ferromagnetic material comprises at most about 90% of the weight of the ferromagnetic ink composition. In some embodiments, the ferromagnetic material comprises less than 20% of the weight of the ferromagnetic ink composition. In some embodiments, the ferromagnetic material comprises from 0.1% to 20% of the weight of the ferromagnetic ink composition. In some embodiments, the ferromagnetic material comprises from 0.1% to less than 20% of the weight of the ferromagnetic ink composition.

In some embodiments, the ferromagnetic material comprises about 1% to about 10%, about 1% to about 20%, about 1% to about 30%, about 1% to about 40%, about 1% to about 50%, about 1% to about 60%, about 1% to about 70%, about 1% to about 80%, about 1% to about 90%, about 10% to about 20%, about 10% to about 30%, about 10% to about 40%, about 10% to about 50%, about 10% to about 60%, about 10% to about 70%, about 10% to about 80%, about 10% to about 90%, about 20% to about 30%, about 20% to about 40%, about 20% to about 50%, about 20% to about 60%, about 20% to about 70%, about 20% to about 80%, about 20% to about 90%, about 30% to about 40%, about 30% to about 50%, about 30% to about 60%, about 30% to about 70%, about 30% to about 80%, about 30% to about 90%, about 40% to about 50%, about 40% to about 60%, about 40% to about 70%, about 40% to about 80%, about 40% to about 90%, about 50% to about 60%, about 50% to about 70%, about 50% to about 80%, about 50% to about 90%, about 60% to about 70%, about 60% to about 80%, about 60% to about 90%, about 70% to about 80%, about 70% to about 90%, or about 80% to about 90% of the weight of the ferromagnetic ink composition. In some embodiments, the ferromagnetic material comprises about 1%, about 10%, about 20%, about 30%, about 40%, about 50%, about 60%, about 70%, about 80%, or about 90% of the weight of the ferromagnetic ink composition.

In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel, aluminum, and/or copper. In some embodiments, the iron alloy is a crystalline or an amorphous metallic alloy comprising cobalt, vanadium manganese, molybdenum, silicon, nickel, boron, aluminum, and/or copper, or any combination thereof. In some embodiments, the iron oxide is iron (III) oxide or iron (II, III) oxide. In some embodiments, the ferromagnetic material is a soft ferromagnetic material with small particle sizes ranging from 0.5-5 micrometers (µm).

In some embodiments, the particle size distribution of the magnetic materials is maintained such that the D90 size lies between 2-20 microns and the D50 size lies between 1-10 microns. In some embodiments, the D90 size lies between 5-10 microns. The term "D50," as used herein, is also known as the median diameter or the medium value of the particle size distribution and refers to the value of the particle diameter at 50% in the cumulative distribution. The term "D90," as used herein refers to the diameter where ninety percent of the distribution has a smaller particle size and ten percent has a larger particle size. In some embodiments, the particle morphology of the magnetic materials is controlled to obtain spherical particles. The sphericity of the object is determined using SEM (scanning electron microscope) measurements of the magnetic particles. The term "scanning electron microscope (SEM)," as used herein, refers to a type of electron microscope that produces images of a sample by scanning the surface with a focused beam of electrons. The electrons interact with atoms in the sample, producing various signals that contain information about the surface topography and composition of the sample.

In some embodiments, the particles include alloys of iron with cobalt, vanadium manganese, molybdenum, silicon, nickel, boron, aluminum, copper, or any combination thereof. In some embodiments, the iron alloy comprises the composition of Fe=70-98% and Si=2-30%. In some embodiments, the iron alloy comprises the composition of Fe=70-87%, Si=2-15% and Al=10-18%. In some embodiments, the iron alloy comprises the composition of Fe=10-90% and Co=10-90%. In some embodiments, the iron alloy comprises the composition of Fe=10-50%, Co=50-90% and Al=1-10%. In some embodiments, the iron alloy comprises the composition of Fe=10-50% and Ni=50-90%. In some embodiments, the iron alloy comprises the composition of Fe=8-50%, Ni=50-90% and Mo=1-10%. In some embodiments, the iron alloy comprises the composition of Fe=60-90%, Cu=10-15% and Si=15-25%.

In some embodiments, the magnetic particle is processed or modified to improve magnetic properties. In some embodiments, the magnetic properties are magnetic saturation and/or magnetic permeability. In some embodiments, the magnetic particle is modified by physical processing like milling and grinding using a ball mill or a planetary ball mill to obtain particle sizes and morphologies as described herein. In some embodiments, the magnetic particle is modified by heat treatment of magnetic powders at temperatures of at least 500° C. and up to 1300° C. using a reducing, inert or vacuum atmosphere conditions to reduce impurities in the powders. In some embodiments, the magnetic particle is modified by using magnetic fields during heat treatment to achieve further improvement in crystal structure of particles and as a result their magnetic properties. In some embodiments, the magnetic particle is modified by using special techniques to avoid sintering of the powders typically observed during high temperature processing of the powders, for example, through heat treatment in a fluidized bed. In some embodiments, the magnetic particle is modified by a combination of techniques as described above.

In some embodiments, the thickness/density of the ink/coating printed on the film/substrate (print thickness/density of the ferromagnetic ink onto the label) is less than 6 grams per square meter. In some embodiments, the thickness/density of the ink/coating printed on the film/substrate (print thickness/density of the ferromagnetic ink onto the label) is between 0.5 and 3 gram per square meter. In some embodiments, the thickness/density of the ink/coating printed on the film/substrate (print thickness/density of the ferromagnetic ink onto the label) is between 0.5 and 2 grams per square meter.

In some embodiments, by using the magnetic materials as described above, the change in haze values due to the application of the ferromagnetic ink/coating/marker or the magnetizable coating/marker on a transparent or translucent label or the application of the transparent or translucent label, the magnetizable coating or the magnetizable marker is less than 9% and preferably, less than 5%. In some embodiments, by using the magnetic materials as described above, the overall haze values of the transparent or translucent label, the transparent or translucent label comprising the ferromagnetic material, the transparent or translucent magnetizable coating, or the transparent or translucent magnetizable marker is less than 17% and preferably, less than 12%. The haze values, as used herein, are measured using ASTM D1003-13, which is a standard test method for haze and luminous transmittance of transparent plastics. In some embodiments, by using the magnetic materials as described above, the overall visible (400-800 nm) transmission values of the transparent or translucent label, the transparent or translucent label comprising the ferromagnetic material, the transparent or translucent magnetizable coating, or the transparent or translucent magnetizable marker is greater than 82% and preferably, greater than 90%. In some embodiments, by using the magnetic materials as described above, the overall NIR (near infrared, 750-1500 nm) transmission values of the transparent or translucent label, the transparent or translucent magnetizable coating, or the transparent or translucent magnetizable marker is greater than 87% and preferably, greater than 90%. In some embodiments, by using the magnetic materials as described above, application of the transparent or translucent label, the transparent or translucent label comprising the ferromagnetic material, the transparent or translucent magnetizable coating, or the transparent or translucent magnetizable marker causes no change in the look of commercial art-work/graphics used on a printed label. In some embodiments, the change in the look of commercial art-work/graphics is represented as a subjective measurement and is commonly done by assigning a numeric scale from 1-10 with 1 being no impact to the look of the label.

In some embodiments, the term "transparent" as used herein refers to allowing light to pass through so that objects behind can be distinctly seen. In some embodiments, the term "translucent" as used herein refers to allowing light, but not detailed shapes, to pass through; semitransparent.

In some embodiments, the resin comprises about 5% of the weight of the ferromagnetic ink composition. In some embodiments, the resin comprises about 10% of the weight of the ferromagnetic ink composition. In some embodiments, the resin comprises about 0.5% to about 70%. In some embodiments, the resin comprises at least about 0.5% of the weight of the ferromagnetic ink composition. In some embodiments, the resin comprises at most about 70% of the weight of the ferromagnetic ink composition. In some embodiments, the resin comprises about 0.5% to about 1%, about 0.5% to about 5%, about 0.5% to about 10%, about 0.5% to about 15%, about 0.5% to about 20%, about 0.5% to about 25%, about 0.5% to about 30%, about 0.5% to about 40%, about 0.5% to about 50%, about 0.5% to about 60%, about 0.5% to about 70%, about 1% to about 5%, about 1% to about 10%, about 1% to about 15%, about 1% to about 20%, about 1% to about 25%, about 1% to about 30%, about 1% to about 40%, about 1% to about 50%, about 1% to about 60%, about 1% to about 70%, about 5% to about 10%, about 5% to about 15%, about 5% to about 20%, about 5% to about 25%, about 5% to about 30%, about 5% to about 40%, about 5% to about 50%, about 5% to about 60%, about 5% to about 70%, about 10% to about 15%, about 10% to about 20%, about 10% to about 25%, about 10% to about 30%, about 10% to about 40%, about 10% to about 50%, about 10% to about 60%, about 10% to about 70%, about 15% to about 20%, about 15% to about 25%, about 15% to about 30%, about 15% to about 40%, about 15% to about 50%, about 15% to about 60%, about 15% to about 70%, about 20% to about 25%, about 20% to about 30%, about 20% to about 40%, about 20% to about 50%, about 20% to about 60%, about 20% to about 70%, about 25% to about 30%, about 25% to about 40%, about 25% to about 50%, about 25% to about 60%, about 25% to about 70%, about 30% to about 40%, about 30% to about 50%, about 30% to about 60%, about 30% to about 70%, about 40% to about 50%, about 40% to about 60%, about 40% to about 70%, about 50% to about 60%, about 50% to about 70%, or about 60% to about 70% of the weight of the ferromagnetic ink composition. In some embodiments, the resin comprises about 0.5%, about 1%, about 5%, about 10%, about 15%, about 20%, about 25%, about 30%, about 40%, about 50%, about 60%, or about 70% of the weight of the ferromagnetic ink composition.

In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof. In some embodiments, the resin is a mixture of vinyl chloride, vinyl acetate co-polymers, and acrylic resins. In some embodiments, the resin is a mixture of vinyl acetate co-polymers and acrylic resins. In some embodiments, the resin is a mixture of vinyl chloride and acrylic resins. In some embodiments, the resin is a mixture of vinyl chloride and vinyl acetate co-polymers.

In some embodiments, a wetting and/or a dispersing agent solves potential printing issues and/or reduced magnetic strength overtime caused by a heavy thixotropic rheology of the ferromagnetic ink and/or a soft settling of ferromagnetic pigments upon aging of the ferromagnetic ink. In some embodiments, the ferromagnetic ink comprises an anti-settling agent. In some embodiments, the wetting, dispersing, and/or anti-settling agent comprises a carboxyl functionality. In some embodiments, the wetting, dispersing, and/or anti-settling agent comprises a hydroxyl functionality. In some embodiments, the wetting, dispersing, and/or anti-settling agent comprises an amphoteric functionality. In some embodiments, the wetting, dispersing, and/or anti-settling agent is amine-based. In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof.

An "anti-settling agent" as used herein refers to an agent used for preventing the formation of hard deposit, or the settlement of pigments or other solid particles, for example, in coating compositions. The anti-settling agent helps in eliminating the heavy settling of coating compositions. In some embodiments, the anti-settling additive is fumed silica, polyamide derivatives, waxes or any combination thereof.

In some embodiments, the ferromagnetic ink composition comprises a wetting and/or dispersing agent. In some embodiments, the wetting and/or dispersing agent comprises about 1% of the weight of the ferromagnetic ink composition. In some embodiments, the wetting and/or dispersing agent comprises about 2% of the weight of the ferromagnetic ink composition. In some embodiments, the wetting and/or dispersing agent comprises about 3% of the weight of the ferromagnetic ink composition. In some embodiments, the wetting and/or dispersing agent comprises about 4% of the weight of the ferromagnetic ink composition. In some embodiments, the wetting and/or dispersing agent comprises about 5% of the weight of the ferromagnetic ink composition. In some embodiments, the wetting and/or dispersing agent comprises about 0.5% to about 50% of the weight of the ferromagnetic ink composition. In some embodiments, the wetting and/or dispersing agent comprises at least about 0.5% of the weight of the ferromagnetic ink composition. In some embodiments, the wetting and/or dispersing agent comprises at most about 50% of the weight of the ferromagnetic ink composition. In some embodiments, the wetting and/or dispersing agent comprises about 0.5% to about 1%, about 0.5% to about 2%, about 0.5% to about 3%, about 0.5% to about 4%, about 0.5% to about 5%, about 0.5% to about 10%, about 0.5% to about 15%, about 0.5% to about 20%, about 0.5% to about 30%, about 0.5% to about 40%, about 0.5% to about 50%, about 1% to about 2%, about 1% to about 3%, about 1% to about 4%, about 1% to about 5%, about 1% to about 10%, about 1% to about 15%, about 1% to about 20%, about 1% to about 30%, about 1% to about 40%, about 1% to about 50%, about 2% to about 3%, about 2% to about 4%, about 2% to about 5%, about 2% to about 10%, about 2% to about 15%, about 2% to about 20%, about 2% to about 30%, about 2% to about 40%, about 2% to about 50%, about 3% to about 4%, about 3% to about 5%, about 3% to about 10%, about 3% to about 15%, about 3% to about 20%, about 3% to about 30%, about 3% to about 40%, about 3% to about 50%, about 4% to about 5%, about 4% to about 10%, about 4% to about 15%, about 4% to about 20%, about 4% to about 30%, about 4% to about 40%, about 4% to about 50%, about 5% to about 10%, about 5% to about 15%, about 5% to about 20%, about 5% to about 30%, about 5% to about 40%, about 5% to about 50%, about 10% to about 15%, about 10% to about 20%, about 10% to about 30%, about 10% to about 40%, about 10% to about 50%, about 15% to about 20%, about 15% to about 30%, about 15% to about 40%, about 15% to about 50%, about 20% to about 30%, about 20% to about 40%, about 20% to about 50%, about 30% to about 40%, about 30% to about 50%, or about 40% to about 50% of the weight of the ferromagnetic ink composition. In some embodiments, the wetting and/or dispersing agent comprises about 0.5%, about 1%, about 2%, about 3%, about 4%, about 5%, about 10%, about 15%, about 20%, about 30%, about 40%, or about 50% of the weight of the ferromagnetic ink composition.

In some embodiments, the ferromagnetic ink composition further comprises at least one solvent. In some embodiments, at least one solvent is safe for food contact. In some embodiments, at least one solvent is a food contact substance. In some embodiments, the solvent comprises at least 25% of the weight of the ferromagnetic ink composition. In some embodiments, the solvent comprises about 50% of the weight of the ferromagnetic ink composition. In some embodiments, the solvent comprises about 55% of the weight of the ferromagnetic ink composition. In some embodiments, the solvent comprises about 56% of the weight of the ferromagnetic ink composition. In some embodiments, the solvent comprises about 57% of the weight of the ferromagnetic ink composition. In some embodiments, the solvent comprises about 58% of the weight of the ferromagnetic ink composition. In some embodiments, the solvent comprises about 59% of the weight of the ferromagnetic ink composition. In some embodiments, the solvent comprises about 60% of the weight of the ferromagnetic ink composition. In some embodiments, the solvent comprises about 5% to about 90% of the weight of the ferromagnetic ink composition. In some embodiments, the solvent comprises at least about 5% of the weight of the ferromagnetic ink composition. In some embodiments, the solvent comprises at most about 90%. In some embodiments, the solvent comprises about 5% to about 10%, about 5% to about 20%, about 5% to about 30%, about 5% to about 40%, about 5% to about 50%, about 5% to about 55%, about 5% to about 60%, about 5% to about 65%, about 5% to about 70%, about 5% to about 80%, about 5% to about 90%, about 10% to about 20%, about 10% to about 30%, about 10% to about 40%, about 10% to about 50%, about 10% to about 55%, about 10% to about 60%, about 10% to about 65%, about 10% to about 70%, about 10% to about 80%, about 10% to about 90%, about 20% to about 30%, about 20% to about 40%, about 20% to about 50%, about 20% to about 55%, about 20% to about 60%, about 20% to about 65%, about 20% to about 70%, about 20% to about 80%, about 20% to about 90%, about 30% to about 40%, about 30% to about 50%, about 30% to about 55%, about 30% to about 60%, about 30% to about 65%, about 30% to about 70%, about 30% to about 80%, about 30% to about 90%, about 40% to about 50%, about 40% to about 55%, about 40% to about 60%, about 40% to about 65%, about 40% to about 70%, about 40% to about 80%, about 40% to about 90%, about 50% to about 55%, about 50% to about 60%, about 50% to about 65%, about 50% to about 70%, about 50% to about 80%, about 50% to about 90%, about 55% to about 60%, about 55% to about 65%, about 55% to about 70%, about 55% to about 80%, about 55% to about 90%, about 60% to about 65%, about 60% to about 70%, about 60% to about 80%, about 60% to about 90%, about 65% to about 70%, about 65% to about 80%, about 65% to about 90%, about 70% to about 80%, about 70% to about 90%, or about 80% to about 90% of the weight of the ferromagnetic ink composition. In some embodiments, the solvent comprises about 5%, about 10%, about 20%, about 30%, about 40%, about 50%, about 55%, about 60%, about 65%, about 70%, about 80%, or about 90% of the weight of the ferromagnetic ink composition.

In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof.

In some embodiments, the ferromagnetic ink composition comprises a ferromagnetic material/resin ratio ranging from about 1/80 to 6/1. In some embodiments, the ferromagnetic ink composition comprises a ferromagnetic material/resin ratio ranging from about 1/10 to 3/1. In some embodiments, the ferromagnetic ink composition comprises a ferromagnetic material/resin ratio ranging from about 1/5 to 2/1. In some embodiments, the ferromagnetic ink composition further comprises a ferromagnetic material/resin ratio ranging from about 1/6 to about 6/1. In some embodiments, the ferromagnetic ink composition further comprises a ferromagnetic material/resin ratio ranging from about 2/1 to about 6/1. In some embodiments, the ferromagnetic ink composition further comprises a ferromagnetic material/ resin ratio ranging from about 3/1 to about 5/1. In some embodiments, the ferromagnetic material and resin has a printed coating weight of about 10 grams per square meter. In some embodiments, the ferromagnetic material and resin has a printed coating weight of about 0.5 grams per square meters to about 15 grams per square meters. In some embodiments, the ferromagnetic material and resin has a printed coating weight of about 0.5 grams per square meters. In some embodiments, the ferromagnetic material and resin has a printed coating weight of about 15 grams per square meters. In some embodiments, the ferromagnetic material and resin has a printed coating weight of about 0.5 grams per square meters to about 1 gram per square meter, about 0.5 grams per square meters to about 2 grams per square meters, about 0.5 grams per square meters to about 3 grams per square meters, about 0.5 grams per square meters to about 4 grams per square meters, about 0.5 grams per square meters to about 5 grams per square meters, about 0.5 grams per square meters to about 6 grams per square meters, about 0.5 grams per square meters to about 7 grams per square meters, about 0.5 grams per square meters to about 8 grams per square meters, about 0.5 grams per square meters to about 9 grams per square meters, about 0.5 grams per square meters to about 10 grams per square meters, about 0.5 grams per square meters to about 15 grams per square meters, about 1 gram per square meter to about 2 grams per square meters, about 1 gram per square meter to about 3 grams per square meters, about 1 gram per square meter to about 4 grams per square meters, about 1 gram per square meter to about 5 grams per square meters, about 1 gram per square meter to about 6 grams per square meters, about 1 gram per square meter to about 7 grams per square meters, about 1 gram per square meter to about 8 grams per square meters, about 1 gram per square meter to about 9 grams per square meters, about 1 gram per square meter to about 10 grams per square meters, about 1 gram per square meter to about 15 grams per square meters, about 2 grams per square meters to about 3 grams per square meters, about 2 grams per square meters to about 4 grams per square meters, about 2 grams per square meters to about 5 grams per square meters, about 2 grams per square meters to about 6 grams per square meters, about 2 grams per square meters to about 7 grams per square meters, about 2 grams per square meters to about 8 grams per square meters, about 2 grams per square meters to about 9 grams per square meters, about 2 grams per square meters to about 10 grams per square meters, about 2 grams per square meters to about 15 grams per square meters, about 3 grams per square meters to about 4 grams per square meters, about 3 grams per square meters to about 5 grams per square meters, about 3 grams per square meters to about 6 grams per square meters, about 3 grams per square meters to about 7 grams per square meters, about 3 grams per square meters to about 8 grams per square meters, about 3 grams per square meters to about 9 grams per square meters, about 3 grams per square meters to about 10 grams per square meters, about 3 grams per square meters to about 15 grams per square meters, about 4 grams per square meters to about 5 grams per square meters, about 4 grams per square meters to about 6 grams per square meters, about 4 grams per square meters to about 7 grams per square meters, about 4 grams per square meters to about 8 grams per square meters, about 4 grams per square meters to about 9 grams per square meters, about 4 grams per square meters to about 10 grams per square meters, about 4 grams per square meters to about 15 grams per square meters, about 5 grams per square meters to about 6 grams per square meters, about 5 grams per square meters to about 7 grams per square meters, about 5 grams per square meters to about 8 grams per square meters, about 5 grams per square meters to about 9 grams per square meters, about 5 grams per square meters to about 10 grams per square meters, about 5 grams per square meters to about 15 grams per square meters, about 6 grams per square meters to about 7 grams per square meters, about 6 grams per square meters to about 8 grams per square meters, about 6 grams per square meters to about 9 grams per square meters, about 6 grams per square meters to about 10 grams per square meters, about 6 grams per square meters to about 15 grams per square meters, about 7 grams per square meters to about 8 grams per square meters, about 7 grams per square meters to about 9 grams per square meters, about 7 grams per square meters to about 10 grams per square meters, about 7 grams per square meters to about 15 grams per square meters, about 8 grams per square meters to about 9 grams per square meters, about 8 grams per square meters to about 10 grams per square meters, about 8 grams per square meters to about 15 grams per square meters, about 9 grams per square meters to about 10 grams per square meters, about 9 grams per square meters to about 15 grams per square meters, or about 10 grams per square meters to about 15 grams per square meters. In some embodiments, the ferromagnetic material and resin has a printed coating weight of about 0.5 grams per square meters, about 1 gram per square meter, about 2 grams per square meters, about 3 grams per square meters, about 4 grams per square meters, about 5 grams per square meters, about 6 grams per square meters, about 7 grams per square meters, about 8 grams per square meters, about 9 grams per square meters, about 10 grams per square meters, or about 15 grams per square meters.

In some embodiments, the ferromagnetic ink comprises soft ferromagnetic particles. In some embodiments, the use of soft ferromagnetic particles allows the ferromagnetic ink to not retain their magnetization in the absence of an applied magnetic field. In some embodiments, the ferromagnetic ink comprises soft ferromagnetic particles. In some embodiments, the use of soft ferromagnetic particles allows the ferromagnetic ink to not retain their magnetization in the absence of an applied magnetic field. In some embodiments, the soft ferromagnetic particles spontaneously demagnetize in the absence of a magnetic field. In some embodiments, the soft ferromagnetic particles spontaneously magnetize in the presence of a magnetic field. In some embodiments, the ferromagnetic ink spontaneously demagnetizes in the absence of a magnetic field. In some embodiments, the ferromagnetic ink spontaneously magnetizes in the presence of a magnetic field.

In some embodiments, the particle size distribution of the magnetic materials is maintained such that the D90 size lies between 2-20 microns and the D50 size lies between 1-10 microns. In some embodiments, the D90 size lies between 5-10 microns. The term "D50," as used herein, is also known as the median diameter or the medium value of the particle size distribution and refers to the value of the particle diameter at 50% in the cumulative distribution. The term "D90," as used herein refers to the diameter where ninety percent of the distribution has a smaller particle size and ten percent has a larger particle size. In some embodiments, the particle morphology of the magnetic materials is controlled to obtain spherical particles. The sphericity of the object is determined using SEM (scanning electron microscope) measurements of the magnetic particles. The term "scanning electron microscope (SEM)," as used herein, refers to a type of electron microscope that produces images of a sample by scanning the surface with a focused beam of electrons. The electrons interact with atoms in the sample, producing various signals that contain information about the surface topography and composition of the sample.

In some embodiments, the particles include alloys of iron with cobalt, vanadium manganese, molybdenum, silicon, nickel, boron, aluminum, copper, or any combination thereof. In some embodiments, the iron alloy comprises the composition of Fe=70-98% and Si=2-30%. In some embodiments, the iron alloy comprises the composition of Fe=70-87%, Si=2-15% and Al=10-18%. In some embodiments, the iron alloy comprises the composition of Fe=10-90% and Co=10-90%. In some embodiments, the iron alloy comprises the composition of Fe=10-50%, Co=50-90% and Al=1-10%. In some embodiments, the iron alloy comprises the composition of Fe=10-50% and Ni=50-90%. In some embodiments, the iron alloy comprises the composition of Fe=8-50%, Ni=50-90% and Mo=1-10%. In some embodiments, the iron alloy comprises the composition of Fe=60-90%, Cu=10-15% and Si=15-25%.

In some embodiments, the magnetic particle is processed or modified to improve magnetic properties. In some embodiments, the magnetic properties are magnetic saturation and/or magnetic permeability. In some embodiments, the magnetic particle is modified by physical processing like milling and grinding using a ball mill or a planetary ball mill to obtain particle sizes and morphologies as described herein. In some embodiments, the magnetic particle is modified by heat treatment of magnetic powders at temperatures of at least 500° C. and up to 1300° C. using a reducing, inert or vacuum atmosphere conditions to reduce impurities in the powders. In some embodiments, the magnetic particle is modified by using magnetic fields during heat treatment to achieve further improvement in crystal structure of particles and as a result their magnetic properties. In some embodiments, the magnetic particle is modified by using special techniques to avoid sintering of the powders typically observed during high temperature processing of the powders, for example, through heat treatment in a fluidized bed. In some embodiments, the magnetic particle is modified by a combination of techniques as described above.

In some embodiments, the thickness/density of the ink/coating printed on the film/substrate (print thickness/density of the ferromagnetic ink onto the label) is less than 6 grams per square meter. In some embodiments, the thickness/density of the ink/coating printed on the film/substrate (print thickness/density of the ferromagnetic ink onto the label) is between 0.5 and 3 gram per square meter. In some embodiments, the thickness/density of the ink/coating printed on the film/substrate (print thickness/density of the ferromagnetic ink onto the label) is between 0.5 and 2 grams per square meter.

In some embodiments, by using the magnetic materials as described above, the change in haze values due to the application of the ferromagnetic ink/coating/marker or the magnetizable coating/marker on a transparent or translucent label or the application of the transparent or translucent label, the magnetizable coating or the magnetizable marker is less than 9% and preferably, less than 5%. In some embodiments, by using the magnetic materials as described above, the overall haze values of the transparent or translucent label, the transparent or translucent label comprising the ferromagnetic material, the transparent or translucent magnetizable coating, or the transparent or translucent magnetizable marker is less than 17% and preferably, less than 12%. The haze values, as used herein, are measured using ASTM D1003-13, which is a standard test method for haze and luminous transmittance of transparent or translucent plastics. In some embodiments, by using the magnetic materials as described above, the overall visible (400-800 nm) transmission values of the transparent or translucent label, the transparent or translucent label comprising the ferromagnetic material, the transparent or translucent magnetizable coating, or the transparent or translucent magnetizable marker is greater than 82% and preferably, greater than 90%. In some embodiments, by using the magnetic materials as described above, the overall NIR (near infrared, 750-1500 nm) transmission values of the transparent or translucent label, the transparent or translucent magnetizable coating, or the transparent or translucent magnetizable marker is greater than 87% and preferably, greater than 90%. In some embodiments, by using the magnetic materials as described above, application of the transparent or translucent label, the transparent or translucent label comprising the ferromagnetic material, the transparent or translucent magnetizable coating, or the transparent or translucent magnetizable marker causes no change in the look of commercial art-work/graphics used on a printed label. In some embodiments, the change in the look of commercial art-work/graphics is represented as a subjective measurement and is commonly done by assigning a numeric scale from 1-10 with 1 being no impact to the look of the label.

In some embodiments, the ferromagnetic ink is characterized by a low coercivity (denoted as Hc). In some embodiments, the ferromagnetic ink retains its magnetization, after exposure and removal of a magnetic field, for an amount of time that is dependent on coercivity. In some embodiments, a ferromagnetic ink with a low coercivity has a quicker demagnetization than a ferromagnetic ink with a high coercivity. In some embodiments, the ferromagnetic ink is characterized by a low coercivity ranging from about 0.8 8 A/m to about 8 A/m. In some embodiments, the ferromagnetic ink is characterized by a low coercivity ranging from about 0.5 A/m to about 10 A/m. In some embodiments, the ferromagnetic ink is characterized by a low coercivity ranging from about 0.5 A/m. In some embodiments, the ferromagnetic ink is characterized by a low coercivity ranging from about 10 A/m. In some embodiments, the ferromagnetic ink is characterized by a low coercivity ranging from about 0.5 A/m to about 0.6 A/m, about 0.5 A/m to about 0.7 A/m, about 0.5 A/m to about 0.8 A/m, about 0.5 A/m to about 0.9 A/m, about 0.5 A/m to about 1 A/m, about 0.5 A/m to about 2 A/m, about 0.5 A/m to about 3 A/m, about 0.5 A/m to about 4 A/m, about 0.5 A/m to about 5 A/m, about 0.5 A/m to about 8 A/m, about 0.5 A/m to about 10 A/m, about 0.6 A/m to about 0.7 A/m, about 0.6 A/m to about 0.8 A/m, about 0.6 A/m to about 0.9 A/m, about 0.6 A/m to about 1 A/m, about 0.6 A/m to about 2 A/m, about 0.6 A/m to about 3 A/m, about 0.6 A/m to about 4 A/m, about 0.6 A/m to about 5 A/m, about 0.6 A/m to about 8 A/m, about 0.6 A/m to about 10 A/m, about 0.7 A/m to about 0.8 A/m, about 0.7 A/m to about 0.9 A/m, about 0.7 A/m to about 1 A/m, about 0.7 A/m to about 2 A/m, about 0.7 A/m to about 3 A/m, about 0.7 A/m to about 4 A/m, about 0.7 A/m to about 5 A/m, about 0.7 A/m to about 8 A/m, about 0.7 A/m to about 10 A/m, about 0.8 A/m to about 0.9 A/m, about 0.8 A/m to about 1 A/m, about 0.8 A/m to about 2 A/m, about 0.8 A/m to about 3 A/m, about 0.8 A/m to about 4 A/m, about 0.8 A/m to about 5 A/m, about 0.8 A/m to about 8 A/m, about 0.8 A/m to about 10 A/m, about 0.9 A/m to about 1 A/m, about 0.9 A/m to about 2 A/m, about 0.9 A/m to about 3 A/m, about 0.9 A/m to about 4 A/m, about 0.9 A/m to about 5 A/m, about 0.9 A/m to about 8 A/m, about 0.9 A/m to about 10 A/m, about 1 A/m to about 2 A/m, about 1 A/m to about 3 A/m, about 1 A/m to about 4 A/m, about 1 A/m to about 5 A/m, about 1 A/m to about 8 A/m, about 1 A/m to about 10 A/m, about 2 A/m to about 3 A/m, about 2 A/m to about 4 A/m, about 2 A/m to about 5 A/m, about 2 A/m to about 8 A/m, about 2 A/m to about 10 A/m, about 3 A/m to about 4 A/m, about 3 A/m to about 5 A/m, about 3 A/m to about 8 A/m, about 3 A/m to about 10 A/m, about 4 A/m to about 5 A/m, about 4 A/m to about 8 A/m, about 4 A/m to about 10 A/m, about 5 A/m to about 8 A/m, about 5 A/m to about 10 A/m, or about 8 A/m to about 10 A/m. In some embodiments, the ferromagnetic ink is characterized by a low coercivity ranging from about 0.5 A/m, about 0.6 A/m, about 0.7 A/m, about 0.8 A/m, about 0.9 A/m, about 1 A/m, about 2 A/m, about 3 A/m, about 4 A/m, about 5 A/m, about 8 A/m, or about 10 A/m.

In some embodiments, the ferromagnetic ink is characterized by low magnetic hysteresis losses per remagnetization cycle. In some embodiments, the ferromagnetic ink has a magnetic hysteresis loss per remagnetization cycle ranging from about 1 to about $10^3$ joules per cubic meter (J/m$^3$). In some embodiments, the ferromagnetic ink has a magnetic hysteresis loss per remagnetization cycle ranging from about 0.1 joules per cubic meter to about 10,000 joules per cubic meter. In some embodiments, the ferromagnetic ink has a magnetic hysteresis loss per remagnetization cycle ranging from about 0.1 joules per cubic meter. In some embodiments, the ferromagnetic ink has a magnetic hysteresis loss per remagnetization cycle ranging from about 10,000 joules per cubic meter. In some embodiments, the ferromagnetic ink has a magnetic hysteresis loss per remagnetization cycle ranging from about 0.1 joules per cubic meter to about 1 joule per cubic meter, about 0.1 joules per cubic meter to about 10 joules per cubic meter, about 0.1 joules per cubic meter to about 50 joules per cubic meter, about 0.1 joules per cubic meter to about 100 joules per cubic meter, about 0.1 joules per cubic meter to about 500 joules per cubic meter, about 0.1 joules per cubic meter to about 1,000 joules per cubic meter, about 0.1 joules per cubic meter to about 1,500 joules per cubic meter, about 0.1 joules per cubic meter to about 10,000 joules per cubic meter, about 1 joule per cubic meter to about 10 joules per cubic meter, about 1 joule per cubic meter to about 50 joules per cubic meter, about 1 joule per cubic meter to about 100 joules per cubic meter, about 1 joule per cubic meter to about 500 joules per cubic meter, about 1 joule per cubic meter to about 1,000 joules per cubic meter, about 1 joule per cubic meter to about 1,500 joules per cubic meter, about 1 joule per cubic meter to about 10,000 joules per cubic meter, about 10 joules per cubic meter to about 50 joules per cubic meter, about 10 joules per cubic meter to about 100 joules per cubic meter, about 10 joules per cubic meter to about 500 joules per cubic meter, about 10 joules per cubic meter to about 1,000 joules per cubic meter, about 10 joules per cubic meter to about 1,500 joules per cubic meter, about 10 joules per cubic meter to about 10,000 joules per cubic meter, about 50 joules per cubic meter to about 100 joules per cubic meter, about 50 joules per cubic meter to about 500 joules per cubic meter, about 50 joules per cubic meter to about 1,000 joules per cubic meter, about 50 joules per cubic meter to about 1,500 joules per cubic meter, about 50 joules per cubic meter to about 10,000 joules per cubic meter, about 100 joules per cubic meter to about 500 joules per cubic meter, about 100 joules per cubic meter to about 1,000 joules per cubic meter, about 100 joules per cubic meter to about 1,500 joules per cubic meter, about 100 joules per cubic meter to about 10,000 joules per cubic meter, about 500 joules per cubic meter to about 1,000 joules per cubic meter, about 500 joules per cubic meter to about 1,500 joules per cubic meter, about 500 joules per cubic meter to about 10,000 joules per cubic meter, about 1,000 joules per cubic meter to about 1,500 joules per cubic meter, about 1,000 joules per cubic meter to about 10,000 joules per cubic meter, or about 1,500 joules per cubic meter to about 10,000 joules per cubic meter. In some embodiments, the ferromagnetic ink has a magnetic hysteresis loss per remagnetization cycle ranging from about 0.1 joules per cubic meter, about 1 joule per cubic meter, about 10 joules per cubic meter, about 50 joules per cubic meter, about 100 joules per cubic meter, about 500 joules per cubic meter, about 1,000 joules per cubic meter, about 1,500 joules per cubic meter, or about 10,000 joules per cubic meter.

In some embodiments, the ferromagnetic ink is magnetized spontaneously. In some embodiments, the ferromagnetic ink is magnetized spontaneously when placed in contact with a magnetic field. In some embodiments, at temperatures below the Curie point, the ferromagnetic ink is magnetized spontaneously but does not manifest magnetic properties externally.

In some embodiments, all components of the ferromagnetic ink composition are indirect food additives. In some embodiments, all components of the ferromagnetic ink composition may come into contact with food as part of packaging or processing equipment, but are not intended to be added directly to food. In some embodiments, all components of the ferromagnetic ink composition are additives permitted for food contact applications, as listed in Title 21 of the Code of Federal Regulations (CFR) of the Food and Drug Administration (FDA). In some embodiments, all components of the ferromagnetic ink composition are food contact substances. A food contact substance is defined by Title 21 of the CFR, Part 170, Section 170.3 as any substance that is intended for use as a component of materials used in manufacturing, packing, packaging, transporting, or holding food if such use is not intended to have any technical effect in such food. In some embodiments, all components of the ferromagnetic ink composition are safe food contact materials. In some embodiments, a food contact material is a material that is intended to be in contact with food. In some embodiments, a safe food contact material is a material whose surface is free of any toxic contaminants which may be contacted during the manufacturing process. Furthermore, in some embodiments, a material that is safe for food contact does not become a source of toxic contamination through usage (i.e., degeneration). The safety of the food contact material is assured by estimating and regulating the "migration limits" of the material. In some embodiments, the overall migration of all of the components of the ferromagnetic ink composition is limited to about 10 milligrams (mg) of substances per squared decimeter ($dm^2$) of a potential contact surface. In some embodiments, all of the components of the ferromagnetic ink composition meet the migration limit requirements of a safe food contact material. In some embodiments, the all components of the ferromagnetic ink composition are Generally Recognized as Safe (GRAS) substances.

In some embodiments, the ferromagnetic ink composition is magnetized when exposed to a magnetic field. In some embodiments, the ferromagnetic ink composition is temporarily magnetized when exposed to a magnetic field. In some embodiments, the ferromagnetic ink composition is printable. In some embodiments, the printing technique used to print the inks onto desired substrates is a significant determinant of ink composition. In some embodiments, the ink is printed using flexographic or gravure or intaglio or screen or pad or offset print press. In some embodiments, the ferromagnetic ink composition is printed using flexographic printing. In some embodiments, the ferromagnetic ink composition is printed using gravure printing. In some embodiments, the ferromagnetic ink composition is printed using intaglio printing. In some embodiments, the ferromagnetic ink composition is printed using screen printing. In some embodiments, the ferromagnetic ink composition is printed using pad printing. In some embodiments, the ferromagnetic ink composition is printed using offset print press. Inks used in such high speed commercial printers are characterized by viscosity ranges of >10 cP. In some embodiments, the ferromagnetic ink composition has a viscosity that is about 10 centipoise (cP).

In some embodiments, a ferromagnetic ink composition having a viscosity from about 100 cP to about 200 cP is used with flexographic printing methods. In some embodiments, the ferromagnetic ink composition has a viscosity of about 100 cP to about 200 cP. In some embodiments, the ferromagnetic ink composition has a viscosity of about 100 cP. In some embodiments, the ferromagnetic ink composition has a viscosity of about 200 cP. In some embodiments, the ferromagnetic ink composition has a viscosity of about 100 cP to about 110 cP, about 100 cP to about 120 cP, about 100 cP to about 130 cP, about 100 cP to about 140 cP, about 100 cP to about 150 cP, about 100 cP to about 160 cP, about 100 cP to about 170 cP, about 100 cP to about 180 cP, about 100 cP to about 190 cP, about 100 cP to about 200 cP, about 110 cP to about 120 cP, about 110 cP to about 130 cP, about 110 cP to about 140 cP, about 110 cP to about 150 cP, about 110 cP to about 160 cP, about 110 cP to about 170 cP, about 110 cP to about 180 cP, about 110 cP to about 190 cP, about 110 cP to about 200 cP, about 120 cP to about 130 cP, about 120 cP to about 140 cP, about 120 cP to about 150 cP, about 120 cP to about 160 cP, about 120 cP to about 170 cP, about 120 cP to about 180 cP, about 120 cP to about 190 cP, about 120 cP to about 200 cP, about 130 cP to about 140 cP, about 130 cP to about 150 cP, about 130 cP to about 160 cP, about 130 cP to about 170 cP, about 130 cP to about 180 cP, about 130 cP to about 190 cP, about 130 cP to about 200 cP, about 140 cP to about 150 cP, about 140 cP to about 160 cP, about 140 cP to about 170 cP, about 140 cP to about 180 cP, about 140 cP to about 190 cP, about 140 cP to about 200 cP, about 150 cP to about 160 cP, about 150 cP to about 170 cP, about 150 cP to about 180 cP, about 150 cP to about 190 cP, about 150 cP to about 200 cP, about 160 cP to about 170 cP, about 160 cP to about 180 cP, about 160 cP to about 190 cP, about 160 cP to about 200 cP, about 170 cP to about 180 cP, about 170 cP to about 190 cP, about 170 cP to about 200 cP, about 180 cP to about 190 cP, about 180 cP to about 200 cP, or about 190 cP to about 200 cP. In some embodiments, the ferromagnetic ink composition has a viscosity of about 100 cP, about 110 cP, about 120 cP, about 130 cP, about 140 cP, about 150 cP, about 160 cP, about 170 cP, about 180 cP, about 190 cP, or about 200 cP.

In some embodiments, a ferromagnetic ink composition having a viscosity from about 40 cP to about 80 cP is used with gravure printing methods. In some embodiments, the ferromagnetic ink composition has a viscosity of about 40 cP to about 80 cP. In some embodiments, the ferromagnetic ink composition has a viscosity of about 40 cP. In some embodiments, the ferromagnetic ink composition has a viscosity of about 80 cP. In some embodiments, the ferromagnetic ink composition has a viscosity of about 40 cP to about 45 cP, about 40 cP to about 50 cP, about 40 cP to about 55 cP, about 40 cP to about 60 cP, about 40 cP to about 65 cP, about 40 cP to about 70 cP, about 40 cP to about 75 cP, about 40 cP to about 80 cP, about 45 cP to about 50 cP, about 45 cP to about 55 cP, about 45 cP to about 60 cP, about 45 cP to about 65 cP, about 45 cP to about 70 cP, about 45 cP to about 75 cP, about 45 cP to about 80 cP, about 50 cP to about 55 cP, about 50 cP to about 60 cP, about 50 cP to about 65 cP, about 50 cP to about 70 cP, about 50 cP to about 75 cP, about 50 cP to about 80 cP, about 55 cP to about 60 cP, about 55 cP to about 65 cP, about 55 cP to about 70 cP, about 55 cP to about 75 cP, about 55 cP to about 80 cP, about 60 cP to about 65 cP, about 60 cP to about 70 cP, about 60 cP to about 75 cP, about 60 cP to about 80 cP, about 65 cP to about 70 cP, about 65 cP to about 75 cP, about 65 cP to about 80 cP, about 70 cP to about 75 cP, about 70 cP to about 80 cP, or about 75 cP to about 80 cP. In some embodiments, the ferromagnetic ink composition has a viscosity of about 40 cP, about 45 cP, about 50 cP, about 55 cP, about 60 cP, about 65 cP, about 70 cP, about 75 cP, or about 80 cP.

In some embodiments, a ferromagnetic ink composition having a viscosity from about 100 cP to about 150 cP is used with offset printing methods. In some embodiments, a ferromagnetic ink composition having a viscosity from about 100 cP to about 150 cP is used with offset printing methods. In some embodiments, a ferromagnetic ink composition having a viscosity from about 100 cP is used with offset printing methods. In some embodiments, a ferromagnetic ink composition having a viscosity from about 150 cP is used with offset printing methods. In some embodiments, a ferromagnetic ink composition having a viscosity from about 100 cP to about 105 cP, about 100 cP to about 110 cP, about 100 cP to about 115 cP, about 100 cP to about 120 cP, about 100 cP to about 125 cP, about 100 cP to about 130 cP, about 100 cP to about 135 cP, about 100 cP to about 140 cP, about 100 cP to about 145 cP, about 100 cP to about 150 cP, about 105 cP to about 110 cP, about 105 cP to about 115 cP, about 105 cP to about 120 cP, about 105 cP to about 125 cP, about 105 cP to about 130 cP, about 105 cP to about 135 cP, about 105 cP to about 140 cP, about 105 cP to about 145 cP, about 105 cP to about 150 cP, about 110 cP to about 115 cP, about 110 cP to about 120 cP, about 110 cP to about 125 cP, about 110 cP to about 130 cP, about 110 cP to about 135 cP, about 110 cP to about 140 cP, about 110 cP to about 145 cP, about 110 cP to about 150 cP, about 115 cP to about 120 cP, about 115 cP to about 125 cP, about 115 cP to about 130 cP, about 115 cP to about 135 cP, about 115 cP to about 140 cP, about 115 cP to about 145 cP, about 115 cP to about 150 cP, about 120 cP to about 125 cP, about 120 cP to about 130 cP, about 120 cP to about 135 cP, about 120 cP to about 140 cP, about 120 cP to about 145 cP, about 120 cP to about 150 cP, about 125 cP to about 130 cP, about 125 cP to about 135 cP, about 125 cP to about 140 cP, about 125 cP to about 145 cP, about 125 cP to about 150 cP, about 130 cP to about 135 cP, about 130 cP to about 140 cP, about 130 cP to about 145 cP, about 130 cP to about 150 cP, about 135 cP to about 140 cP, about 135 cP to about 145 cP, about 135 cP to about 150 cP, about 140 cP to about 145 cP, about 140 cP to about 150 cP, or about 145 cP to about 150 cP is used with offset printing methods. In some embodiments, a ferromagnetic ink composition having a viscosity from about 100 cP, about 105 cP, about 110 cP, about 115 cP, about 120 cP, about 125 cP, about 130 cP, about 135 cP, about 140 cP, about 145 cP, or about 150 cP is used with offset printing methods.

In some embodiments, the ferromagnetic ink composition has optimum rheology properties. In some embodiments, the ferromagnetic ink has optimum stability during ink manufacturing, storage, and throughout the printing process. In some embodiments, the ferromagnetic ink components do not separate out during manufacturing, storage, and throughout the printing process. In some embodiments, the ferromagnetic ink composition does not degrade during manufacturing, storage, and throughout the printing process. In some embodiments, no sedimentation of the ferromagnetic ink components occurs during manufacturing, storage, and throughout the printing process. In some embodiments, stability of the ferromagnetic ink is characterized by a lack of settling. In some embodiments, the ferromagnetic ink remains stable for at least three weeks. In some embodiments, no settling of the ferromagnetic ink occurs for at least three weeks.

In some embodiments, the ferromagnetic ink composition has a sufficient magnetic strength required for successful magnet induced separation of recyclates in an MRF separation facility. In some embodiments, the ferromagnetic ink composition maintains this magnetic strength throughout the processes of ink manufacturing, storage, and/or printing when part of a ferromagnetic label.

In some embodiments, the ferromagnetic ink composition has a sufficient magnetic strength required for successful magnet-induced separation of ground label flakes from PET flakes in a PET reclaiming facility. In some embodiments, the ferromagnetic ink composition maintains this magnetic strength throughout the processes of ink manufacturing, storage, printing, and processing in a post-consumer recycling facility when part of a ferromagnetic label.

In some embodiments, the ferromagnetic coating shows good adhesion, low coefficient of friction (COF), scratch resistance, crinkle resistance, and anti-blocking properties.

In some embodiments, the ferromagnetic ink composition has optimum grinding efficiency. In some embodiments, the ferromagnetic ink composition has a grinding efficiency of at most 5 micrometers or microns ($\mu m$). In some embodiments, the grinding efficiency of the ferromagnetic ink composition is measured using a grind gauge comprising a National Printing Inks Research Institute (NPIRI) scale. The NPIRI Scale is a scale designed for ink gauge by the National Printing Ink Research Institute. The scale begins with "0" at the infinite point and extends to "10" at a depth of 0.001 inches. While it is an arbitrary scale, it is a logical one in that these divisions are equivalent of tenths of mils, or 2-½ microns. In some embodiments, the ferromagnetic ink composition has a grinding efficiency of at least 5 $\mu m$, based on the NPIRI scale. In some embodiments, the grinding efficiency of the ferromagnetic ink composition is measured by using a grind gauge or a precision grindometer. In some embodiments, the grind gauge or the precision grindometer is used to indicate the fineness of grind or the presence of coarse particles or agglomerates or the "grind of the ink" in a dispersion (e.g., in the ferromagnetic ink composition). In some embodiments, the grind gauge comprises a rectangular channel of varying depth from about 0 $\mu m$ to about 10 $\mu m$. In some embodiments, ink is placed at the 10 $\mu m$ depth end and scraped along the channel with a scraper. In some embodiments, the measured depth (in microns) along the channel where particle streaks are first observed is labeled as grind of the ink.

In some embodiments, the grind of the ferromagnetic ink composition is about 0.01 microns to about 5 microns. In some embodiments, the grind of the ferromagnetic ink composition is about 0.01 microns. In some embodiments, the grind of the ferromagnetic ink composition is about 5 microns. In some embodiments, the grind of the ferromagnetic ink composition is about 0.01 microns to about 0.05 microns, about 0.01 microns to about 1 micron, about 0.01 microns to about 1.5 microns, about 0.01 microns to about 2 microns, about 0.01 microns to about 2.5 microns, about 0.01 microns to about 3 microns, about 0.01 microns to about 3.5 microns, about 0.01 microns to about 4 microns, about 0.01 microns to about 4.5 microns, about 0.01 microns to about 5 microns, about 0.05 microns to about 1 micron, about 0.05 microns to about 1.5 microns, about 0.05 microns to about 2 microns, about 0.05 microns to about 2.5 microns, about 0.05 microns to about 3 microns, about 0.05 microns to about 3.5 microns, about 0.05 microns to about 4 microns, about 0.05 microns to about 4.5 microns, about 0.05 microns to about 5 microns, about 1 micron to about 1.5 microns, about 1 micron to about 2 microns, about 1 micron to about 2.5 microns, about 1 micron to about 3 microns, about 1 micron to about 3.5 microns, about 1 micron to about 4 microns, about 1 micron to about 4.5 microns, about 1 micron to about 5 microns, about 1.5 microns to about 2 microns, about 1.5 microns to about 2.5 microns, about 1.5 microns to about 3 microns, about 1.5 microns to about 3.5 microns, about 1.5 microns to about 4 microns, about 1.5 microns to about 4.5 microns, about 1.5 microns to about 5 microns, about 2 microns to about 2.5 microns, about 2 microns to about 3 microns, about 2 microns to about 3.5 microns, about 2 microns to about 4 microns, about 2 microns to about 4.5 microns, about 2 microns to about 5 microns, about 2.5 microns to about 3 microns, about 2.5 microns to about 3.5 microns, about 2.5 microns to about 4 microns, about 2.5 microns to about 4.5 microns, about 2.5 microns to about 5 microns, about 3 microns to about 3.5 microns, about 3 microns to about 4 microns, about 3 microns to about 4.5 microns, about 3 microns to about 5 microns, about 3.5 microns to about 4 microns, about 3.5 microns to about 4.5 microns, about 3.5 microns to about 5 microns, about 4 microns to about 4.5 microns, about 4 microns to about 5 microns, or about 4.5 microns to about 5 microns. In some embodiments, the grind of the ferromagnetic ink composition is about 0.01 microns, about 0.05 microns, about 1 micron, about 1.5 microns, about 2 microns, about 2.5 microns, about 3 microns, about 3.5 microns, about 4 microns, about 4.5 microns, or about 5 microns.

In some embodiments, the ferromagnetic ink composition has optimum heat transfer performance. In some embodiments, optimum heat transfer performance is defined as a complete transfer of the ferromagnetic ink composition onto the surface of an object when using heat transfer methods. For example, in some embodiments, the ferromagnetic ink composition is fully transferred onto the surface of an object (e.g., a plastic object) using a hot plate.

In some embodiments, the ferromagnetic ink composition comprises variation in color. In some embodiments, the ferromagnetic ink composition comprises different colored pigments. In some embodiments, the colored pigments are non-ferromagnetic pigments. In some embodiments, the ferromagnetic ink composition comprises a colored pigment at a level ranging from about 5% to about 10% of the ferromagnetic ink formula weight. In some embodiments, the ferromagnetic ink composition comprises a colored pigment at a level ranging from about 1% to about 60% of the ferromagnetic ink formula weight. In some embodiments, the ferromagnetic ink composition comprises a colored pigment at a level ranging from at least about 1% of the ferromagnetic ink formula weight. In some embodiments, the ferromagnetic ink composition comprises a colored pigment at a level ranging from at most about 60% of the ferromagnetic ink formula weight. In some embodiments, the ferromagnetic ink composition comprises a colored pigment at a level ranging from about 1% to about 2%, about 1% to about 3%, about 1% to about 4%, about 1% to about 5%, about 1% to about 10%, about 1% to about 15%, about 1% to about 20%, about 1% to about 30%, about 1% to about 40%, about 1% to about 50%, about 1% to about 60%, about 2% to about 3%, about 2% to about 4%, about 2% to about 5%, about 2% to about 10%, about 2% to about 15%, about 2% to about 20%, about 2% to about 30%, about 2% to about 40%, about 2% to about 50%, about 2% to about 60%, about 3% to about 4%, about 3% to about 5%, about 3% to about 10%, about 3% to about 15%, about 3% to about 20%, about 3% to about 30%, about 3% to about 40%, about 3% to about 50%, about 3% to about 60%, about 4% to about 5%, about 4% to about 10%, about 4% to about 15%, about 4% to about 20%, about 4% to about 30%, about 4% to about 40%, about 4% to about 50%, about 4% to about 60%, about 5% to about 10%, about 5% to about 15%, about 5% to about 20%, about 5% to about 30%, about 5% to about 40%, about 5% to about 50%, about 5% to about 60%, about 10% to about 15%, about 10% to about 20%, about 10% to about 30%, about 10% to about 40%, about 10% to about 50%, about 10% to about 60%, about 15% to about 20%, about 15% to about 30%, about 15% to about 40%, about 15% to about 50%, about 15% to about 60%, about 20% to about 30%, about 20% to about 40%, about 20% to about 50%, about 20% to about 60%, about 30% to about 40%, about 30% to about 50%, about 30% to about 60%, about 40% to about 50%, about 40% to about 60%, or about 50% to about 60% of the ferromagnetic ink formula weight. In some embodiments, the ferromagnetic ink composition comprises a colored pigment at a level ranging from about 1%, about 2%, about 3%, about 4%, about 5%, about 10%, about 15%, about 20%, about 30%, about 40%, about 50%, or about 60% of the ferromagnetic ink formula weight.

In some embodiments, the ferromagnetic ink composition comprises a non-ferromagnetic pigment to provide color to the composition. In some embodiments, the ferromagnetic ink composition comprises a non-ferromagnetic, colored pigment to improve aesthetic appeal. In some embodiments, the ferromagnetic ink composition comprises a colored pigment to provide markings to printed plastic. In some embodiments, the colored pigment is a yellow pigment, a cyan pigment, a magenta pigment, and a black pigment. In some embodiments, the yellow pigment is Yellow 12, Yellow 13, Yellow 14, Yellow 17, Yellow 74, or a combination thereof. In some embodiments, the cyan pigment is Blue 15:1, Blue 15:3, Blue 15:4, or a combination thereof. In some embodiments, the magenta pigment is Red 57:1, Red 48:2, Red 146, Red 122, or a combination thereof. In some embodiments, the black pigment is Black 7. In some embodiments, the ferromagnetic ink composition shows no variation and/or loss of performance due to the addition or change in the non-ferromagnetic pigments.

In some embodiments, the non-ferromagnetic colored pigment is an FDA-approved food additives as listed in Title 21 of the Code of Federal Regulations (see sections 175-178). In some embodiments, the non-ferromagnetic colored pigment is selected from the list of generally recognized as safe (GRAS) substances, as listed by the Food and Drug Safety Administration (FDA) in Title 21 of the Code of Federal Regulations (CFR) (see sections 182, 184, 186). In some embodiments, the non-ferromagnetic colored pigment is safe to be in contact with foodstuffs. In some embodiments, the non-ferromagnetic colored pigment is a "generally recognized as safe" (GRAS) substance.

Ferromagnetic Substrates

Another aspect of the present disclosure provides a substrate comprising a polymeric material, and a film or an ink comprising a ferromagnetic material; wherein the ferromagnetic material is deposited on a surface of the substrate, and wherein the film or ink is a food contact substance.

The substrate can be a single-use bottle, a bottle cap, a single-use coffee cup, plastic cutlery, an eating utensil, a cutting utensil, a plastic tray, a plastic container, a food packaging container, an aluminum can, or any combination thereof. In some examples, the substrate has a mass that is less than about 20 grams. The film can be a label. In some cases, the film can be a shrink sleeve label, a pressure sensitive label, a roll fed label, a wrap label, a stretch label, a cut and stack label, a shrink bundling film, or any combination thereof.

In some examples, the ferromagnetic material can be a magnetizable coating or a magnetizable marker. The ferromagnetic material can be directly printed onto the surface of the substrate. The ferromagnetic material can be directly deposited on the surface of the substrate in the presence of a magnetic field to increase a magnetic permeability of the ferromagnetic element.

The mass of the ferromagnetic material can range from about 0.05% to 2% of the total mass of the substrate. In some embodiments, the mass of the ferromagnetic material ranges from about 0.05% to about 5% of the total mass of the substrate. In some embodiments, the mass of the ferromagnetic material ranges from at least about 0.05% of the total mass of the substrate. In some embodiments, the mass of the ferromagnetic material ranges from at most about 5% of the total mass of the substrate. In some embodiments, the mass of the ferromagnetic material ranges from about 0.05% to about 0.06%, about 0.05% to about 0.07%, about 0.05% to about 0.08%, about 0.05% to about 0.09%, about 0.05% to about 1%, about 0.05% to about 1.5%, about 0.05% to about 2%, about 0.05% to about 2.5%, about 0.05% to about 3%, about 0.05% to about 5%, about 0.06% to about 0.07%, about 0.06% to about 0.08%, about 0.06% to about 0.09%, about 0.06% to about 1%, about 0.06% to about 1.5%, about 0.06% to about 2%, about 0.06% to about 2.5%, about 0.06% to about 3%, about 0.06% to about 5%, about 0.07% to about 0.08%, about 0.07% to about 0.09%, about 0.07% to about 1%, about 0.07% to about 1.5%, about 0.07% to about 2%, about 0.07% to about 2.5%, about 0.07% to about 3%, about 0.07% to about 5%, about 0.08% to about 0.09%, about 0.08% to about 1%, about 0.08% to about 1.5%, about 0.08% to about 2%, about 0.08% to about 2.5%, about 0.08% to about 3%, about 0.08% to about 5%, about 0.09% to about 1%, about 0.09% to about 1.5%, about 0.09% to about 2%, about 0.09% to about 2.5%, about 0.09% to about 3%, about 0.09% to about 5%, about 1% to about 1.5%, about 1% to about 2%, about 1% to about 2.5%, about 1% to about 3%, about 1% to about 5%, about 1.5% to about 2%, about 1.5% to about 2.5%, about 1.5% to about 3%, about 1.5% to about 5%, about 2% to about 2.5%, about 2% to about 3%, about 2% to about 5%, about 2.5% to about 3%, about 2.5% to about 5%, or about 3% to about 5% of the total mass of the substrate. In some embodiments, the mass of the ferromagnetic material ranges from about 0.05%, about 0.06%, about 0.07%, about 0.08%, about 0.09%, about 1%, about 1.5%, about 2%, about 2.5%, about 3%, or about 5% of the total mass of the substrate.

The mass of the ferromagnetic material can range from about 0.05% to 2% of the total mass of the film. In some embodiments, the mass of the ferromagnetic material ranges from about 0.05% to about 5% of the total mass of the film. In some embodiments, the mass of the ferromagnetic material ranges from at least about 0.05% of the total mass of the film. In some embodiments, the mass of the ferromagnetic material ranges from at most about 5% of the total mass of the film. In some embodiments, the mass of the ferromagnetic material ranges from about 0.05% to about 0.06%, about 0.05% to about 0.07%, about 0.05% to about 0.08%, about 0.05% to about 0.09%, about 0.05% to about 1%, about 0.05% to about 1.5%, about 0.05% to about 2%, about 0.05% to about 2.5%, about 0.05% to about 3%, about 0.05% to about 5%, about 0.06% to about 0.07%, about 0.06% to about 0.08%, about 0.06% to about 0.09%, about 0.06% to about 1%, about 0.06% to about 1.5%, about 0.06% to about 2%, about 0.06% to about 2.5%, about 0.06% to about 3%, about 0.06% to about 5%, about 0.07% to about 0.08%, about 0.07% to about 0.09%, about 0.07% to about 1%, about 0.07% to about 1.5%, about 0.07% to about 2%, about 0.07% to about 2.5%, about 0.07% to about 3%, about 0.07% to about 5%, about 0.08% to about 0.09%, about 0.08% to about 1%, about 0.08% to about 1.5%, about 0.08% to about 2%, about 0.08% to about 2.5%, about 0.08% to about 3%, about 0.08% to about 5%, about 0.09% to about 1%, about 0.09% to about 1.5%, about 0.09% to about 2%, about 0.09% to about 2.5%, about 0.09% to about 3%, about 0.09% to about 5%, about 1% to about 1.5%, about 1% to about 2%, about 1% to about 2.5%, about 1% to about 3%, about 1% to about 5%, about 1.5% to about 2%, about 1.5% to about 2.5%, about 1.5% to about 3%, about 1.5% to about 5%, about 2% to about 2.5%, about 2% to about 3%, about 2% to about 5%, about 2.5% to about 3%, about 2.5% to about 5%, or about 3% to about 5% of the total mass of the film. In some embodiments, the mass of the ferromagnetic material ranges from about 0.05%, about 0.06%, about 0.07%, about 0.08%, about 0.09%, about 1%, about 1.5%, about 2%, about 2.5%, about 3%, or about 5% of the total mass of the film.

The shrink sleeve label can comprise less than about 5% difference in unrestrained shrinkage as compared to a shrink sleeve label that does not comprise a ferromagnetic material. In some embodiments, the shrink sleeve label comprises less than about 0.05% to about 5% difference in unrestrained shrinkage as compared to a shrink sleeve label that does not comprise a ferromagnetic material. In some embodiments, the shrink sleeve label comprises less than at least about 0.05% difference in unrestrained shrinkage as compared to a shrink sleeve label that does not comprise a ferromagnetic material. In some embodiments, the shrink sleeve label comprises less than at most about 5% difference in unrestrained shrinkage as compared to a shrink sleeve label that does not comprise a ferromagnetic material. In some embodiments, the shrink sleeve label comprises less than about 0.05% to about 0.06%, about 0.05% to about 0.07%, about 0.05% to about 0.08%, about 0.05% to about 0.09%, about 0.05% to about 1%, about 0.05% to about 1.5%, about 0.05% to about 2%, about 0.05% to about 2.5%, about 0.05% to about 3%, about 0.05% to about 5%, about 0.06% to about 0.07%, about 0.06% to about 0.08%, about 0.06% to about 0.09%, about 0.06% to about 1%, about 0.06% to about 1.5%, about 0.06% to about 2%, about 0.06% to about 2.5%, about 0.06% to about 3%, about 0.06% to about 5%, about 0.07% to about 0.08%, about 0.07% to about 0.09%, about 0.07% to about 1%, about 0.07% to about 1.5%, about 0.07% to about 2%, about 0.07% to about 2.5%, about 0.07% to about 3%, about 0.07% to about 5%, about 0.08% to about 0.09%, about 0.08% to about 1%, about 0.08% to about 1.5%, about 0.08% to about 2%, about 0.08% to about 2.5%, about 0.08% to about 3%, about 0.08% to about 5%, about 0.09% to about 1%, about 0.09% to about 1.5%, about 0.09% to about 2%, about 0.09% to about 2.5%, about 0.09% to about 3%, about 0.09% to about 5%, about 1% to about 1.5%, about 1% to about 2%, about 1% to about 2.5%, about 1% to about 3%, about 1% to about 5%, about 1.5% to about 2%, about 1.5% to about 2.5%, about 1.5% to about 3%, about 1.5% to about 5%, about 2% to about 2.5%, about 2% to about 3%, about 2% to about 5%, about 2.5% to about 3%, about 2.5% to about 5%, or about 3% to about 5% difference in unrestrained shrinkage as compared to a shrink sleeve label that does not comprise a ferromagnetic material. In some embodiments, the shrink sleeve label comprises less than about 0.05%, about 0.06%, about 0.07%, about 0.08%, about 0.09%, about 1%, about 1.5%, about 2%, about 2.5%, about 3%, or about 5% difference in unrestrained shrinkage as compared to a shrink sleeve label that does not comprise a ferromagnetic material.

The substrate or film can be magnetized upon exposure to a magnetic field. The substrate or film can be temporarily magnetized upon exposure to a magnetic field. The substrate or film can be separated from a plurality of non-magnetic, paramagnetic, or diamagnetic objects when magnetized. The substrate or film can be separated from a plurality of non-magnetic, paramagnetic, or diamagnetic objects when temporarily magnetized. The film can be separated from the substrate when magnetized. The film can be separated from the substrate when temporarily magnetized. The film comprises a plurality of flakes. For example, the film can be ground to a plurality of flakes (e.g., at a PET reclaiming facility) prior to being sorted and separated from a plurality of non-film flakes.

The magnetization of the substrate or film can be achieved by the application of a magnetic field. The magnetic field can have a magnetic field strength of at least about 1,000 gauss (G). The magnetic field can have a magnetic field strength of at most about 1,000 gauss (G). In some embodiments, the magnetic field has a magnetic field strength ranging from at least about 1 G to about 15,000 G or more. In some embodiments, the magnetic field has a magnetic field strength ranging from at least about 1 G. In some embodiments, the magnetic field has a magnetic field strength ranging from at most about 15,000 G. In some embodiments, the magnetic field has a magnetic field strength ranging from about 1 G to about 250 G, about 1 G to about 500 G, about 1 G to about 750 G, about 1 G to about 1,000 G, about 1 G to about 2,500 G, about 1 G to about 5,000 G, about 1 G to about 7,500 G, about 1 G to about 10,000 G, about 1 G to about 15,000 G, about 250 G to about 500 G, about 250 G to about 750 G, about 250 G to about 1,000 G, about 250 G to about 2,500 G, about 250 G to about 5,000 G, about 250 G to about 7,500 G, about 250 G to about 10,000 G, about 250 G to about 15,000 G, about 500 G to about 750 G, about 500 G to about 1,000 G, about 500 G to about 2,500 G, about 500 G to about 5,000 G, about 500 G to about 7,500 G, about 500 G to about 10,000 G, about 500 G to about 15,000 G, about 750 G to about 1,000 G, about 750 G to about 2,500 G, about 750 G to about 5,000 G, about 750 G to about 7,500 G, about 750 G to about 10,000 G, about 750 G to about 15,000 G, about 1,000 G to about 2,500 G, about 1,000 G to about 5,000 G, about 1,000 G to about 7,500 G, about 1,000 G to about 10,000 G, about 1,000 G to about 15,000 G, about 2,500 G to about 5,000 G, about 2,500 G to about 7,500 G, about 2,500 G to about 10,000 G, about 2,500 G to about 15,000 G, about 5,000 G to about 7,500 G, about 5,000 G to about 10,000 G, about 5,000 G to about 15,000 G, about 7,500 G to about 10,000 G, about 7,500 G to about 15,000 G, or about 10,000 G to about 15,000 G. In some embodiments, the magnetic field has a magnetic field strength ranging from about 1 G, about 250 G, about 500 G, about 750 G, about 1,000 G, about 2,500 G, about 5,000 G, about 7,500 G, about 10,000 G, or about 15,000 G.

The magnetic field can be produced by a magnetic separation device. In some instances, the magnetic separation device is a hand-held magnet, a commercial drum-type separator, an over-band magnetic separator, a magnetic head pulley, or any combination thereof.

The magnetic separation device can have at least about 50% separation recovery. In other instances, the magnetic separation device has at least about 80% separation recovery. In some embodiments, the separation recovery of the magnetic separation device is calculated when tested without any "burden depth." In some embodiments, the magnetic separation device has a separation recovery ranging from about 50% to about 100%. In some embodiments, the magnetic separation device has a separation recovery ranging from at least about 50%. In some embodiments, the magnetic separation device has a separation recovery ranging from at most about 100%. In some embodiments, the magnetic separation device has a separation recovery ranging from about 50% to about 60%, about 50% to about 70%, about 50% to about 80%, about 50% to about 90%, about 50% to about 100%, about 60% to about 70%, about 60% to about 80%, about 60% to about 90%, about 60% to about 100%, about 70% to about 80%, about 70% to about 90%, about 70% to about 100%, about 80% to about 90%, about 80% to about 100%, or about 90% to about 100%. In some embodiments, the magnetic separation device has a separation recovery ranging from about 50%, about 60%, about 70%, about 80%, about 90%, or about 100%.

The ferromagnetic material can be printed onto the film. The ferromagnetic can be printed onto the substrate. The ferromagnetic material can comprise a ferromagnetic ink composition. In some embodiments, the ink comprises a ferromagnetic ink composition. The ferromagnetic ink composition can comprise a ferromagnetic material, a resin, and a wetting and/or a dispersing agent, as described supra. In some embodiments, the ferromagnetic ink composition comprises a ferromagnetic material, a resin, an anti-settling additive, and a wetting and/or a dispersing agent. An "anti-settling agent" as used herein refers to an agent used for preventing the formation of hard deposit, or the settlement of pigments or other solid particles, for example, in coating compositions. The anti-settling agent helps in eliminating the heavy settling of coating compositions. In some embodiments, the anti-settling additive is fumed silica, polyamide derivatives, waxes or any combination thereof. The ferromagnetic material can comprise at least 20% of the weight of the ferromagnetic ink composition. In some embodiments, the ferromagnetic material comprises less than 20% of the weight of the ferromagnetic ink composition. In some embodiments, the ferromagnetic material comprises from 0.1% to 20% of the weight of the ferromagnetic ink composition. In some embodiments, the ferromagnetic material comprises from 0.1% to less than 20% of the weight of the ferromagnetic ink composition. In some embodiments, the ferromagnetic material is an ingestible ferromagnetic pigment. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel, aluminum, and/or copper. In some embodiments, the iron oxide is iron (III) oxide or iron (II, III) oxide. In some embodiments, the iron alloy is a crystalline or an amorphous metallic alloy comprising cobalt, vanadium manganese, molybdenum, silicon, nickel, boron, aluminum, and/or copper, or any combination thereof.

In some embodiments, the resin comprises at least 5% of the weight of the ferromagnetic ink composition. In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof.

In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof.

In some embodiments, the ferromagnetic ink composition further comprises at least one solvent, wherein the solvent comprises at least 25% of the weight of the ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof.

In some embodiments, the ferromagnetic ink composition comprises a ferromagnetic material/resin ratio ranging from about 1/80 to 6/1. In some embodiments, the ferromagnetic ink composition comprises a ferromagnetic material/resin ratio ranging from about 1/10 to 3/1. In some embodiments, the ferromagnetic ink composition comprises a ferromagnetic material/resin ratio ranging from about 1/5 to 2/1. In some embodiments, the ferromagnetic ink composition comprises a ferromagnetic material/resin ratio ranging from about 1/6 to about 6/1. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1.

In some embodiments, all components of the ferromagnetic ink composition are indirect food additives. In some embodiments, the indirect food additives are Generally Recognized as Safe (GRAS) substances. In some embodiments, the indirect food additives are FDA-approved food additives, as listed by in Title 21 of the Code of Federal Regulations.

In some embodiments, the ferromagnetic ink composition is deposited in at least one layer. In some embodiments, the label is a transparent or translucent label. In some embodiments, the label is a translucent label. In some embodiments, the magnetizable coating or magnetizable marker is a transparent or translucent magnetizable coating or a transparent or translucent magnetizable marker. In some embodiments, the magnetizable coating or magnetizable marker is a transparent magnetizable coating or a transparent magnetizable marker.

In some embodiments, the label, the magnetizable coating, the magnetizable marker or the ferromagnetic material film described herein is configured to avoid partially or completely covering or shielding the commercial artwork or graphics of the substrate of which surface the label, the magnetizable coating, the magnetizable marker or the ferromagnetic material film is printed, affixed, or deposited onto. In some embodiments, the examples of the substrate include, but are not limited to, an aluminum can, a single-use bottle, a bottle cap, a single-use coffee cup, plastic cutlery, an eating utensil, a cutting utensil, a plastic tray, a plastic container, a food packaging container, or any combination thereof. In some embodiments, the label, the magnetizable coating, the magnetizable marker or the ferromagnetic material film described herein is engineered to achieve a predetermined level of transparency or luminous transmittance, such that the application of the label, the magnetizable coating, the magnetizable marker or the ferromagnetic material film does not partially or completely block or obstruct the appearance of the commercial artwork or graphics of the substrate. In some embodiments, the ferromagnetic ink composition described herein is tailored to have a certain haze value or have a minimal effect on the haze value of the label, the coating, the marker or the film, such that the commercial artwork or graphics of the substrate are clearly or unopaquely visible through the label, the magnetizable coating, the magnetizable marker or the ferromagnetic material film.

A "haze value" as used herein refers to the amount of light that is diffused or scattered when passing through a transparent or translucent material. Haze is measured with a wide angle scattering test in which light is diffused in all directions which results in a loss of contrast. The haze of a transparent sample describes the amount of light scattering, when the light passes the sample. It is defined as the percentage of transmitted light, which in passing through the specimen deviates from the incident beam by forward scattering. That percentage of light that when passing through deviates from the incident beam by greater than 2.5 degrees on average is defined as haze. See through quality is measured with a narrow angle scattering test in which light is diffused in a small range with high concentration. This test measures the clarity with which finer details can be seen through the object being tested. The transparent or translucent film needs the light to be less diffused so that the contents can be seen clearly. The haze meter also measures total transmittance. Total transmittance is the measure of the total incident light compared to the light that is actually transmitted (e.g., total transmittance). So, the incident light may be 100%, but because of absorption and reflection the total transmittance may only be 94%.

In some embodiments, change in haze values due to the application of the transparent or translucent coating on transparent or translucent label should be less than 9% and preferably, less than 5%. In some embodiments, overall haze values of label and coating combined should be less than 17% and preferably, less than 12%. In some embodiments, haze values are identified as measured using ASTM D1003-13: Standard Test Method for Haze and Luminous Transmittance of Transparent Plastics. In some embodiments, overall visible transmission values of label and coating combined should be greater than 82% and preferably, greater than 90%. In some embodiments, overall NIR transmission values of label and coating combined should be greater than 87% and preferably, greater than 90%. In some embodiments, application of the transparent or translucent coating should cause no change in the look of commercial artwork/graphics used on a printed label.

In some embodiments, the transparent or translucent label, the transparent or translucent magnetizable coating, or the transparent or translucent magnetizable marker are transparent or translucent to visible light and/or near infrared light (NIR). In some embodiments, the film is a multilayer film or a co-extruded film. In some embodiments, the multilayer film or the co-extruded film comprises at least 2 layers of films. In some embodiments, the multilayer film or the co-extruded film comprises from about at least 3 layers of films to about at most 12 layers of films.

In some embodiments, the film is a polymer film. In some embodiments, the polymer film is a polyethylene (PE) film, a high density polyethylene (HDPE) film, a low density polyethylene (LDPE) film, a linear low density polyethylene (LLDPE) film, a polypropylene (PP) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof. In some embodiments, the polymer film is a polyethylene (PE) film, a high density polyethylene (HDPE) film, a low density polyethylene (LDPE) film, a linear low density polyethylene (LLDPE) film, an oriented polypropylene (OPP) film, a biaxially oriented polypropylene (BOPP) film, an oriented polystyrenes (OPS) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof. In some embodiments, the ionomer film is an ethylene acrylic acid copolymer (EAA) or an ethylene (meth)acrylic acid copolymer (EMAA).

In some embodiments, the ferromagnetic ink composition is suitable for flexographic printing, gravure printing, intaglio printing, pad printing, screen printing, offset printing, or any combination thereof.

In some embodiments, the polymeric material is polyethylene terephthalate (PET), polyester, polyethylene (PE), polycarbonate (PC), polystyrene (PS), polyvinyl chloride (PVC), post-consumer resin (PCR), styrene butadiene copolymer (SBC), high density polyethylene (HDPE), fluorine-treated HDPE, low density polyethylene (LDPE), linear low density polyethylene (LLDPE), polypropylene (PP), bio-plastic, bisphenol-A (BPA), ethylene-vinyl alcohol (EVOH), polyamide (Nylon or PA), an ionomer, ethylene vinyl acetate (EVA), or any combination thereof.

In an aspect, the present disclosure provides a ferromagnetic material film comprising: a film comprising a ferromagnetic ink composition. In some embodiments, the ferromagnetic ink composition of the ferromagnetic material film comprises a ferromagnetic material, a resin, and a wetting and/or a dispersing agent. In some embodiments, the ferromagnetic ink composition comprises a ferromagnetic material, a resin, an anti-settling additive, and a wetting and/or a dispersing agent. The term "anti-settling agent" as used herein refers to an agent used for preventing the formation of hard deposit, or the settlement of pigments or other solid particles, for example, in coating compositions. The anti-settling agent helps in eliminating the heavy settling of coating compositions. In some embodiments, the anti-settling additive is fumed silica, polyamide derivatives, waxes or any combination thereof. In some embodiments, the ferromagnetic material comprises at least 20% of the weight of said ferromagnetic ink composition. In some embodiments, the ferromagnetic material comprises less than 20% of the weight of the ferromagnetic ink composition. In some embodiments, the ferromagnetic material comprises from 0.1% to 20% of the weight of the ferromagnetic ink composition. In some embodiments, the ferromagnetic material comprises from 0.1% to less than 20% of the weight of the ferromagnetic ink composition. In some embodiments, the ferromagnetic material is an ingestible ferromagnetic pigment. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy comprises cobalt, vanadium manganese, molybdenum, silicon, nickel, boron, aluminum, copper, or any combination thereof. In some embodiments, the iron oxide is iron (III) oxide or iron (II, III) oxide. In some embodiments, the resin comprises at least 5% of the weight of said ferromagnetic ink composition. In some embodiments, the resin is a vinyl chloride vinyl acetate co-polymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof. In some embodiments, the wetting and/or said dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof.

In some embodiments, the ferromagnetic ink composition of the ferromagnetic material film further comprises at least one solvent, wherein said solvent comprises at least 25% of the weight of said ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof. In some embodiments, the ferromagnetic ink composition comprises a ferromagnetic material/resin ratio ranging from about 1/80 to 6/1. In some embodiments, the ferromagnetic ink composition comprises a ferromagnetic material/resin ratio ranging from about 1/10 to 3/1. In some embodiments, the ferromagnetic ink composition comprises a ferromagnetic material/resin ratio ranging from about 1/5 to 2/1. In some embodiments, the ferromagnetic ink composition comprises a ferromagnetic material/resin ratio ranging from about 1/6 to about 6/1. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1. In some embodiments, all components of the ferromagnetic ink composition are indirect food additives. In some embodiments, the indirect food additives are Generally Recognized as Safe (GRAS) substances. In some embodiments, the indirect food additives are FDA-approved food additives, as listed by in Title 21 of the Code of Federal Regulations.

In some embodiments, the film of the ferromagnetic material film is printed with the ferromagnetic ink composition. In some embodiments, the ferromagnetic ink composition is deposited in at least one layer. In some embodiments, the film is a food contact substance. In some embodiments, the film is a label. In some embodiments, the label is a self-adhesive label. In some embodiments, the film is a shrink sleeve label, a pressure sensitive label, a roll fed label, a wrap label, a stretch label, a cut and stack label, a shrink bundling film, or any combination thereof. In some embodiments, the shrink sleeve label comprises less than about 5% difference in unrestrained shrinkage as compared to a shrink sleeve label that does not comprise said ferromagnetic ink composition. In some embodiments, the weight of said ferromagnetic material ranges from about 0.05% to 2% of the total mass of said film.

In some embodiments, the film ferromagnetic material film is magnetized upon exposure to a magnetic field. In some embodiments, the film ferromagnetic material film is temporarily magnetized upon exposure to a magnetic field. In some embodiments, the film is separated from a plurality of non-magnetic, paramagnetic, or diamagnetic objects when magnetized. In some embodiments, the film is separated from a plurality of non-magnetic, paramagnetic, or diamagnetic objects when temporarily magnetized. In some embodiments, the film is separated from said substrate when magnetized. In some embodiments, the film is separated from said substrate when temporarily magnetized. In some embodiments, the film comprises a plurality of flakes.

In some embodiments, the magnetic field has a magnetic field strength of at least about 1,000 gauss (G). In some embodiments, the magnetic field has a magnetic field strength of at most about 1,000 gauss (G). In some embodiments, the magnetic field is produced by a magnetic separation device. In some embodiments, the magnetic separation device is a hand-held magnet, a commercial drum-type separator, an over-band magnetic separator, a magnetic head pulley, or any combination thereof. In some embodiments, the magnetic separation device has at least about 50% separation recovery. In some embodiments, the magnetic separation device has at least about 80% separation recovery.

In some embodiments, the label of the ferromagnetic material film is a transparent or translucent label. In some embodiments, the transparent or translucent label is transparent or translucent to visible light and/or near infrared light (NIR). In some embodiments, the film is a multilayer film or a co-extruded film. In some embodiments, the multilayer film or said co-extruded film comprises at least 2 layers of films. In some embodiments, the multilayer film or said co-extruded film comprises from about at least 3 layers of films to about at most 12 layers of films. In some embodiments, the film is a polymer film. In some embodiments, the polymer film is a polyethylene (PE) film, a high density polyethylene (HDPE) film, a low density polyethylene (LDPE) film, a linear low density polyethylene (LLDPE) film, a polypropylene (PP) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof. In some embodiments, the polymer film is a polyethylene (PE) film, a high density polyethylene (HDPE) film, a low density polyethylene (LDPE) film, a linear low density polyethylene (LLDPE) film, an oriented polypropylene (OPP) film, a biaxially oriented polypropylene (BOPP) film, an oriented polystyrene (OPS) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof. In some embodiments, the ionomer film is an ethylene acrylic acid copolymer (EAA) or an ethylene (meth)acrylic acid copolymer (EMAA).

In some embodiments, the ferromagnetic ink composition of the ferromagnetic material film is suitable for flexographic printing, gravure printing, intaglio printing, pad printing, screen printing, off-set printing, or any combination thereof. In some embodiments, the film is printed with said ferromagnetic ink composition by flexographic printing, gravure printing, intaglio printing, pad printing, screen printing, offset printing, or any combination thereof. In some embodiments, the ferromagnetic material film is configured to be affixed to a surface of an aluminum can, a single-use bottle, a bottle cap, a single-use coffee cup, plastic cutlery, an eating utensil, a cutting utensil, a plastic tray, a plastic container, a food packaging container, or any combination thereof.

In an aspect, the present disclosure provides a method of manufacturing the substrate or the ferromagnetic material film as described herein.

Ferromagnetic Labels

Figure 4A:
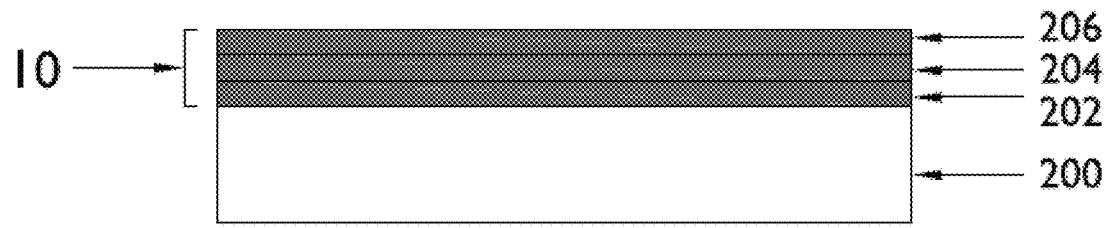
FIGS. 4A-4B illustrate an exemplary film comprising a ferromagnetic label.
Figure 4B:

Another aspect of the present disclosure provides a ferromagnetic label, comprising: a ferromagnetic ink composition, a film, a release varnish, and an adhesive layer. FIG. 4A illustrates an example of a film 200 (e.g., a polyester film) comprising a ferromagnetic label 10. In some embodiments, the ferromagnetic label 10 comprises a release varnish 202, a ferromagnetic ink composition 204, and an adhesive layer 206, as shown in FIG. 4A. In another example, FIG. 4B illustrates a plastic object 100 that has a ferromagnetic label 10 displaced thereupon. In this example, the ferromagnetic label 10 comprising a release varnish 202, a ferromagnetic ink composition 204, and an adhesive layer 206 is placed on the surface of the plastic object 100, as shown in FIG. 4B. In some embodiments, the three different layers (i.e., the release varnish 202, the ferromagnetic ink composition 204, and the adhesive layer 206) are deposited on the surface of the film 200 in the order shown in FIGS. 4A and 4B. In some embodiments, the three different layers are deposited on the surface of the film in the following order: a ferromagnetic ink composition, a release varnish, and an adhesive layer. In some embodiments, the ferromagnetic label comprises from about 1 layer of release varnish to about 10 layers of release varnish. In some embodiments, the ferromagnetic label comprises from about 1 adhesive layer to about 10 adhesive layers.

In some embodiments, the release varnish is SB-HT from Sungbo Inks or S-125B from Sungjin Inks. In some embodiments, the adhesive layer is SB-HT PP-1-A from Sungbo Inks or S-1042 from Sungjin Inks.

In some embodiments, the ferromagnetic ink composition is any ferromagnetic ink composition described elsewhere herein. In some embodiments, the ferromagnetic ink composition does not contaminate the underlying release layer and adhesive property of overlaying adhesive layer. In some embodiments, the ferromagnetic ink composition does not affect the release property of underlying release layer and adhesive property of overlaying adhesive layer.

In some embodiments, the ferromagnetic label comprises at least one layer of ferromagnetic ink composition. In some embodiments, the ferromagnetic label comprises at least two layers of ferromagnetic ink composition. In some embodiments, the ferromagnetic label comprises at least three layers of ferromagnetic ink composition. In some embodiments, the ferromagnetic label comprises at least four layers of ferromagnetic ink composition. In some embodiments, the ferromagnetic label comprises about five layers of ferromagnetic ink composition. In some embodiments, the ferromagnetic label comprises about six layers of ferromagnetic ink composition. In some embodiments, the ferromagnetic label comprises about seven layers of ferromagnetic ink composition. In some embodiments, the ferromagnetic label comprises about eight layers of ferromagnetic ink composition. In some embodiments, the ferromagnetic label comprises about ten layers of ferromagnetic ink composition.

In some embodiments, the ferromagnetic ink composition layers give aesthetic appeal to the label. In some embodiments, the ferromagnetic ink composition layers ensure label is ferromagnetic. In some embodiments, the ferromagnetic ink composition layers do not compromise the release property of underlying release varnish. In some embodiments, the ferromagnetic ink composition layers do not compromise the adhesive property of overlaying adhesive layer. In some embodiments, the ferromagnetic ink composition layers provide the functional characteristic of being ferromagnetic upon contact with a magnetic field.

In some embodiments, the magnetizable ink or coating is transparent or translucent to visible light as well as near infrared radiation (NIR) after printing onto the label. Visible light is characterized as light with wavelength of about 400-800 nm while near infrared red (NIR) radiation has wavelengths of about 780-2500 nm.

An exemplary embodiment of the label is a transparent or translucent shrink sleeve label where the magnetic coating does not affect the unrestrained linear shrinkage.

Another exemplary embodiment of the label is a transparent or translucent pressure sensitive label where the magnetic coating does not affect adhesion to the substrate.

In some embodiments, gravure printing comprises printing of ferromagnetic ink composition layers on a film. In some embodiments, the film is a polyester film. Non-limiting examples of film material types that are used in ferromagnetic labels include polyvinylchloride, polypropylene, biaxially oriented polypropylene, low density polyethylene, and high density poly ethylene.

In some embodiments, the film has a thickness of about 15 micron ($\mu$m) to about 25 $\mu$m. In some embodiments, the film has a thickness of about 10 $\mu$m to about 25 $\mu$m. In some embodiments, the film has a thickness of about 10 $\mu$m. In some embodiments, the film has a thickness of about 25 $\mu$m. In some embodiments, the film has a thickness of about 10 $\mu$m to about 15 $\mu$m, about 10 $\mu$m to about 16 $\mu$m, about 10 $\mu$m to about 17 $\mu$m, about 10 $\mu$m to about 18 $\mu$m, about 10 $\mu$m to about 19 $\mu$m, about 10 $\mu$m to about 20 $\mu$m, about 10 $\mu$m to about 21 $\mu$m, about 10 $\mu$m to about 22 $\mu$m, about 10 $\mu$m to about 23 $\mu$m, about 10 $\mu$m to about 24 $\mu$m, about 10 $\mu$m to about 25 $\mu$m, about 15 $\mu$m to about 16 $\mu$m, about 15 $\mu$m to about 17 $\mu$m, about 15 $\mu$m to about 18 $\mu$m, about 15 $\mu$m to about 19 $\mu$m, about 15 $\mu$m to about 20 $\mu$m, about 15 $\mu$m to about 21 $\mu$m, about 15 $\mu$m to about 22 $\mu$m, about 15 $\mu$m to about 23 $\mu$m, about 15 $\mu$m to about 24 $\mu$m, about 15 $\mu$m to about 25 $\mu$m, about 16 $\mu$m to about 17 $\mu$m, about 16 $\mu$m to about 18 $\mu$m, about 16 $\mu$m to about 19 $\mu$m, about 16 $\mu$m to about 20 $\mu$m, about 16 $\mu$m to about 21 $\mu$m, about 16 $\mu$m to about 22 $\mu$m, about 16 $\mu$m to about 23 $\mu$m, about 16 $\mu$m to about 24 $\mu$m, about 16 $\mu$m to about 25 $\mu$m, about 17 $\mu$m to about 18 $\mu$m, about 17 $\mu$m to about 19 $\mu$m, about 17

μm to about 20 μm, about 17 μm to about 21 μm, about 17 μm to about 22 μm, about 17 μm to about 23 μm, about 17 μm to about 24 μm, about 17 μm to about 25 μm, about 18 μm to about 19 μm, about 18 μm to about 20 μm, about 18 μm to about 21 μm, about 18 μm to about 22 μm, about 18 μm to about 23 μm, about 18 μm to about 24 μm, about 18 μm to about 25 μm, about 19 μm to about 20 μm, about 19 μm to about 21 μm, about 19 μm to about 22 μm, about 19 μm to about 23 μm, about 19 μm to about 24 μm, about 19 μm to about 25 μm, about 20 μm to about 21 μm, about 20 μm to about 22 μm, about 20 μm to about 23 μm, about 20 μm to about 24 μm, about 20 μm to about 25 μm, about 21 μm to about 22 μm, about 21 μm to about 23 μm, about 21 μm to about 24 μm, about 21 μm to about 25 μm, about 22 μm to about 23 μm, about 22 μm to about 24 μm, about 22 μm to about 25 μm, about 23 μm to about 24 μm, about 23 μm to about 25 μm, or about 24 μm to about 25 μm. In some embodiments, the film has a thickness of about 10 μm, about 15 μm, about 16 μm, about 17 μm, about 18 μm, about 19 μm, about 20 μm, about 21 μm, about 22 μm, about 23 μm, about 24 μm, or about 25 μm.

In some embodiments, the release varnish facilitates release of ferromagnetic ink composition layers. In some embodiments, the function of the release varnish is to help in the release of subsequent printed layers during transfer process. In some embodiments, the ferromagnetic label is transferred to a material upon application of heat and/or pressure. In some embodiments, the ferromagnetic label is mechanically affixed on a surface of the plastic object. In some embodiments, the function of the release varnish is to help in the release of subsequent printed layers during application of heat and pressure. In some embodiments, upon completion of the transfer process, the release varnish acts a protective layer to underlying layers.

In some embodiments, the adhesive layer adheres to a material. In some embodiments, the material is a plastic object and/or a metal object. In some embodiments, the material is any of the plastic objects described supra. In some embodiments, the adhesive layer activates upon application of heat and pressure during transfer process (i.e., during the transfer of the ferromagnetic label to the surface of an object). In some embodiments, the adhesive layer forms a strong bond with the surface of the object (e.g., a plastic object). In some embodiments, after the transfer process (i.e., after the ferromagnetic label has been transferred to the surface of an object) the adhesive layer acts as an anchor layer between the surface of the object and the overlaying ferromagnetic ink composition plus the release varnish.

In some embodiments, the ferromagnetic ink composition is suitable for flexographic printing, gravure printing, intaglio printing, pad printing, screen printing, offset printing, or any combination thereof.

In some embodiments, the ferromagnetic label has a sufficient magnetic strength suitable for a magnet-induced separation process. In some embodiments, the magnet-induced separation process occurs at a PET reclaiming facility.

Other Compositions

Another aspect of the disclosure provides a composition comprising a plurality of non-metallic objects, and at least one ferromagnetic plastic object; wherein the at least one ferromagnetic plastic object is less than about 4 inches in any one dimension.

In some embodiments, the plurality of non-metallic objects is a plurality of paper objects. In some embodiments, the plurality of paper objects is a plurality of waste paper objects. Non-limiting examples of waste paper objects include cardboard, magazines, newspapers, books, office paper, sheets of paper, paperboard, paper cardboard dairy, juice cartons, mixed paper and phone books. In some embodiments, about 90% of the plurality of non-metallic objects, by weight, is a plurality of paper objects. In some embodiments, the ferromagnetic plastic object is magnetized upon exposure to a magnetic field. In some embodiments, the ferromagnetic plastic object is temporarily magnetized upon exposure to a magnetic field. In some embodiments, the ferromagnetic plastic object is separated from the plurality of non-metallic objects when magnetized. In some embodiments, the ferromagnetic plastic object is separated from the plurality of non-metallic objects when temporarily magnetized. In some embodiments, the magnetic field has a magnetic flux density ranging from about 3000 gauss (G) to about 12,000 G. In some embodiments, the magnetic field is produced by a commercial drum-type separator, an overband magnetic separator, a magnetic head pulley or a combination thereof.

In some embodiments, the composition further comprises at least one metal object. Non-limiting examples of the metal object include aluminum cans, aluminum foil, bakeware, steel cans, and tin cans. In some embodiments, the composition further comprises at least one glass object. Non-limiting examples of the metal object include clear glass, flint glass, brown glass, amber glass, green glass, and emerald glass. In some embodiments, the ferromagnetic plastic object that has a ferromagnetic ink composition displaced thereupon (e.g., as described supra).

Magnetizable Plastic Objects

Another aspect of the present disclosure provides a plastic object that has a ferromagnetic material displaced thereupon in the form of a film or ink deposited on the surface of the plastic object.

In some embodiments, the plastic object is less than about 20 grams (g) in weight. In some embodiments, the plastic object weighs about 0.5 g to about 20 g. In some embodiments, the plastic object weighs about 0.5 g. In some embodiments, the plastic object weighs about 20 g. In some embodiments, the plastic object weighs about 0.5 g to about 1 g, about 0.5 g to about 2 g, about 0.5 g to about 3 g, about 0.5 g to about 4 g, about 0.5 g to about 5 g, about 0.5 g to about 6 g, about 0.5 g to about 7 g, about 0.5 g to about 8 g, about 0.5 g to about 9 g, about 0.5 g to about 10 g, about 0.5 g to about 20 g, about 1 g to about 2 g, about 1 g to about 3 g, about 1 g to about 4 g, about 1 g to about 5 g, about 1 g to about 6 g, about 1 g to about 7 g, about 1 g to about 8 g, about 1 g to about 9 g, about 1 g to about 10 g, about 1 g to about 20 g, about 2 g to about 3 g, about 2 g to about 4 g, about 2 g to about 5 g, about 2 g to about 6 g, about 2 g to about 7 g, about 2 g to about 8 g, about 2 g to about 9 g, about 2 g to about 10 g, about 2 g to about 20 g, about 3 g to about 4 g, about 3 g to about 5 g, about 3 g to about 6 g, about 3 g to about 7 g, about 3 g to about 8 g, about 3 g to about 9 g, about 3 g to about 10 g, about 3 g to about 20 g, about 4 g to about 5 g, about 4 g to about 6 g, about 4 g to about 7 g, about 4 g to about 8 g, about 4 g to about 9 g, about 4 g to about 10 g, about 4 g to about 20 g, about 5 g to about 6 g, about 5 g to about 7 g, about 5 g to about 8 g, about 5 g to about 9 g, about 5 g to about 10 g, about 5 g to about 20 g, about 6 g to about 7 g, about 6 g to about 8 g, about 6 g to about 9 g, about 6 g to about 10 g, about 6 g to about 20 g, about 7 g to about 8 g, about 7 g to about 9 g, about 7 g to about 10 g, about 7 g to about 20 g, about 8 g to about 9 g, about 8 g to about 10 g, about 8 g to about 20 g, about 9 g to about 10 g, about 9 g to about 20 g, or about 10 g to about 20 g. In some embodiments, the plastic object weighs about 0.5 g, about 1 g, about 2 g, about 3 g, about 4 g, about 5 g, about 6 g, about 7 g, about 8 g, about 9 g, about 10 g, or about 20 g.

In some embodiments, the film or ink is a food contact substance. In some embodiments, all elements of the film or ink are FDA-approved food additives as listed in Title 21 of the Code of Federal Regulations (see sections 175-178). In some embodiments, all elements of the film or ink are selected from the list of generally recognized as safe (GRAS) substances, as listed by the Food and Drug Safety Administration (FDA) in Title 21 of the Code of Federal Regulations (see sections 182, 184, 186).

In some embodiments, the ferromagnetic material is directly printed onto the surface of the plastic object. In some embodiments, the ferromagnetic material is directly deposited on the surface of the plastic object in the presence of a magnetic field to increase a magnetic permeability of the ferromagnetic material. In some embodiments, the design of a plastic object which is imprinted with ink or affixed with a pre-printed label containing ink enables the separation of the desired object from a mixed-waste stream under application of a magnetic field. In some embodiments, when exposed to a magnetic field of about 3000 to about 7000 gauss (G) in strength with a magnetic gradient of about 2 Tesla/meter, the plastic object described above is able to experience a force comparable to its own weight. In some embodiments, the plastic object described in the present disclosure is capable of being attracted by a magnetic field of a commercial drum-type, over band magnetic separator or a magnetic head pulley.

In some embodiments, the present disclosure provides methods to employ the use of novel geometric surface designs on a plastic object which is imprinted with ferromagnetic coating. In some embodiments, these designs can be directly on the final plastic object 100 or plastic film labels 104 which will be subsequently affixed on a plastic object. In some embodiments, the surface of the plastic object or film label is designed in such a way that increases printable surface area on the plastic object without significant change in dimensions of the object. An embodiment of such a design can be found in FIG. 2B where microwells are designed on plastic object 100 and are subsequently coated with printable ferromagnetic ink 102. Another embodiment of such design can be found in FIG. 2C where a saw tooth shape is designed on the plastic object 100 and subsequently coated with printable ink 102. In some embodiments, such designs can be applied on a removable label 104 which are pre-printed with a ferromagnetic ink 102.

In some embodiments, the microwell has a diameter of about 0.25 mm and a depth of about 0.25 mm depth. In some embodiments, the distance between two microwells is about 0.5 mm.

In some embodiments, the microwell has a diameter of about 0.25 mm to about 1 mm. In some embodiments, the microwell has a diameter of about 0.25 mm. In some embodiments, the microwell has a diameter of about 1 mm. In some embodiments, the microwell has a diameter of about 0.25 mm to about 0.3 mm, about 0.25 mm to about 0.4 mm, about 0.25 mm to about 0.5 mm, about 0.25 mm to about 0.6 mm, about 0.25 mm to about 0.7 mm, about 0.25 mm to about 0.8 mm, about 0.25 mm to about 0.9 mm, about 0.25 mm to about 1 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.6 mm to about 0.7 mm, about 0.6 mm to about 0.8 mm, about 0.6 mm to about 0.9 mm, about 0.6 mm to about 1 mm, about 0.7 mm to about 0.8 mm, about 0.7 mm to about 0.9 mm, about 0.7 mm to about 1 mm, about 0.8 mm to about 0.9 mm, about 0.8 mm to about 1 mm, or about 0.9 mm to about 1 mm. In some embodiments, the microwell has a diameter of about 0.25 mm, about 0.3 mm, about 0.4 mm, about 0.5 mm, about 0.6 mm, about 0.7 mm, about 0.8 mm, about 0.9 mm, or about 1 mm.

In some embodiments, the microwell has a depth of about 0.1 mm to about 1 mm. In some embodiments, the microwell has a depth of about 0.1 mm. In some embodiments, the microwell has a depth of about 1 mm. In some embodiments, the microwell has a depth of about 0.1 mm to about 0.25 mm, about 0.1 mm to about 0.3 mm, about 0.1 mm to about 0.4 mm, about 0.1 mm to about 0.5 mm, about 0.1 mm to about 0.6 mm, about 0.1 mm to about 0.7 mm, about 0.1 mm to about 0.8 mm, about 0.1 mm to about 0.9 mm, about 0.1 mm to about 1 mm, about 0.25 mm to about 0.3 mm, about 0.25 mm to about 0.4 mm, about 0.25 mm to about 0.5 mm, about 0.25 mm to about 0.6 mm, about 0.25 mm to about 0.7 mm, about 0.25 mm to about 0.8 mm, about 0.25 mm to about 0.9 mm, about 0.25 mm to about 1 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.6 mm to about 0.7 mm, about 0.6 mm to about 0.8 mm, about 0.6 mm to about 0.9 mm, about 0.6 mm to about 1 mm, about 0.7 mm to about 0.8 mm, about 0.7 mm to about 0.9 mm, about 0.7 mm to about 1 mm, about 0.8 mm to about 0.9 mm, about 0.8 mm to about 1 mm, or about 0.9 mm to about 1 mm. In some embodiments, the microwell has a depth of about 0.1 mm, about 0.25 mm, about 0.3 mm, about 0.4 mm, about 0.5 mm, about 0.6 mm, about 0.7 mm, about 0.8 mm, about 0.9 mm, or about 1 mm.

In some embodiments, the distance between two microwells is about 0.1 mm to about 1 mm. In some embodiments, the distance between two microwells is about 0.1 mm. In some embodiments, the distance between two microwells is about 1 mm. In some embodiments, the distance between two microwells is about 0.1 mm to about 0.25 mm, about 0.1 mm to about 0.3 mm, about 0.1 mm to about 0.4 mm, about 0.1 mm to about 0.5 mm, about 0.1 mm to about 0.6 mm, about 0.1 mm to about 0.7 mm, about 0.1 mm to about 0.8 mm, about 0.1 mm to about 0.9 mm, about 0.1 mm to about 1 mm, about 0.25 mm to about 0.3 mm, about 0.25 mm to about 0.4 mm, about 0.25 mm to about 0.5 mm, about 0.25 mm to about 0.6 mm, about 0.25 mm to about 0.7 mm, about 0.25 mm to about 0.8 mm, about 0.25 mm to about 0.9 mm, about 0.25 mm to about 1 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.6 mm to about 0.7 mm, about 0.6 mm to about 0.8 mm, about 0.6 mm to about 0.9 mm, about 0.6 mm to about 1 mm, about 0.7 mm to about 0.8 mm, about 0.7 mm to about 0.9 mm, about 0.7 mm to about 1 mm, about 0.8 mm to about 0.9 mm, about 0.8 mm to about 1 mm, or about 0.9 mm to about 1 mm. In some embodiments, the distance between two microwells is about 0.1 mm, about 0.25 mm, about 0.3 mm, about 0.4 mm, about 0.5 mm, about 0.6 mm, about 0.7 mm, about 0.8 mm, about 0.9 mm, or about 1 mm.

In some embodiments, the vertical height of the "tooth" in the saw tooth design is about 0.25 mm. In some embodiments, the angle of the saw tooth cut is about 45°.

In some embodiments, the vertical height of the "tooth" in the saw tooth design is about 0.1 mm to about 1 mm. In some embodiments, the vertical height of the "tooth" in the saw tooth design is about 0.1 mm. In some embodiments, the vertical height of the "tooth" in the saw tooth design is about 1 mm. In some embodiments, the vertical height of the "tooth" in the saw tooth design is about 0.1 mm to about 0.25 mm, about 0.1 mm to about 0.3 mm, about 0.1 mm to about 0.4 mm, about 0.1 mm to about 0.5 mm, about 0.1 mm to about 0.6 mm, about 0.1 mm to about 0.7 mm, about 0.1 mm to about 0.8 mm, about 0.1 mm to about 0.9 mm, about 0.1 mm to about 1 mm, about 0.25 mm to about 0.3 mm, about 0.25 mm to about 0.4 mm, about 0.25 mm to about 0.5 mm, about 0.25 mm to about 0.6 mm, about 0.25 mm to about 0.7 mm, about 0.25 mm to about 0.8 mm, about 0.25 mm to about 0.9 mm, about 0.25 mm to about 1 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.6 mm to about 0.7 mm, about 0.6 mm to about 0.8 mm, about 0.6 mm to about 0.9 mm, about 0.6 mm to about 1 mm, about 0.7 mm to about 0.8 mm, about 0.7 mm to about 0.9 mm, about 0.7 mm to about 1 mm, about 0.8 mm to about 0.9 mm, about 0.8 mm to about 1 mm, or about 0.9 mm to about 1 mm. In some embodiments, the vertical height of the "tooth" in the saw tooth design is about 0.1 mm, about 0.25 mm, about 0.3 mm, about 0.4 mm, about 0.5 mm, about 0.6 mm, about 0.7 mm, about 0.8 mm, about 0.9 mm, or about 1 mm.

In some embodiments, the angle of the saw tooth cut is about 5 degrees to about 90 degrees. In some embodiments, the angle of the saw tooth cut is about 5 degrees. In some embodiments, the angle of the saw tooth cut is about 90 degrees. In some embodiments, the angle of the saw tooth cut is about 5 degrees to about 10 degrees, about 5 degrees to about 15 degrees, about 5 degrees to about 20 degrees, about 5 degrees to about 25 degrees, about 5 degrees to about 30 degrees, about 5 degrees to about 40 degrees, about 5 degrees to about 45 degrees, about 5 degrees to about 50 degrees, about 5 degrees to about 60 degrees, about 5 degrees to about 70 degrees, about 5 degrees to about 90 degrees, about 10 degrees to about 15 degrees, about 10 degrees to about 20 degrees, about 10 degrees to about 25 degrees, about 10 degrees to about 30 degrees, about 10 degrees to about 40 degrees, about 10 degrees to about 45 degrees, about 10 degrees to about 50 degrees, about 10 degrees to about 60 degrees, about 10 degrees to about 70 degrees, about 10 degrees to about 90 degrees, about 15 degrees to about 20 degrees, about 15 degrees to about 25 degrees, about 15 degrees to about 30 degrees, about 15 degrees to about 40 degrees, about 15 degrees to about 45 degrees, about 15 degrees to about 50 degrees, about 15 degrees to about 60 degrees, about 15 degrees to about 70 degrees, about 15 degrees to about 90 degrees, about 20 degrees to about 25 degrees, about 20 degrees to about 30 degrees, about 20 degrees to about 40 degrees, about 20 degrees to about 45 degrees, about 20 degrees to about 50 degrees, about 20 degrees to about 60 degrees, about 20 degrees to about 70 degrees, about 20 degrees to about 90 degrees, about 25 degrees to about 30 degrees, about 25 degrees to about 40 degrees, about 25 degrees to about 45 degrees, about 25 degrees to about 50 degrees, about 25 degrees to about 60 degrees, about 25 degrees to about 70 degrees, about 25 degrees to about 90 degrees, about 30 degrees to about 40 degrees, about 30 degrees to about 45 degrees, about 30 degrees to about 50 degrees, about 30 degrees to about 60 degrees, about 30 degrees to about 70 degrees, about 30 degrees to about 90 degrees, about 40 degrees to about 45 degrees, about 40 degrees to about 50 degrees, about 40 degrees to about 60 degrees, about 40 degrees to about 70 degrees, about 40 degrees to about 90 degrees, about 45 degrees to about 50 degrees, about 45 degrees to about 60 degrees, about 45 degrees to about 70 degrees, about 45 degrees to about 90 degrees, about 50 degrees to about 60 degrees, about 50 degrees to about 70 degrees, about 50 degrees to about 90 degrees, about 60 degrees to about 70 degrees, about 60 degrees to about 90 degrees, or about 70 degrees to about 90 degrees. In some embodiments, the angle of the saw tooth cut is about 5 degrees, about 10 degrees, about 15 degrees, about 20 degrees, about 25 degrees, about 30 degrees, about 40 degrees, about 45 degrees, about 50 degrees, about 60 degrees, about 70 degrees, or about 90 degrees.

In some embodiments, the ferromagnetic material is printed onto a film. In some embodiments, the ferromagnetic material is directly deposited onto the film in the presence of a magnetic field to increase a magnetic permeability of the ferromagnetic material. In some embodiments, the film adheres to the surface of the plastic object upon application of heat and/or pressure. In some embodiments, the film is mechanically affixed on the surface of the plastic object.

In some embodiments, the weight of the ferromagnetic material ranges from about 0.05% to 2% of the total weight of the plastic object. In some embodiments, the total weight of ferromagnetic material 10 on the surface of the plastic object 100, as shown in FIGS. 2A-D, is intended to be in the range of 0.05%-2% of the total weight of the final designed plastic object. In some embodiments, the ferromagnetic material is about 0.05% to about 2% of the total weight of the plastic object. In some embodiments, the ferromagnetic material is about 0.05% of the total weight of the plastic object. In some embodiments, the ferromagnetic material is about 2% of the total weight of the plastic object. In some embodiments, the ferromagnetic material is about 0.05% to about 0.06%, about 0.05% to about 0.07%, about 0.05% to about 0.08%, about 0.05% to about 0.09%, about 0.05% to about 0.1%, about 0.05% to about 0.5%, about 0.05% to about 1%, about 0.05% to about 1.5%, about 0.05% to about 2%, about 0.06% to about 0.07%, about 0.06% to about 0.08%, about 0.06% to about 0.09%, about 0.06% to about 0.1%, about 0.06% to about 0.5%, about 0.06% to about 1%, about 0.06% to about 1.5%, about 0.06% to about 2%, about 0.07% to about 0.08%, about 0.07% to about 0.09%, about 0.07% to about 0.1%, about 0.07% to about 0.5%, about 0.07% to about 1%, about 0.07% to about 1.5%, about 0.07% to about 2%, about 0.08% to about 0.09%, about 0.08% to about 0.1%, about 0.08% to about 0.5%, about 0.08% to about 1%, about 0.08% to about 1.5%, about 0.08% to about 2%, about 0.09% to about 0.1%, about 0.09% to about 0.5%, about 0.09% to about 1%, about 0.09% to about 1.5%, about 0.09% to about 2%, about 0.1% to about 0.5%, about 0.1% to about 1%, about 0.1% to about 1.5%, about 0.1% to about 2%, about 0.5% to about 1%, about 0.5% to about 1.5%, about 0.5% to about 2%, about 1% to about 1.5%, about 1% to about 2%, or about 1.5% to about 2% of the total weight of the plastic object. In some embodiments, the ferromagnetic material is about 0.05%, about 0.06%, about 0.07%, about 0.08%, about 0.09%, about 0.1%, about 0.5%, about 1%, about 1.5%, or about 2% of the total weight of the plastic object.

In some embodiments, the weight of ferromagnetic material 10 is preferably in the range of 0.3%-0.8% of the total weight of the final designed plastic object. In some embodiments, the ferromagnetic material is about 0.3% to about 0.8% of the total weight of the plastic object. In some embodiments, the ferromagnetic material is about 0.3% of the total weight of the plastic object. In some embodiments, the ferromagnetic material is about 0.8% of the total weight of the plastic object. In some embodiments, the ferromagnetic material is about 0.3% to about 0.4%, about 0.3% to about 0.5%, about 0.3% to about 0.6%, about 0.3% to about 0.7%, about 0.3% to about 0.8%, about 0.4% to about 0.5%, about 0.4% to about 0.6%, about 0.4% to about 0.7%, about 0.4% to about 0.8%, about 0.5% to about 0.6%, about 0.5% to about 0.7%, about 0.5% to about 0.8%, about 0.6% to about 0.7%, about 0.6% to about 0.8%, or about 0.7% to about 0.8% of the total weight of the plastic object. In some embodiments, the ferromagnetic material is about 0.3%, about 0.4%, about 0.5%, about 0.6%, about 0.7%, or about 0.8% of the total weight of the plastic object.

In some embodiments, the plastic object is less than about 4 inches in any one dimension. In some embodiments, the plastic object has a length of about 0.5 cm to about 15 cm. In some embodiments, the plastic object has a length of about 0.5 cm. In some embodiments, the plastic object has a length of about 15 cm. In some embodiments, the plastic object has a length of about 0.5 cm to about 1 cm, about 0.5 cm to about 2 cm, about 0.5 cm to about 3 cm, about 0.5 cm to about 4 cm, about 0.5 cm to about 5 cm, about 0.5 cm to about 6 cm, about 0.5 cm to about 7 cm, about 0.5 cm to about 8 cm, about 0.5 cm to about 9 cm, about 0.5 cm to about 10 cm, about 0.5 cm to about 15 cm, about 1 cm to about 2 cm, about 1 cm to about 3 cm, about 1 cm to about 4 cm, about 1 cm to about 5 cm, about 1 cm to about 6 cm, about 1 cm to about 7 cm, about 1 cm to about 8 cm, about 1 cm to about 9 cm, about 1 cm to about 10 cm, about 1 cm to about 15 cm, about 2 cm to about 3 cm, about 2 cm to about 4 cm, about 2 cm to about 5 cm, about 2 cm to about 6 cm, about 2 cm to about 7 cm, about 2 cm to about 8 cm, about 2 cm to about 9 cm, about 2 cm to about 10 cm, about 2 cm to about 15 cm, about 3 cm to about 4 cm, about 3 cm to about 5 cm, about 3 cm to about 6 cm, about 3 cm to about 7 cm, about 3 cm to about 8 cm, about 3 cm to about 9 cm, about 3 cm to about 10 cm, about 3 cm to about 15 cm, about 4 cm to about 5 cm, about 4 cm to about 6 cm, about 4 cm to about 7 cm, about 4 cm to about 8 cm, about 4 cm to about 9 cm, about 4 cm to about 10 cm, about 4 cm to about 15 cm, about 5 cm to about 6 cm, about 5 cm to about 7 cm, about 5 cm to about 8 cm, about 5 cm to about 9 cm, about 5 cm to about 10 cm, about 5 cm to about 15 cm, about 6 cm to about 7 cm, about 6 cm to about 8 cm, about 6 cm to about 9 cm, about 6 cm to about 10 cm, about 6 cm to about 15 cm, about 7 cm to about 8 cm, about 7 cm to about 9 cm, about 7 cm to about 10 cm, about 7 cm to about 15 cm, about 8 cm to about 9 cm, about 8 cm to about 10 cm, about 8 cm to about 15 cm, about 9 cm to about 10 cm, about 9 cm to about 15 cm, or about 10 cm to about 15 cm. In some embodiments, the plastic object has a length of about 0.5 cm, about 1 cm, about 2 cm, about 3 cm, about 4 cm, about 5 cm, about 6 cm, about 7 cm, about 8 cm, about 9 cm, about 10 cm, or about 15 cm.

In some embodiments, the plastic object has a width of about 0.5 cm to about 15 cm. In some embodiments, the plastic object has a width of about 0.5 cm. In some embodiments, the plastic object has a width of about 15 cm. In some embodiments, the plastic object has a width of about 0.5 cm to about 1 cm, about 0.5 cm to about 2 cm, about 0.5 cm to about 3 cm, about 0.5 cm to about 4 cm, about 0.5 cm to about 5 cm, about 0.5 cm to about 6 cm, about 0.5 cm to about 7 cm, about 0.5 cm to about 8 cm, about 0.5 cm to about 9 cm, about 0.5 cm to about 10 cm, about 0.5 cm to about 15 cm, about 1 cm to about 2 cm, about 1 cm to about 3 cm, about 1 cm to about 4 cm, about 1 cm to about 5 cm, about 1 cm to about 6 cm, about 1 cm to about 7 cm, about 1 cm to about 8 cm, about 1 cm to about 9 cm, about 1 cm to about 10 cm, about 1 cm to about 15 cm, about 2 cm to about 3 cm, about 2 cm to about 4 cm, about 2 cm to about 5 cm, about 2 cm to about 6 cm, about 2 cm to about 7 cm, about 2 cm to about 8 cm, about 2 cm to about 9 cm, about 2 cm to about 10 cm, about 2 cm to about 15 cm, about 3 cm to about 4 cm, about 3 cm to about 5 cm, about 3 cm to about 6 cm, about 3 cm to about 7 cm, about 3 cm to about 8 cm, about 3 cm to about 9 cm, about 3 cm to about 10 cm, about 3 cm to about 15 cm, about 4 cm to about 5 cm, about 4 cm to about 6 cm, about 4 cm to about 7 cm, about 4 cm to about 8 cm, about 4 cm to about 9 cm, about 4 cm to about 10 cm, about 4 cm to about 15 cm, about 5 cm to about 6 cm, about 5 cm to about 7 cm, about 5 cm to about 8 cm, about 5 cm to about 9 cm, about 5 cm to about 10 cm, about 5 cm to about 15 cm, about 6 cm to about 7 cm, about 6 cm to about 8 cm, about 6 cm to about 9 cm, about 6 cm to about 10 cm, about 6 cm to about 15 cm, about 7 cm to about 8 cm, about 7 cm to about 9 cm, about 7 cm to about 10 cm, about 7 cm to about 15 cm, about 8 cm to about 9 cm, about 8 cm to about 10 cm, about 8 cm to about 15 cm, about 9 cm to about 10 cm, about 9 cm to about 15 cm, or about 10 cm to about 15 cm. In some embodiments, the plastic object has a width of about 0.5 cm, about 1 cm, about 2 cm, about 3 cm, about 4 cm, about 5 cm, about 6 cm, about 7 cm, about 8 cm, about 9 cm, about 10 cm, or about 15 cm.

In some embodiments, the plastic object has a height of about 0.5 cm to about 15 cm. In some embodiments, the plastic object has a height of about 0.5 cm. In some embodiments, the plastic object has a height of about 15 cm. In some embodiments, the plastic object has a height of about 0.5 cm to about 1 cm, about 0.5 cm to about 2 cm, about 0.5 cm to about 3 cm, about 0.5 cm to about 4 cm, about 0.5 cm to about 5 cm, about 0.5 cm to about 6 cm, about 0.5 cm to about 7 cm, about 0.5 cm to about 8 cm, about 0.5 cm to about 9 cm, about 0.5 cm to about 10 cm, about 0.5 cm to about 15 cm, about 1 cm to about 2 cm, about 1 cm to about 3 cm, about 1 cm to about 4 cm, about 1 cm to about 5 cm, about 1 cm to about 6 cm, about 1 cm to about 7 cm, about 1 cm to about 8 cm, about 1 cm to about 9 cm, about 1 cm to about 10 cm, about 1 cm to about 15 cm, about 2 cm to about 3 cm, about 2 cm to about 4 cm, about 2 cm to about 5 cm, about 2 cm to about 6 cm, about 2 cm to about 7 cm, about 2 cm to about 8 cm, about 2 cm to about 9 cm, about 2 cm to about 10 cm, about 2 cm to about 15 cm, about 3 cm to about 4 cm, about 3 cm to about 5 cm, about 3 cm to about 6 cm, about 3 cm to about 7 cm, about 3 cm to about 8 cm, about 3 cm to about 9 cm, about 3 cm to about 10 cm, about 3 cm to about 15 cm, about 4 cm to about 5 cm, about 4 cm to about 6 cm, about 4 cm to about 7 cm, about 4 cm to about 8 cm, about 4 cm to about 9 cm, about 4 cm to about 10 cm, about 4 cm to about 15 cm, about 5 cm to about 6 cm, about 5 cm to about 7 cm, about 5 cm to about 8 cm, about 5 cm to about 9 cm, about 5 cm to about 10 cm, about 5 cm to about 15 cm, about 6 cm to about 7 cm, about 6 cm to about 8 cm, about 6 cm to about 9 cm, about 6 cm to about 10 cm, about 6 cm to about 15 cm, about 7 cm to about 8 cm, about 7 cm to about 9 cm, about 7 cm to about 10 cm, about 7 cm to about 15 cm, about 8 cm to about 9 cm, about 8 cm to about 10 cm, about 8 cm to about 15 cm, about 9 cm to about 10 cm, about 9 cm to about 15 cm, or about 10 cm to about 15 cm. In some embodiments, the plastic object has a height of about 0.5 cm, about 1 cm, about 2 cm, about 3 cm, about 4 cm, about 5 cm, about 6 cm, about 7 cm, about 8 cm, about 9 cm, about 10 cm, or about 15 cm.

In some embodiments, the ferromagnetic material comprises a ferromagnetic ink composition. In some embodiments, the ferromagnetic ink composition is deposited in at least one layer. In some embodiments, a generic plastic object 100, which contains a ferromagnetic material 10, comprises a coating of a ferromagnetic ink 102, as shown in FIGS. 2A-D. In some embodiments, the coating of a ferromagnetic ink 102 imprinted on the surface of any plastic object, shown as 100 in FIG. 2A-2D, comprises soft, ferromagnetic particles. In some embodiments, the soft, ferromagnetic particles have a coercivity lower than or equal to 1000 amperes per meter (A/m). Soft, ferromagnetic particles are typically characterized by high values of magnetic permeability (e.g., an initial permeability $\mu_a$ ranging from about $10^2$ to about $10^5$ and a maximum permeability $\mu_{max}$ ranging from about $10^3$ to about $10^6$), low coercivity (denoted as $H_C$, ranging from about 0.8 to about 8 A/m or ranging from about 0.01 to about 0.1 oersted), and low magnetic hysteresis losses per remagnetization cycle (ranging from about 1 to about $10^3$ joules per cubic meter ($m^3$), or from about $10$-$10^4$ ergs per cubic centimeter ($cm^3$)). In some embodiments, at temperatures below the Curie point such soft, ferromagnetic materials are magnetized spontaneously but do not manifest magnetic properties externally.

In some embodiments, the substrate described in the present disclosure can be a plastic object. In some embodiments, the plastic object described in the present disclosure can be in a variety of form-factors. Examples of objects include but are not limited to single-use bottles, bottle caps, single-use coffee cups, plastic cutlery, plastic trays, clamshells, general food-service packaging including sandwich bags, grocery bags, and shrink sleeves. A shown in FIG. 1, the plastic object can be in the form a plastic bottle 20 with cap 22, a plastic cup 26 with lid 24, a plastic sachet 28, a plastic straw 30, or a plastic spoon 32. In some embodiments, each of these objects (i.e., 20, 22, 24, 26, 28, 30, and 32) contains the ferromagnetic material 10. In some embodiments, the ferromagnetic material 10 is an area imprinted with an ink or affixed with a pre-printed label containing ferromagnetic ink, which enables the separation of the desired object application of a magnetic field. A preferred embodiment of the present disclosure is a single usable plastic object which is less than 20 grams in weight or single usable plastic object which has is no bigger than 4 inches in any one dimension.

In some embodiments, the plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the food packaging container is a deli container, a flat lid hinged container, a clamshell container, a mini cupcake container, a cupcake and/or muffin container, or a dome lid hinged container. In some embodiments, the plastic object is a square receptacle, a round receptacle, a rectangular receptacle, a cylindrical receptacle, or an octagonal receptacle. In some embodiments, the plastic object is a receptacle lid. In some embodiments, the plastic object is a straw. In some embodiments, the eating utensil is a plastic chopstick. In some embodiments, the eating utensil is a plastic stirrer stick. In some embodiments, the plastic cutlery is a plastic spoon, a plastic fork, a plastic knife, a plastic spork (i.e., a combination of a spoon and a fork), a plastic spife (i.e., a combination of a spoon and knife), a plastic knork (i.e., a combination of a knife and fork), a plastic sporf (i.e., a combination of a spoon, knife, and a fork), or any combination thereof. In some embodiments, the plastic object is a plastic lid. In some embodiments, the plastic object is a plastic coffee cup lid. In some embodiments, the plastic object is a plastic sachet. In some embodiments, the plastic object is a plastic cup. In some embodiments, the plastic object is a plastic cup holder. In some embodiments, the non-metallic object is a multilayer or co-extruded film consisting of about three to twelve layers of polymer films combined to form a single film used in food packaging. The individual polymer layers can be a polyethylene (PE) layer, a polypropylene (PP) layer, an ethylene-vinyl alcohol (EVOH) layer, a polyamide (Nylon, PA) layer, an ionomers (EAA, EMAA) layer, an ethylene vinyl acetate (EVA) layer, or any combination thereof.

Figure 7:
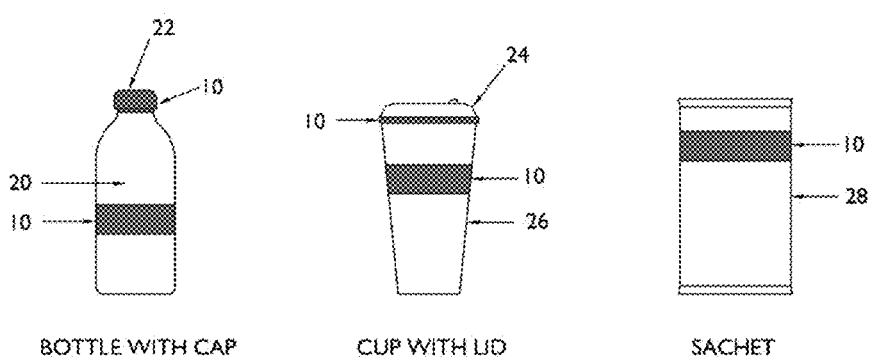
FIG. 7 illustrates exemplary embodiments of plastic substrates and films comprising the magnetizable ink compositions of the present disclosure.

In some embodiments, the substrate is a label which is to be affixed to a plastic container. The plastic container on which the label is to be affixed can be in a variety of form-factors. Examples of containers include but are not limited to single-use bottles, single-use coffee cups, clamshells, general food-service packaging including sandwich bags, grocery bags. As shown in FIG. 7, the substrate can be in the form a plastic bottle 20 with a cap 22, a plastic cup 26 with a lid 24, or a plastic sachet 28. The plastic bottle 20 with the cap 22, the plastic cup 26 with the lid 24, or the plastic sachet 28 may each comprise a label 10. In some embodiments, the label 10 is an area printed with a ferromagnetic ink composition which enables the magnetic-induced separation of the desired object by application of a magnetic field. In some embodiments, the substrate is a single-usable PET bottle having a mass that is less than about 20 grams.

The labels can be one of shrink sleeve labels, pressure sensitive labels, roll fed labels, wrap labels, stretch labels, cut and stack labels, shrink bundling film used on a plastic container, or any combination thereof. For example, the substrate can be a shrink sleeve label comprising a ferromagnetic material wherein the shrink sleeve label is placed on a PET single-use bottle. In some embodiments, the shrink sleeve label conforms to the shape of substrate. The PET single-use bottle can be sorted at a recycling facility and transferred to a reclaiming facility where the bottles comprising the shrink sleeve labels are ground into flakes. Thus, the plurality of flakes can comprise a plurality of PET flakes mixed with a plurality of shrink sleeve label flakes. The magnetic coating on the shrink sleeve label can enable the separation of ground shrink sleeve label flakes of the label from the ground flakes of PET bottles under application of a magnetic field. When exposed to a magnetic field of at least about 1000 gauss (G) in strength with a magnetic gradient of at least 2 Tesla/meter, the label flakes described supra are can experience a force exceeding their own weight. It is intended that the shrink sleeve label flakes described in the present disclosure can be capable of being attracted by a magnetic field of a commercial drum-type, over band magnetic separator, a magnetic head pulley, or any combination thereof.

In some embodiments, the plastic object 100 can comprise of a single or multiple plastic resins. Type of plastic resins can include but are not limited to low or high density polyethylene (LDPE, HDPE), biaxially-oriented polypropylene (BOPP), Polyethylene terephthalate (PET), polypropylene (PP) and compostable plastics such as polylactic acid (PLA). In some embodiments, the plastic object is a low density polyethylene (LDPE) object. In some embodiments, the plastic object is a high density polyethylene (HDPE) object. In some embodiments, the plastic object is a biaxially-oriented polypropylene (BOPP) object. In some embodiments, the plastic object is a polyethylene terephthalate (PET) object. In some embodiments, the plastic object is a polypropylene (PP) object. In some embodiments, the plastic object is a biodegradable plastic object. In some embodiments, the plastic object is a compostable plastic object. In some embodiments, the compostable plastic object is a polylactic acid (PLA) object. In some embodiments, the biodegradable plastic object is a polyhydroxyalkanoate (PHA) object, a polybutylene succinate (PBS) object, a polycaprolactone (PCL) object, a polyanhydride object, a polyvinyl alcohol (PVA) object, a cellulose ester object, or any combination thereof.

Methods

Another aspect of the present disclosure provides for a method of fabricating a ferromagnetic substrate, comprising: a) printing a ferromagnetic ink composition on a surface of a film; and b) transferring the film onto a surface of a non-ferromagnetic substrate to produce the ferromagnetic substrate; wherein the ferromagnetic ink composition is a food contact substance.

In some embodiments, the method comprises flexographic printing, gravure printing, intaglio printing, pad printing, screen printing, offset printing, or any combination thereof. In some embodiments, the ferromagnetic substrate is a single-use bottle, a bottle cap, a single-use coffee cup, plastic cutlery, an eating utensil, a cutting utensil, a plastic tray, a plastic container, a food packaging container, or any combination thereof. In some embodiments, the substrate is an aluminum can. In some embodiments, the film is a label. In some embodiments, the film is a shrink sleeve label, a pressure sensitive label, a roll fed label, a wrap label, a stretch label, a cut and stack label, a shrink bundling film, or any combination thereof. In some embodiments, the step of transferring the film onto the surface of the non-ferromagnetic substrate produces a magnetizable coating or a magnetizable marker.

Figure 5:
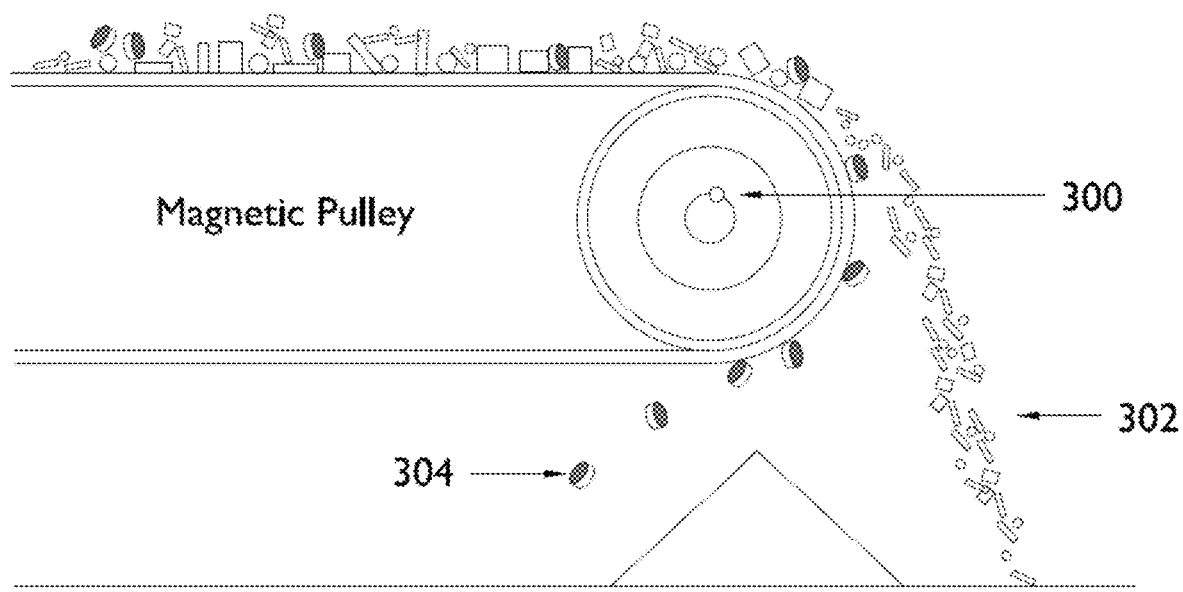
FIG. 5 illustrates a plastic object that has the ferromagnetic label displaced thereupon was separated using a commercial magnetic separator

Another aspect of the present disclosure provides for a method of sorting a mixed stream of objects, comprising providing a mixed stream of objects that comprises at least one non-metallic object comprising a ferromagnetic material deposited thereupon, and at least one object not comprising a ferromagnetic or magnetic component. In some embodiments, the mixed stream of objects is a mixed waste stream. In some embodiments, the non-metallic object is a plastic object. In some embodiments, the non-metallic object is any plastic object described supra. For example, in some embodiments, the plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the non-metallic object is less than about 20 grams in weight. In other examples, the method of sorting a mixed stream of objects is illustrated in FIG. 5. FIG. 5 shows a mixed stream of objects, i.e., 28 millimeter (mm) "Alaska" bottle caps comprising the ferromagnetic label mixed with 28 millimeter (mm) "Alaska" bottle caps not comprising the ferromagnetic label. In this example, the bottle caps comprising the ferromagnetic label were separated from the mixed stream of objects using a commercial magnetic separator.

In some embodiments, the non-metallic object has a weight ranging from about 1 gram to about 20 grams. In some embodiments, the non-metallic object has a weight ranging from about 1 gram. In some embodiments, the non-metallic object has a weight ranging from about 20 grams. In some embodiments, the non-metallic object has a weight ranging from about 1 gram to about 2 grams, about 1 gram to about 3 grams, about 1 gram to about 4 grams, about 1 gram to about 5 grams, about 1 gram to about 6 grams, about 1 gram to about 7 grams, about 1 gram to about 8 grams, about 1 gram to about 9 grams, about 1 gram to about 10 grams, about 1 gram to about 15 grams, about 1 gram to about 20 grams, about 2 grams to about 3 grams, about 2 grams to about 4 grams, about 2 grams to about 5 grams, about 2 grams to about 6 grams, about 2 grams to about 7 grams, about 2 grams to about 8 grams, about 2 grams to about 9 grams, about 2 grams to about 10 grams, about 2 grams to about 15 grams, about 2 grams to about 20 grams, about 3 grams to about 4 grams, about 3 grams to about 5 grams, about 3 grams to about 6 grams, about 3 grams to about 7 grams, about 3 grams to about 8 grams, about 3 grams to about 9 grams, about 3 grams to about 10 grams, about 3 grams to about 15 grams, about 3 grams to about 20 grams, about 4 grams to about 5 grams, about 4 grams to about 6 grams, about 4 grams to about 7 grams, about 4 grams to about 8 grams, about 4 grams to about 9 grams, about 4 grams to about 10 grams, about 4 grams to about 15 grams, about 4 grams to about 20 grams, about 5 grams to about 6 grams, about 5 grams to about 7 grams, about 5 grams to about 8 grams, about 5 grams to about 9 grams, about 5 grams to about 10 grams, about 5 grams to about 15 grams, about 5 grams to about 20 grams, about 6 grams to about 7 grams, about 6 grams to about 8 grams, about 6 grams to about 9 grams, about 6 grams to about 10 grams, about 6 grams to about 15 grams, about 6 grams to about 20 grams, about 7 grams to about 8 grams, about 7 grams to about 9 grams, about 7 grams to about 10 grams, about 7 grams to about 15 grams, about 7 grams to about 20 grams, about 8 grams to about 9 grams, about 8 grams to about 10 grams, about 8 grams to about 15 grams, about 8 grams to about 20 grams, about 9 grams to about 10 grams, about 9 grams to about 15 grams, about 9 grams to about 20 grams, about 10 grams to about 15 grams, about 10 grams to about 20 grams, or about 15 grams to about 20 grams. In some embodiments, the non-metallic object has a weight ranging from about 1 gram, about 2 grams, about 3 grams, about 4 grams, about 5 grams, about 6 grams, about 7 grams, about 8 grams, about 9 grams, about 10 grams, about 15 grams, or about 20 grams.

In some embodiments, the ferromagnetic material does not retain its magnetic properties upon the absence of an applied magnetic field. In some embodiments, the ferromagnetic material activates its magnetic properties upon the presence of an applied magnetic field. In some embodiments, the ferromagnetic material is a ferromagnetic ink composition (i.e., any ferromagnetic ink compositions described supra). In some embodiments, the ferromagnetic material is a ferromagnetic label (i.e., any ferromagnetic labels described supra). In some embodiments, the ferromagnetic material is a ferromagnetic material 10 (i.e., any ferromagnetic materials described supra).

Next, the method comprises contacting the stream of objects to a magnetic field. In some embodiments, the magnetic field is produced by a commercial drum-type separator, an over-band magnetic separator, a magnetic head pulley or a combination thereof.

In some embodiments, the magnetic field has a magnetic flux density ranging from about 3000 gauss (G) to about 12,000 G. In some embodiments, the magnetic field does not have a magnetic flux density ranging from about 1 gauss to about 2999 gauss. In some embodiments, the magnetic field has a magnetic flux density of 7000 gauss. In some embodiments, the magnetic field has a magnetic flux density ranging from about 3,000 gauss to about 12,000 gauss. In some embodiments, the magnetic field has a magnetic flux density ranging from about 3,000 gauss. In some embodiments, the magnetic field has a magnetic flux density ranging from about 12,000 gauss. In some embodiments, the magnetic field has a magnetic flux density ranging from about 3,000 gauss to about 4,000 gauss, about 3,000 gauss to about 5,000 gauss, about 3,000 gauss to about 6,000 gauss, about 3,000 gauss to about 7,000 gauss, about 3,000 gauss to about 8,000 gauss, about 3,000 gauss to about 9,000 gauss, about 3,000 gauss to about 10,000 gauss, about 3,000 gauss to about 11,000 gauss, about 3,000 gauss to about 12,000 gauss, about 4,000 gauss to about 5,000 gauss, about 4,000 gauss to about 6,000 gauss, about 4,000 gauss to about 7,000 gauss, about 4,000 gauss to about 8,000 gauss, about 4,000 gauss to about 9,000 gauss, about 4,000 gauss to about 10,000 gauss, about 4,000 gauss to about 11,000 gauss, about 4,000 gauss to about 12,000 gauss, about 5,000 gauss to about 6,000 gauss, about 5,000 gauss to about 7,000 gauss, about 5,000 gauss to about 8,000 gauss, about 5,000 gauss to about 9,000 gauss, about 5,000 gauss to about 10,000 gauss, about 5,000 gauss to about 11,000 gauss, about 5,000 gauss to about 12,000 gauss, about 6,000 gauss to about 7,000 gauss, about 6,000 gauss to about 8,000 gauss, about 6,000 gauss to about 9,000 gauss, about 6,000 gauss to about 10,000 gauss, about 6,000 gauss to about 11,000 gauss, about 6,000 gauss to about 12,000 gauss, about 7,000 gauss to about 8,000 gauss, about 7,000 gauss to about 9,000 gauss, about 7,000 gauss to about 10,000 gauss, about 7,000 gauss to about 11,000 gauss, about 7,000 gauss to about 12,000 gauss, about 8,000 gauss to about 9,000 gauss, about 8,000 gauss to about 10,000 gauss, about 8,000 gauss to about 11,000 gauss, about 8,000 gauss to about 12,000 gauss, about 9,000 gauss to about 10,000 gauss, about 9,000 gauss to about 11,000 gauss, about 9,000 gauss to about 12,000 gauss, about 10,000 gauss to about 11,000 gauss, about 10,000 gauss to about 12,000 gauss, or about 11,000 gauss to about 12,000 gauss. In some embodiments, the magnetic field has a magnetic flux density ranging from about 3,000 gauss, about 4,000 gauss, about 5,000 gauss, about 6,000 gauss, about 7,000 gauss, about 8,000 gauss, about 9,000 gauss, about 10,000 gauss, about 11,000 gauss, or about 12,000 gauss.

Next, the method comprises separating the at least one non-metallic object comprising a ferromagnetic material deposited thereupon from the mixed stream of objects based on attraction of the at least one non-metallic object comprising a ferromagnetic material deposited thereupon to the magnetic field. In some embodiments, a commercial magnetic separator like an overband magnet, a drum separator, or a magnetic head pulley attracts the non-metallic object comprising the ferromagnetic material and thus, segregates the non-metallic object from the at least one object not comprising a ferromagnetic or magnetic component. In some embodiments, the magnetizability of the ferromagnetic label is tuned to ensure that magnetic separators with weak magnetic fields (i.e., magnetic fields weaker than 3000 gauss, which are used for segregation of metals in commercial MRFs) do not affect the non-metallic object comprising a ferromagnetic material deposited thereupon. In some embodiments, the non-metallic object comprising a ferromagnetic material is not sorted with a metal waste stream in commercial MRFs.

In some embodiments, the method comprises the separation of a non-metallic object comprising a ferromagnetic material deposited thereupon from a mixed waste stream. In some embodiments, the mixed waste stream is provided in a commercial single stream recycling facility (i.e., a materials recovery facility (MRF)). In some embodiments, a single stream MRF receives mixed waste comprising glass, plastic, metals (both magnetic and non-magnetic, paramagnetic, or diamagnetic), cardboard, and paper. In some embodiments, the at least one object not comprising a ferromagnetic or magnetic component is glass, plastic, metals (both magnetic and non-magnetic, paramagnetic, or diamagnetic), cardboard, and paper. In some embodiments, the MRFs use various techniques like size exclusion, density based separation, air/vacuum, and magnetic separation to sort and segregate the mixed waste into separate pure streams which are then sold for recycling. In some embodiments, small plastic items are not sorted cleanly and end up contaminating various waste streams like glass, paper, and cardboard depending on the weight and form factor of the plastic product. The present disclosure addresses this problem by enabling easy sorting of small plastic products by imprinting or attaching a ferromagnetic material (e.g., a ferromagnetic label, as described supra).

Another aspect of the present disclosure provides for a method comprising contacting a composition (e.g., any of the compositions described elsewhere herein) with a magnetic field of a predetermined intensity for a predetermined time, sufficient to separate the ferromagnetic plastic object the composition. In some embodiments, the intensity of the magnetic field is referred to the magnetic flux density. In some embodiments, magnetic field has a magnetic flux density ranging from about 3000 gauss (G) to about 12,000 G. In some embodiments, the predetermined time in which the composition is contacted with a magnetic field ranges from about 1 second to about 10 minutes. In some embodiments, the predetermined time in which the composition is contacted with a magnetic field is about 10 seconds. In some embodiments, the predetermined time in which the composition is contacted with a magnetic field is about 30 seconds. In some embodiments, the predetermined time in which the composition is contacted with a magnetic field is about 60 seconds.

In some embodiments, the magnetic field is produced by a commercial drum-type separator, an over-band magnetic separator, a magnetic head pulley or a combination thereof.

In another aspect, the present disclosure provides for a method fabricating a ferromagnetic plastic object, the method comprising: a) printing a ferromagnetic ink composition on a surface of a film; and b) transferring the film onto a surface of a non-ferromagnetic plastic object to produce the ferromagnetic plastic object; wherein the ferromagnetic ink composition is a food contact substance.

In some embodiments, the method comprises intaglio printing. In some embodiments, the method comprises gravure printing. For example, in some embodiments, printing of the ferromagnetic ink composition on a surface of a film is achieved by using intaglio printing. In other cases, printing of the ferromagnetic ink composition on a surface of a film is achieved by using gravure printing. In some embodiments, the ferromagnetic ink composition is directly printed onto the plastic object. In some embodiments, the ferromagnetic ink composition is mixed with a plastic object precursor material prior to generating the plastic object. For example, the ferromagnetic ink composition is added to the plastic object precursor material, mixed, and deposited into a mold to be used in either extrusion molding or injection molding processes, thereby generating a ferromagnetic plastic object. In this case, the ferromagnetic plastic object does not have a ferromagnetic label or a film displaced thereupon because the ferromagnetic material is incorporated with the plastic object precursor material.

In some embodiments, the film is a synthetic resin or a plastic. In some embodiments, the film is a polyester film.

In some embodiments, the method further comprises printing a release varnish onto the surface of the film. In some embodiments, the release varnish facilitates release of at least one ferromagnetic ink composition layer. In some embodiments, the method further comprises printing an adhesive onto the surface of the film. In some embodiments, the adhesive adheres the film onto the surface of the non-ferromagnetic plastic object. In some embodiments, the method comprises transferring the film by the application of heat and/or pressure. In some embodiments, the ferromagnetic plastic object is a single-use bottle, a bottle cap, a single-use coffee cup, plastic cutlery, an eating utensil, a cutting utensil, a plastic tray, a plastic container, a food packaging container, a shrink sleeve, or any combination thereof.

Figure 6:
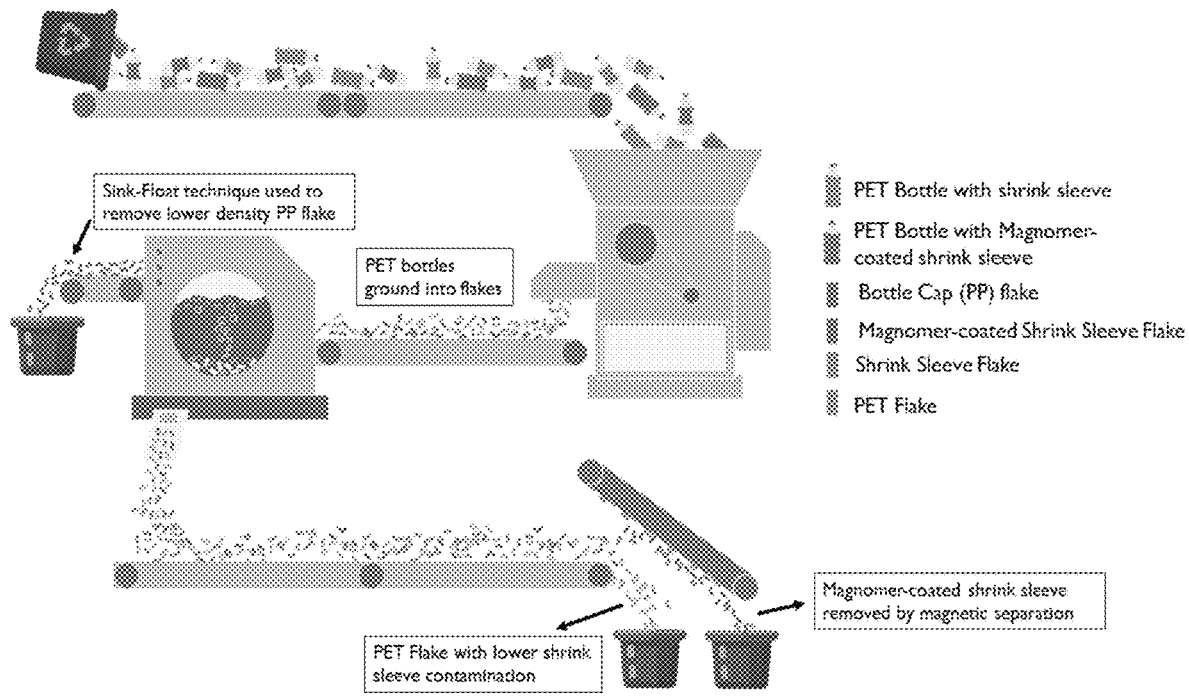
FIG. 6 illustrates a flowchart of an exemplary recycling process for a PET bottle and magnetic-based separation of the substrates described herein designed to improve recycling efficiency.

Another aspect of the present disclosure provides for a method of separation of the plastic labels with the magnetizable marker from mixed streams containing ground or shredded flakes of PET bottles, bottle caps, labels, or any combination thereof in a PET reclaiming facility. Non-durable plastic bottles that are discarded in waste streams need to be retrieved and sorted before recycling. When bottles and/or containers are discarded into waste/recycle streams, they first need to be separated from commingled waste and/or recycling. This is done in a preliminary sort facility, either a transfer station or a Material Recovery facility (MRF). A MRF then ships bales of bottles to plastic reclaimers who convert post-consumer or post-industrial bottles into plastic pellets for use in manufacturing. Plastic reclaimers subject bottles and/or containers to a series of mechanical processing and separation steps with a goal to get high quality pure plastic pellets of a desirable quality. As shown in FIG. 6, polyethylene terephthalate (PET) bottles are subjected to a variety of mechanical methods such as bottle wash, grinding, and density separation to convert whole plastic PET bottles into pure PET plastic flakes which can be melted back into PET pellets for use in manufacturing.

A PET reclaimer receives PET bottle bales, which contain bottles made of PET. These PET bottles often comprise high density polyethylene (HDPE) and/or polypropylene (PP) bottle that are often still attached to the PET bottles. Furthermore, these PET bottles comprise bottle labels attached to their surface that are made typically with glycosylated polyethylene terephthalate (PETG) or occasionally with PP or polyvinyl chloride (PVC). For PET, removal of non-plastic or undesirable non-PET plastic is critical in this mechanical recycling process. The existing separation processes in place are effective at removing out many contaminants including metallic, glass, paper and opaque plastic objects from PET bottle streams which are sent to PET reclaimers. The reclaimers use various techniques like caustic washes, size exclusions, optical or NIR sorting and magnetic separation to remove these contaminants from the bottles. The separation of bottle labels, however, poses very specific problems. At a PET reclaiming facility, separation of the components of the bottle is limited to density- and weight-based methods. Bottles are ground into flakes along with the bottle caps and labels. The mixed flakes are then segregated using density-based float/sink techniques and air/vacuum based elutriation techniques, which are effective at removing flakes of bottle caps made from PP or HDPE. However, labels, often made from materials like PETG or polyvinyl chloride (PVC), are difficult to separate from PET using such density based separation techniques and end up being mixed with PET flakes from bottles; thus, contaminating the product stream for the reclaimers. The present disclosure addresses this problem by enabling easy removal of label flakes (e.g., PETG or PVC material flakes) by printing a magnetizable coating or marker. By using a commercial magnetic separator like an overband magnet, a drum separator or a magnetic head pulley with a strong magnetic field (e.g., a magnetic field greater than 1000 gauss) near the substrate or film comprising a magnetizable marker, the substrate or film can be segregated from non-magnetic, paramagnetic, or diamagnetic objects. In some embodiments, the magnetizability of the ferromagnetic ink compositions described herein is tunable. For example, in the present disclosure, the magnetizability of the ferromagnetic inks and/or films can be tuned to ensure that the magnetic force used is effective in segregating label flakes or non-PET flakes from PET flakes. Furthermore, the magnetizability of the ferromagnetic inks and/or films can be tuned such that when a ferromagnetic film is attached to the PET bottle, the weight of the bottle is too heavy for the magnetic field to pull the entire bottle. As such, the ferromagnetic substrates of the present disclosure prevent wrongful sorting of bottles comprising ferromagnetic films attached.

Systems

Another aspect of the present disclosure provides systems for fabricating a ferromagnetic plastic object. In some embodiments, the ferromagnetic plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the system comprises a non-ferromagnetic plastic object. In some embodiments, the non-ferromagnetic plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the ferromagnetic or non-ferromagnetic plastic object is a plastic object as described elsewhere herein.

In some embodiments, the system comprises a film. In some embodiments, the film is a synthetic resin or a plastic. In some embodiments, the film is a polyester film. In some embodiments, the film comprises a release varnish. In some embodiments, the release varnish facilitates release of at least one ferromagnetic ink composition layer. In some embodiments, the film comprises at least one layer of ferromagnetic ink composition. In some embodiments, the film comprises an adhesive layer. In some embodiments, the adhesive layer adheres the film onto the surface of the non-ferromagnetic plastic object. In some embodiments, the film is a film as described elsewhere herein.

In some embodiments, the system comprises a ferromagnetic ink composition. In some embodiments, ferromagnetic ink composition is a food contact substance. In some embodiments, ferromagnetic ink composition is a ferromagnetic ink composition as described elsewhere herein. In some embodiments, the system comprises a modular marker transfer station. In some embodiments, the modular marker transfer station comprises a stamping block attachment for printing onto a plastic object (e.g., a cutlery stem). In some embodiments, the modular marker transfer station comprises a stamping block attachment for printing onto a flat surface (e.g., a bottle cap). In some embodiments, the modular marker transfer station comprises a blow-molded bottle stamping attachment. In some embodiments, the modular marker transfer station comprises a blow-molded cup stamping attachment. In some embodiments, the modular marker transfer station comprises a hologram sensor for hologram foil. In some embodiments, the modular marker transfer station comprises a numerator attachment with pneumatic actuation system for serial numbering. In some embodiments, the modular marker transfer station comprises an automated part loading system.

In some embodiments, the stamping block attachment has a length of about 150 mm and a width of about 200 mm. In some embodiments, the stamping block attachment has a length of about 200 mm and a width of about 150 mm.

In some embodiments, the stamping block attachment has a length of about 10 mm to about 200 mm. In some embodiments, the stamping block attachment has a length of about 10 mm. In some embodiments, the stamping block attachment has a length of about 200 mm. In some embodiments, the stamping block attachment has a length of about 10 mm to about 25 mm, about 10 mm to about 50 mm, about 10 mm to about 75 mm, about 10 mm to about 100 mm, about 10 mm to about 150 mm, about 10 mm to about 175 mm, about 10 mm to about 200 mm, about 25 mm to about 50 mm, about 25 mm to about 75 mm, about 25 mm to about 100 mm, about 25 mm to about 150 mm, about 25 mm to about 175 mm, about 25 mm to about 200 mm, about 50 mm to about 75 mm, about 50 mm to about 100 mm, about 50 mm to about 150 mm, about 50 mm to about 175 mm, about 50 mm to about 200 mm, about 75 mm to about 100 mm, about 75 mm to about 150 mm, about 75 mm to about 175 mm, about 75 mm to about 200 mm, about 100 mm to about 150 mm, about 100 mm to about 175 mm, about 100 mm to about 200 mm, about 150 mm to about 175 mm, about 150 mm to about 200 mm, or about 175 mm to about 200 mm. In some embodiments, the stamping block attachment has a length of about 10 mm, about 25 mm, about 50 mm, about 75 mm, about 100 mm, about 150 mm, about 175 mm, or about 200 mm.

In some embodiments, the stamping block attachment has a width of about 10 mm to about 200 mm. In some embodiments, the stamping block attachment has a width of about 10 mm. In some embodiments, the stamping block attachment has a width of about 200 mm. In some embodiments, the stamping block attachment has a width of about 10 mm to about 25 mm, about 10 mm to about 50 mm, about 10 mm to about 75 mm, about 10 mm to about 100 mm, about 10 mm to about 150 mm, about 10 mm to about 175 mm, about 10 mm to about 200 mm, about 25 mm to about 50 mm, about 25 mm to about 75 mm, about 25 mm to about 100 mm, about 25 mm to about 150 mm, about 25 mm to about 175 mm, about 25 mm to about 200 mm, about 50 mm to about 75 mm, about 50 mm to about 100 mm, about 50 mm to about 150 mm, about 50 mm to about 175 mm, about 50 mm to about 200 mm, about 75 mm to about 100 mm, about 75 mm to about 150 mm, about 75 mm to about 175 mm, about 75 mm to about 200 mm, about 100 mm to about 150 mm, about 100 mm to about 175 mm, about 100 mm to about 200 mm, about 150 mm to about 175 mm, about 150 mm to about 200 mm, or about 175 mm to about 200 mm. In some embodiments, the stamping block attachment has a width of about 10 mm, about 25 mm, about 50 mm, about 75 mm, about 100 mm, about 150 mm, about 175 mm, or about 200 mm.

In some embodiments, the modular marker transfer station prints onto different types of surfaces by changing the stamping block attachment on the device to suit the object onto which the label is to be transferred. In some embodiments, the stamping block attachment is used for stamping on a variety of objects. In some embodiments, the object is flat. In some embodiments, the object is not flat. Non-limiting examples of objects that are stamped on with the stamping block attachment include stems of plastic cutlery, small bottles, bottle caps, cups, pens, toothbrush handles, and other small flat and round articles.

In some embodiments, the object to be printed on has a height of about 200 mm at most. In some embodiments, the object to be printed on has a height of about 10 mm to about 200 mm. In some embodiments, the object to be printed on has a height of about 10 mm. In some embodiments, the object to be printed on has a height of about 200 mm. In some embodiments, the object to be printed on has a height of about 10 mm to about 25 mm, about 10 mm to about 50 mm, about 10 mm to about 75 mm, about 10 mm to about 100 mm, about 10 mm to about 150 mm, about 10 mm to about 175 mm, about 10 mm to about 200 mm, about 25 mm to about 50 mm, about 25 mm to about 75 mm, about 25 mm to about 100 mm, about 25 mm to about 150 mm, about 25 mm to about 175 mm, about 25 mm to about 200 mm, about 50 mm to about 75 mm, about 50 mm to about 100 mm, about 50 mm to about 150 mm, about 50 mm to about 175 mm, about 50 mm to about 200 mm, about 75 mm to about 100 mm, about 75 mm to about 150 mm, about 75 mm to about 175 mm, about 75 mm to about 200 mm, about 100 mm to about 150 mm, about 100 mm to about 175 mm, about 100 mm to about 200 mm, about 150 mm to about 175 mm, about 150 mm to about 200 mm, or about 175 mm to about 200 mm. In some embodiments, the object to be printed on has a height of about 10 mm, about 25 mm, about 50 mm, about 75 mm, about 100 mm, about 150 mm, about 175 mm, or about 200 mm.

In some embodiments, the system comprises a computing device comprising a processor operatively coupled to the modular marker transfer station, and a non-transitory computer readable storage medium with a computer program including instructions executable by the processor causing the processor to direct the modular marker transfer station. In some embodiments, the modular marker transfer station prints a ferromagnetic ink composition onto a surface of a film. In some embodiments, the modular marker transfer station prints a ferromagnetic ink composition onto a surface of a plastic object. In some embodiments, the modular marker transfer station prints a ferromagnetic ink composition onto a surface of a non-ferromagnetic plastic object. In some embodiments, the modular marker transfer station performs high throughput manufacturing of ferromagnetic labels and/or ferromagnetic plastic objects. In some embodiments, the modular marker transfer station generates surface modifications on the surface of plastic objects and/or labels. In some embodiments, the modular marker transfer station uses intaglio printing methods to transfer a label comprising a ferromagnetic ink onto the surface of a plastic object. In some embodiments, the intaglio printing methods comprise gravure printing methods. In some embodiments, the modular marker transfer station applies heat and/or pressure to transfer a label comprising a ferromagnetic ink onto the surface of a plastic object.

In some embodiments, the modular marker transfer station applies a temperature of about 130 degrees Celsius (C.) to about 180 degrees C. to transfer a ferromagnetic label onto an object. In some embodiments, the modular marker transfer station applies a temperature of about 130 degrees C. to transfer a ferromagnetic label onto an object. In some embodiments, the modular marker transfer station applies a temperature of about 180 degrees C. to transfer a ferromagnetic label onto an object. In some embodiments, the modular marker transfer station applies a temperature of about 130 degrees C. to about 135 degrees C., about 130 degrees C. to about 140 degrees C., about 130 degrees C. to about 145 degrees C., about 130 degrees C. to about 150 degrees C., about 130 degrees C. to about 155 degrees C., about 130 degrees C. to about 160 degrees C., about 130 degrees C. to about 165 degrees C., about 130 degrees C. to about 170 degrees C., about 130 degrees C. to about 175 degrees C., about 130 degrees C. to about 180 degrees C., about 135 degrees C. to about 140 degrees C., about 135 degrees C. to about 145 degrees C., about 135 degrees C. to about 150 degrees C., about 135 degrees C. to about 155 degrees C., about 135 degrees C. to about 160 degrees C., about 135 degrees C. to about 165 degrees C., about 135 degrees C. to about 170 degrees C., about 135 degrees C. to about 175 degrees C., about 135 degrees C. to about 180 degrees C., about 140 degrees C. to about 145 degrees C., about 140 degrees C. to about 150 degrees C., about 140 degrees C. to about 155 degrees C., about 140 degrees C. to about 160 degrees C., about 140 degrees C. to about 165 degrees C., about 140 degrees C. to about 170 degrees C., about 140 degrees C. to about 175 degrees C., about 140 degrees C. to about 180 degrees C., about 145 degrees C. to about 150 degrees C., about 145 degrees C. to about 155 degrees C., about 145 degrees C. to about 160 degrees C., about 145 degrees C. to about 165 degrees C., about 145 degrees C. to about 170 degrees C., about 145 degrees C. to about 175 degrees C., about 145 degrees C. to about 180 degrees C., about 150 degrees C. to about 155 degrees C., about 150 degrees C. to about 160 degrees C., about 150 degrees C. to about 165 degrees C., about 150 degrees C. to about 170 degrees C., about 150 degrees C. to about 175 degrees C., about 150 degrees C. to about 180 degrees C., about 155 degrees C. to about 160 degrees C., about 155 degrees C. to about 165 degrees C., about 155 degrees C. to about 170 degrees C., about 155 degrees C. to about 175 degrees C., about 155 degrees C. to about 180 degrees C., about 160 degrees C. to about 165 degrees C., about 160 degrees C. to about 170 degrees C., about 160 degrees C. to about 175 degrees C., about 160 degrees C. to about 180 degrees C., about 165 degrees C. to about 170 degrees C., about 165 degrees C. to about 175 degrees C., about 165 degrees C. to about 180 degrees C., about 170 degrees C. to about 175 degrees C., about 170 degrees C. to about 180 degrees C., or about 175 degrees C. to about 180 degrees C. to transfer a ferromagnetic label onto an object. In some embodiments, the modular marker transfer station applies a temperature of about 130 degrees C., about 135 degrees C., about 140 degrees C., about 145 degrees C., about 150 degrees C., about 155 degrees C., about 160 degrees C., about 165 degrees C., about 170 degrees C., about 175 degrees C., or about 180 degrees C. to transfer a ferromagnetic label onto an object.

In some embodiments, the modular marker transfer station applies a pressure of about 1.5 bar to about 5 bar to transfer a ferromagnetic label onto an object. In some embodiments, the modular marker transfer station applies a pressure of about 1.5 bar to transfer a ferromagnetic label onto an object. In some embodiments, the modular marker transfer station applies a pressure of about 5 bar to transfer a ferromagnetic label onto an object. In some embodiments, the modular marker transfer station applies a pressure of about 1.5 bar to about 2 bar, about 1.5 bar to about 2.5 bar, about 1.5 bar to about 3 bar, about 1.5 bar to about 3.5 bar, about 1.5 bar to about 4 bar, about 1.5 bar to about 4.5 bar, about 1.5 bar to about 5 bar, about 2 bar to about 2.5 bar, about 2 bar to about 3 bar, about 2 bar to about 3.5 bar, about 2 bar to about 4 bar, about 2 bar to about 4.5 bar, about 2 bar to about 5 bar, about 2.5 bar to about 3 bar, about 2.5 bar to about 3.5 bar, about 2.5 bar to about 4 bar, about 2.5 bar to about 4.5 bar, about 2.5 bar to about 5 bar, about 3 bar to about 3.5 bar, about 3 bar to about 4 bar, about 3 bar to about 4.5 bar, about 3 bar to about 5 bar, about 3.5 bar to about 4 bar, about 3.5 bar to about 4.5 bar, about 3.5 bar to about 5 bar, about 4 bar to about 4.5 bar, about 4 bar to about 5 bar, or about 4.5 bar to about 5 bar to transfer a ferromagnetic label onto an object. In some embodiments, the modular marker transfer station applies a pressure of about 1.5 bar, about 2 bar, about 2.5 bar, about 3 bar, about 3.5 bar, about 4 bar, about 4.5 bar, or about 5 bar to transfer a ferromagnetic label onto an object.

Computer Control Systems

Figure 3:
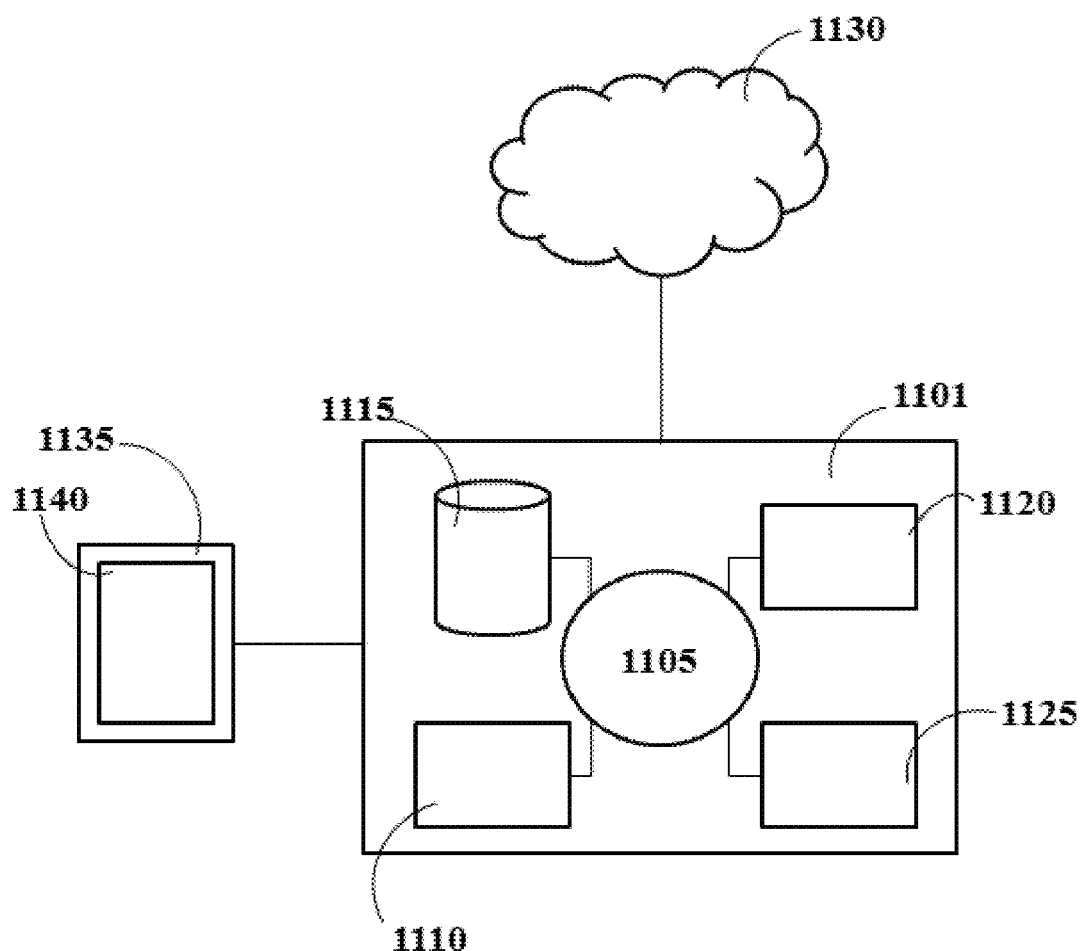
FIG. 3 illustrates a computer control system that is programmed or otherwise configured to implement methods provided herein.

The present disclosure provides computer control systems that are programmed to implement methods of the disclosure. FIG. 3 shows a computer system 1101 that is programmed or otherwise configured to direct a modular marker transfer station, manufacture a ferromagnetic plastic object, and/or sort a non-metallic object comprising a ferromagnetic material deposited thereupon from a mixed stream of objects. The computer system 1101 can regulate various aspects of manufacturing and sorting such as printing a ferromagnetic material onto a surface of a plastic object, regulating the application of a magnetic field, controlling the magnetic field strength, and/or directing the segregated non-metallic objects to a different stream of objects. The computer system 1101 can be an electronic device of a user or a computer system that is remotely located with respect to the electronic device. The electronic device can be a mobile electronic device.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), cloud based computing services (e.g. Amazon Web Services), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140 for providing, for example, status of a printing process, status of the sorting process (e.g. displaying an amount or weight of total material sorted), manual controls of the magnetic field (e.g. emergency stop buttons controlling the on/off states of the magnetic field), and display indicators designed to e.g., display number of ferromagnetic objects produced, ink levels, pressure levels, temperature levels, and/or applied magnetic flux density.

Examples of UI's include, without limitation, a graphical user interface (GUI) and web-based user interface.

EXAMPLES

Example 1

Ferromagnetic Ink Composition #1

In an example, a ferromagnetic ink composition comprised 30 parts of a ferromagnetic pigment (from amongst electrolytic iron, atomized iron, carbonyl iron, carbonyl cobalt, carbonyl nickel, iron oxides, ferritic stainless steel or atomized stainless steel) was dispersed in 30 parts of ethyl acetate, 10 parts of toluene and 17 parts of methyl ethyl ketone. Ten parts of vinyl chloride vinyl acetate terpolymer resin and 3 parts of an amine based wetting and dispersing agent were used to stabilize the ink formulation.

Example 2

Ferromagnetic Ink Composition #2

In an example, a ferromagnetic ink composition comprised 30 parts of a ferromagnetic pigment (from amongst electrolytic iron, atomized iron, carbonyl iron, carbonyl cobalt, carbonyl nickel, iron oxides, ferritic stainless steel or atomized stainless steel) was dispersed in 30 parts of ethyl acetate, 10 parts of toluene and 17 parts of methyl ethyl ketone. Furthermore, 7 parts of vinyl chloride vinyl acetate terpolymer resin and 4 parts of amorphous polyester resin were used. In addition, 3 parts of an amine based wetting and dispersing agent were used to stabilize the ink formulation.

Example 3

Ferromagnetic Ink Composition #3

In an example, a ferromagnetic ink composition comprised 30 parts of a ferromagnetic pigment (from amongst electrolytic iron, atomized iron, carbonyl iron, carbonyl cobalt, carbonyl nickel, iron oxides, ferritic stainless steel or atomized stainless steel) was dispersed in 30 parts of ethyl acetate, 10 parts of toluene and 17 parts of methyl ethyl ketone. Furthermore, 6 parts of vinyl chloride vinyl acetate terpolymer resin and 6 parts of ethylene vinyl acetate resin were used. In addition, 3 parts of an amine based wetting and dispersing agent were used to stabilize the ink formulation.

Example 4

Ferromagnetic Ink Composition #4

In an example, a ferromagnetic ink composition comprised 30 parts of a ferromagnetic pigment (from amongst electrolytic iron, atomized iron, carbonyl iron, carbonyl cobalt, carbonyl nickel, iron oxides, ferritic stainless steel or atomized stainless steel) was dispersed in 30 parts of ethyl acetate, 10 parts of toluene and 17 parts of methyl ethyl ketone. Furthermore, 6 parts of vinyl chloride vinyl acetate terpolymer resin and 4 parts of acrylic resin were used. In addition, 3 parts of an amine based wetting and dispersing agent were used to stabilize the ink formulation.

Example 5

Ferromagnetic Ink Composition #5

In an example, a ferromagnetic ink composition comprised 30 parts of a ferromagnetic pigment (from amongst electrolytic iron, atomized iron, carbonyl iron, carbonyl cobalt, carbonyl nickel, iron oxides, ferritic stainless steel or atomized stainless steel or iron alloy with one or more of cobalt, vanadium manganese, molybdenum, silicon, nickel, boron, aluminum, copper) was dispersed in 60 parts of ethyl acetate. Furthermore, 6 parts of vinyl chloride vinyl acetate terpolymer resin and 4 parts of polyamide resin were used. In addition, 3 parts of an amine based wetting and dispersing agent were used to stabilize the ink formulation.

Example 6

Method of Applying a Ferromagnetic Label onto a Plastic Object

In another example, a self-adhesive label was printed with the ferromagnetic ink composition (e.g., any one of the ferromagnetic ink compositions described in Examples 1-4) using a flexographic printing press with a printing speed of 50-150 meters/minute. The label was then affixed to various plastic objects such as single use bottles, bottle caps, single use coffee cups, cutlery, a shrink sleeves, and clamshell containers.

Example 7

Method of Applying a Ferromagnetic Label onto a Shrink Sleeve Film

In another example, a polyethylene terephthalate (PET) shrink sleeve film was printed with the ferromagnetic ink (e.g., any one of the ferromagnetic ink compositions described in Examples 1-4) in addition to 1-5 non-ferromagnetic ink layers for aesthetic purposes using a gravure printing press with a printing speed of 50-150 meters/minute.

Example 8

Method of Sorting a Plastic Object that has the Ferromagnetic Label Displaced Thereupon In an example, a plastic object that has the ferromagnetic label displaced thereupon was separated using a commercial magnetic separator, as shown in FIG. 5. 28 millimeter (mm) "Alaska" bottle caps comprising the ferromagnetic label were fed onto a conveyor belt along with identical 28 mm "Alaska" bottle caps not comprising the ferromagnetic labels. The conveyor belt was equipped with a magnetic pulley with a magnetic field strength of 11,500+/−500 gauss at the magnet surface. The magnetic pulley was able to attract the bottle caps with the ferromagnetic labels inwards while the non-marked bottle caps (i.e., the bottle caps not comprising the ferromagnetic labels) were thrown away from the conveyor belt. The 28 millimeter (mm) "Alaska" bottle caps comprising the ferromagnetic label were separated with an average separation efficiency of 90.6%, as observed over the course of 20 runs.

Example 9

Method of Sorting a Plastic Object that has the Ferromagnetic Label Displaced Thereupon in a Simulated Glass Waste Stream In an example, a 28 millimeter (mm) "Alaska" bottle caps comprising the ferromagnetic label were mixed with 28 millimeter (mm) "Alaska" bottle caps not comprising the ferromagnetic label using a commercial magnetic separator, as shown in FIG. 5. In addition, 3 mm polyethylene pellets were further mixed uniformly with the bottle caps (with and without ferromagnetic labels) in approximately a 95:5 weight ratio. The mixture of pellets and bottle caps with and without ferromagnetic labels were added onto the conveyor belt to simulate a contaminated recycled glass stream (i.e. a simulated glass stream contaminated with small plastic objects) in a commercial MRF. The 28 millimeter (mm) "Alaska" bottle caps comprising the ferromagnetic label were separated with an average separation efficiency of 77.4%, as observed over the course of 20 runs.

Example 10

Method of Sorting a Plastic Object that has the Ferromagnetic Label Displaced Thereupon in a Simulated Glass Waste Stream with a Burden Depth of 1 Inch In an example, a 28 millimeter (mm) "Alaska" bottle caps comprising the ferromagnetic label were mixed with 28 millimeter (mm) "Alaska" bottle caps not comprising the ferromagnetic label using a commercial magnetic separator, as shown in FIG. 5. In addition, 3 mm polyethylene pellets were further mixed uniformly with the bottle caps (with and without ferromagnetic labels) in approximately a 95:5 weight ratio. The mixture of pellets and bottle caps with and without ferromagnetic labels were added onto the conveyor belt to simulate a contaminated recycled glass stream (i.e. a simulated glass stream contaminated with small plastic objects) in a commercial MRF. A burden depth of 1 inch of material on the conveyor belt was maintained to simulate the burden depth observed in a commercial MRF. The 28 millimeter (mm) "Alaska" bottle caps comprising the ferromagnetic label were separated with an average separation efficiency of 63.6%, as observed over the course of 20 runs.

Example 11

Stability of Ferromagnetic Ink Composition

In an example, a stability study of the ferromagnetic ink composition was performed. A plurality of ferromagnetic ink composition samples was stored at a temperature of 40° C. for a period of 7 days. The parameter used for assessing stability was observation of settling of particles of the ferromagnetic ink composition. Settling of the ferromagnetic ink composition samples was qualitatively judged. Settling of the ferromagnetic ink composition samples was rated from a scale from 1 to 5, where 1 indicated a complete settling and 5 indicated no settling. After 7 days, the plurality of ferromagnetic ink compositions was rated a 5. The plurality of ferromagnetic ink composition samples was kept at a temperature of 40° C. for an additional 2 weeks (3 weeks total). The samples were assessed at the end of the 3 week period and were rated a 5, indicating no settling was observed and thus, indicating the ferromagnetic ink composition was stable.

Example 12

Heat Transfer of Ferromagnetic Label

In an example, a heat transfer study of the ferromagnetic label comprising a ferromagnetic ink composition was performed. The ferromagnetic label comprised three layers in the following order: a release layer, a ferromagnetic ink composition, and an adhesive layer. The three layers of the ferromagnetic layer were printed in that order onto a polyester film. The polyester film comprising the ferromagnetic label was then pressed against a flat plastic (i.e., the same material as the desired plastic object to be printed on) for a duration of about 2 seconds using a hot plate with a surface temperature of about 180° C. The polyester film and the object were observed for a transfer of the film and judged qualitatively on a scale of 1-5, where 5 indicated complete transfer from the polyester film onto the plastic without any leftovers and 1 indicated no transfer of label from the polyester film. The ferromagnetic label was assessed after transfer and was rated a 5, indicating a complete transfer from the polyester film onto the plastic object occurred without any ink remnants left on the film surface.

Example 13

Magnetic Strength of Ferromagnetic Ink Compositions

In an example, a magnetic strength study of the ferromagnetic ink composition is performed. First, ferromagnetic pigments (FMP) are taken and ink formulations with varying FMP concentrations are created. The ferromagnetic ink compositions are deposited onto labels in order to create ferromagnetic labels, as described elsewhere herein. The ferromagnetic labels are applied to plastic re-sealable bags (i.e., one ferromagnetic label per one plastic bag). The amount of weight lifted by a bucking magnet with a strength of about 7000 gauss at the surface is measured. The plastic bags comprising the ferromagnetic labels are able to be magnetically lifted with and without additional weight added to the plastic bags. For example, in the cases where the plastic bags with additional weight added are lifted, the ferromagnetic ink composition comprises increasing concentrations of FMP or multiple layers of the ferromagnetic ink composition. An increasing number of layers of ferromagnetic ink compositions or an increasing concentration of FMP in the ferromagnetic ink compositions increase overall magnetic strength of the ferromagnetic label and its lifting ability.

Example 14

Ferromagnetic Material Composition

In an example, the ferromagnetic material used in the Ferromagnetic ink composition is a ferrous alloy powder with a following material composition, (Fe=70-87%, Si=2-15%, Al=10-18% or Fe=10-50%, Co=50-90%, Al=0-10%), obtained using gas or water atomization. The powder may be further processed using milling techniques to achieve spherical particles with a D90 size range 5-10 micron and a D50 size range of 1-6 micron.

Example 15

Ferromagnetic Ink Composition #6

In an example, a ferromagnetic ink composition comprised 2-10 parts of a ferromagnetic pigment (from amongst electrolytic iron, atomized iron, carbonyl iron, or ferrous alloys) was dispersed in 55-65 parts of ethyl acetate or n-propyl acetate and 10-15 parts of methyl ethyl ketone.

15-25 parts of nitrocellulose or vinyl based resin (Nitrocellulose Polyurethane or Nitrocellulose acrylic resins) and 0-2 parts of a wetting and dispersing agent (amine or carboxyl based additive), 0-2 parts of an anti-settling additive (fumed silica), 0-2 parts of a wax mixture (from amongst PE, PP, PTFE and amide waxes) were used to stabilize the ink formulation.

Example 16

Method of Applying a Ferromagnetic Label onto a Plastic Object

In an example, a self-adhesive label was printed with the ferromagnetic ink composition (e.g., any one of the ferromagnetic ink compositions described in Examples 1-4) using a flexographic printing press with a printing speed of 50-150 meters/minute. The print thickness/density of the ferromagnetic ink onto the label is between 0.5 and 1.5 gram per square meter. The label was then affixed to various plastic objects such as single use bottles, bottle caps, single use coffee cups, cutlery, a shrink sleeves, and clamshell containers.

Example 17

Method of Applying a Ferromagnetic Label onto a Shrink Sleeve Film

In an example, a polyethylene terephthalate (PET) shrink sleeve film was printed with the ferromagnetic ink (e.g., any one of the ferromagnetic ink compositions described in Examples 1-5 and 15) in addition to 1-5 non-ferromagnetic ink layers for aesthetic purposes using a gravure printing press with a printing speed of 50-150 meters/minute. The print thickness/density of the ferromagnetic ink onto the label is between 0.5 and 1.5 gram per square meter. The label was then affixed to various plastic objects such as single use bottles, reusable plastic bottles for consumer goods and aluminum cans.

Example 18

Method of Sorting a Plastic Object that has the Ferromagnetic Label Displaced Thereupon In an example, a plastic object that has the ferromagnetic label displaced thereupon was separated using a commercial magnetic separator, as shown in FIG. 5. The plastic bottles along with the shrink sleeves were ground into corn-flaked size flakes before feeding into a magnetic separator. The conveyor belt was equipped with a magnetic pulley with a magnetic field strength of 7000+/−500 gauss at the magnet surface. The magnetic pulley was able to attract the flakes of the shrink sleeve labels with the ferromagnetic inks printed on while the non-magnetic, paramagnetic, or diamagnetic flakes of bottle/can were thrown away from the conveyor belt. The shrink sleeve label flakes comprising the ferromagnetic ink/coating were separated with an average separation efficiency of 99.2%, as observed over the course of 15 runs.

Example 19

Method of Sorting a Plastic Object that has the Ferromagnetic Label Displaced Thereupon In an example, a plastic object that has the ferromagnetic label displaced thereupon was separated using a commercial magnetic separator, as shown in FIG. 5. The plastic bottles along with the shrink sleeves were ground into corn-flaked size flakes before feeding into a magnetic separator. The conveyor belt was equipped with a magnetic pulley with a magnetic field strength of 5000+/−500 gauss at the magnet surface. The magnetic pulley was able to attract the flakes of the shrink sleeve labels with the ferromagnetic inks printed on while the non-magnetic, paramagnetic, or diamagnetic flakes of bottle/can were thrown away from the conveyor belt. The shrink sleeve label flakes comprising the ferromagnetic ink/coating were separated with an average separation efficiency of 96.1%, as observed over the course of 15 runs.

Example 20

Method of Sorting a Plastic Object that has the Ferromagnetic Label Displaced Thereupon In an example, a plastic object that has the ferromagnetic label displaced thereupon was separated using a commercial magnetic separator, as shown in FIG. 5. The plastic bottles along with the shrink sleeves were ground into corn-flaked size flakes before feeding into a magnetic separator. The conveyor belt was equipped with a magnetic pulley with a magnetic field strength of 3000+/−500 gauss at the magnet surface. The magnetic pulley was able to attract the flakes of the shrink sleeve labels with the ferromagnetic inks printed on while the non-magnetic, paramagnetic, or diamagnetic flakes of bottle/can were thrown away from the conveyor belt. The shrink sleeve label flakes comprising the ferromagnetic ink/coating were separated with an average separation efficiency of 90.8%, as observed over the course of 15 runs.

Example 21

Method of Sorting a Plastic Object that has the Ferromagnetic Label Displaced Thereupon in a Simulated Glass Waste Stream with a Burden Depth of 0.5 Inch In an example, a plastic object that has the ferromagnetic label displaced thereupon was separated using a commercial magnetic separator, as shown in FIG. 5. The plastic bottles along with the shrink sleeves were ground into corn-flaked size flakes before feeding into a magnetic separator. A burden depth of 0.5 inch of material on the conveyor belt was maintained to simulate the worst case burden depth observed in a commercial PET reclaimer. The conveyor belt was equipped with a magnetic pulley with a magnetic field strength of 7000+/−500 gauss at the magnet surface. The magnetic pulley was able to attract the flakes of the shrink sleeve labels with the ferromagnetic inks printed on while the non-magnetic, paramagnetic, or diamagnetic flakes of bottle/can were thrown away from the conveyor belt. The shrink sleeve label flakes comprising the ferromagnetic ink/coating were separated with an average separation efficiency of 95.7%, as observed over the course of 15 runs.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A substrate comprising:
   (a) a polymeric material, or a metal object that is non-magnetic, paramagnetic, or diamagnetic, and
   (b) a transparent or translucent film with a food-safe ferromagnetic ink printed onto a surface of said transparent or translucent film, wherein said transparent or translucent film having said food-safe ferromagnetic ink has:
      (i) a haze value with less than 9% variation as compared to a haze value of a corresponding transparent or translucent film that does not comprise said food-safe ferromagnetic ink, wherein said haze value is an amount of light that is diffused or scattered when passing through said transparent or translucent film as measured by ASTM D1003-13,
      (ii) an overall haze value less than 17% as measured by ASTM D1003-13,
      (iii) an overall visible transmission value greater than 82%, or
      (iv) an overall NIR transmission value greater than 87%,
   wherein said transparent or translucent film is temporarily magnetized upon exposure to a magnetic field, and
   wherein said transparent or translucent film is separated from a plurality of non-magnetic, paramagnetic, or diamagnetic metal objects when temporarily magnetized.

2. The substrate of claim 1, wherein said transparent or translucent film is a shrink sleeve label, a pressure sensitive label, a roll fed label, a wrap label, a stretch label, a cut and stack label, a shrink bundling film, or any combination thereof.

3. The substrate of claim 1, wherein said polymeric material or said metal object is a single-use bottle, a bottle cap, a single-use coffee cup, plastic cutlery, an eating utensil, a cutting utensil, a plastic tray, an aluminum can, a plastic container, a food packaging container, or any combination thereof.

4. The substrate of claim 1, wherein said food-safe ferromagnetic ink comprises a ferromagnetic material, wherein said ferromagnetic material is an unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof.

5. The substrate of claim 1, wherein said transparent or translucent film is a polymer film.

6. The substrate of claim 5, wherein said polymer film is a polyethylene (PE) film, a high density polyethylene (HDPE) film, a low density polyethylene (LDPE) film, a linear low density polyethylene (LLDPE) film, an oriented polypropylene (OPP) film, a biaxially oriented polypropylene (BOPP) film, an oriented polystyrenes (OPS) film, an ethylene-vinyl alcohol (EVOH) film, a polyamide (Nylon or PA) film, an ionomer film, an ethylene vinyl acetate (EVA) film, glycosylated polyethylene terephthalate (PETG), polypropylene (PP), polyvinyl chloride (PVC), or any combination thereof.

7. The substrate of claim 6, wherein said ionomer film is an ethylene acrylic acid copolymer (EAA) or an ethylene (meth)acrylic acid copolymer (EMAA).

8. The substrate of claim 1, wherein said transparent or translucent film is a multilayer film or a co extruded film.

9. The substrate of claim 1, wherein said magnetic field has a magnetic field strength of at least about 1,000 gauss (G).

10. The substrate of claim 1, wherein said transparent or translucent film is printed by flexographic printing, gravure printing, intaglio printing, pad printing, screen printing, offset printing, or any combination thereof.

11. The substrate of claim 2, wherein said shrink sleeve label comprises less than about 5% difference in unrestrained shrinkage as compared to a corresponding shrink sleeve label that does not comprise said food-safe ferromagnetic ink.

12. The substrate of claim 2, wherein said shrink sleeve label is placed on a polyethylene terephthalate (PET) single-use bottle.

13. The substrate of claim 4, wherein said ferromagnetic material is an ingestible ferromagnetic pigment.

14. The substrate of claim 4, wherein said ferromagnetic material comprises a ferromagnetic particle.

15. The substrate of claim 4, wherein weight of said ferromagnetic material ranges from about 0.05% to 2% of total mass of said transparent or translucent film.

16. The substrate of claim 4, wherein said food-safe ferromagnetic ink comprises said ferromagnetic material, a resin, an anti-settling additive, a wetting agent, or a dispersing agent.

17. The substrate of claim 1, wherein said food-safe ferromagnetic ink comprises a ferromagnetic material, wherein said ferromagnetic material is unadulterated iron powder, and wherein said unadulterated iron powder is electrolytic iron, atomized iron, carbonyl iron, or reduced iron with a minimum purity of 98%.

18. The substrate of claim 1, wherein said food-safe ferromagnetic ink comprises a ferromagnetic material, wherein said ferromagnetic material is iron alloy, and wherein said iron alloy comprises cobalt, vanadium manganese, molybdenum, silicon, nickel, boron, aluminum, copper or any combination thereof.

* * * * *